United States Patent
Bogatin et al.

(10) Patent No.: US 11,252,456 B2
(45) Date of Patent: *Feb. 15, 2022

(54) METHOD AND SYSTEM FOR PROVIDING NON-REAL-TIME CONTENT DISTRIBUTION SERVICES

(71) Applicant: Siden, Inc., New York, NY (US)

(72) Inventors: Boris Bogatin, Philadelphia, PA (US); Narayan Parappil Menon, Syosset, NY (US); Gary M. Parsons, Potomac, MD (US); Rajendra Singh, Indian Creek Village, FL (US)

(73) Assignee: Siden, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/095,686

(22) Filed: Nov. 11, 2020

(65) Prior Publication Data

US 2021/0067814 A1 Mar. 4, 2021

Related U.S. Application Data

(63) Continuation-in-part of application No. 16/588,763, filed on Sep. 30, 2019, now Pat. No. 11,115,705,
(Continued)

(51) Int. Cl.
*H04N 7/173* (2011.01)
*H04N 7/16* (2011.01)
(Continued)

(52) U.S. Cl.
CPC ......... *H04N 21/2385* (2013.01); *H04N 7/122* (2013.01); *H04N 21/23614* (2013.01); *H04N 21/24* (2013.01)

(58) Field of Classification Search
CPC ............... H04N 21/2385; H04N 21/24; H04N 21/23614; H04N 7/122; H04N 21/433;
(Continued)

(56) References Cited

U.S. PATENT DOCUMENTS 5,652,759 A 7/1997 Stringfellow, Jr.
8,261,033 B1 * 9/2012 Slik ....................... G06F 3/0647
711/162
(Continued)

FOREIGN PATENT DOCUMENTS

CN 1984118 A 6/2007
CN 105391516 A 3/2016
(Continued)

OTHER PUBLICATIONS

Pixeom website; https://pixeom.com/; 10 pages.
(Continued)

*Primary Examiner* — Gigi L Dubasky
(74) *Attorney, Agent, or Firm* — Harness, Dickey & Pierce, P.L.C.

(57) ABSTRACT

A system and method of operating an over-the-air broadcast television system having spectrum capacity that has a first portion for linear broadcasting content in real time and a second portion corresponding to a dormant capacity. A content distribution network system receives digital content from a content storage system. A dormant capacity estimator estimates dormant capacity of the spectrum capacity. An intermediate storage device communicates a registration request signal to the content distribution network system using a reverse link. The content distribution network system communicates a registration acknowledgement signal to the intermediate storage device. The content distribution network system communicates the digital content to the intermediate storage device through the over-the-air broadcast television network system. The intermediate storage device stories the digital content therein. The content distribution network system communicates the digital content to a user device through a local link after storing the digital content.

46 Claims, 41 Drawing Sheets

Related U.S. Application Data which is a continuation-in-part of application No. 15/811,958, filed on Nov. 14, 2017, now Pat. No. 10,433,022.

(60) Provisional application No. 62/422,247, filed on Nov. 15, 2016.

(51) Int. Cl.
*H04N 21/2385* (2011.01)
*H04N 21/24* (2011.01)
*H04N 21/236* (2011.01)
*H04N 7/12* (2006.01)

(58) Field of Classification Search
CPC .......... H04N 21/432; H04N 21/47202; H04N 21/6131; H04N 21/6143; H04N 21/6112; H04N 21/6408
See application file for complete search history.

(56) References Cited

U.S. PATENT DOCUMENTS

| | | | |
|---|---|---|---|
| 9,456,247 B1 * | 9/2016 | Pontual | H04N 21/6581 |
| 10,433,022 B2 | 10/2019 | Bogatin et al. | |
| 2004/0064325 A1 | 4/2004 | Syed et al. | |
| 2007/0002871 A1 | 1/2007 | Pekonen et al. | |
| 2007/0094023 A1 * | 4/2007 | Gallino | G10L 15/04 |
| | | | 704/251 |
| 2008/0244657 A1 * | 10/2008 | Arsenault | H04N 21/26603 |
| | | | 725/48 |
| 2010/0023972 A1 | 1/2010 | Summers et al. | |
| 2011/0093704 A1 * | 4/2011 | Park | H04W 76/10 |
| | | | 713/168 |
| 2016/0360255 A1 | 12/2016 | Pontual et al. | |
| 2018/0139508 A1 | 5/2018 | Norin et al. | |
| 2021/0067814 A1 | 3/2021 | Bogatin et al. | |
| 2021/0099749 A1 | 4/2021 | Bogatin et al. | |

FOREIGN PATENT DOCUMENTS

| | | |
|---|---|---|
| EP | 1030465 A1 | 8/2000 |
| JP | 2001-313599 A | 11/2001 |
| JP | 2002-152153 A | 5/2002 |
| JP | 2003-169363 A | 6/2003 |
| JP | 2010-027004 A | 2/2010 |
| JP | 2015-532033 A | 11/2015 |
| KR | 2011-0093993 A | 8/2011 |
| WO | WO-03058967 A1 | 7/2003 |
| WO | WO-2013103828 A1 | 7/2013 |

OTHER PUBLICATIONS

Datami website; http://www.datami.com/; 9 pages.
Partial International Search Report for corresponding PCT/US2017/061760, dated Mar. 20, 2018, 13 pages.
Requirement for Restriction Election regarding U.S. Appl. No. 15/811,958 dated Jun. 7, 2018.
Non-Final Office Action regarding U.S. Appl. No. 15/811,958 dated Oct. 10, 2018.
Notice of Allowance regarding U.S. Appl. No. 15/811,958 dated May 22, 2019.
Chinese Office Action dated Apr. 3, 2020 in corresponding Chinese Application No. 2017800705362.
Japanese Office Action (in Japanese and English language) dated Dec. 1, 2020 in corresponding Japanese Application No. 2019-547232.
International Search Report and Written Opinion dated Dec. 9, 2020 in corresponding PCT Application No. PCT/US2020/053313.
U.S. Appl. No. 15/811,958, filed Nov. 14, 2017, Bogatin et al.
U.S. Appl. No. 16/588,763, filed Sep. 30, 2019, Bogatin et al.

* cited by examiner

METHOD AND SYSTEM FOR PROVIDING NON-REAL-TIME CONTENT DISTRIBUTION SERVICES

CROSS-REFERENCE TO RELATED APPLICATIONS

This application claims the benefit of is a continuation-in-part of U.S. application Ser. No. 16/588,763 filed on Sep. 30, 2019, which is a continuation-in-part of U.S. application Ser. No. 15/811,958 filed on Nov. 14, 2017, now U.S. Pat. No. 10,433,022, which claims the benefit of U.S. Provisional Application No. 62/422,247, filed on Nov. 15, 2016. The entire disclosures of the above applications are incorporated herein by reference.

TECHNICAL FIELD

The present disclosure relates generally to video distribution systems and, more specifically, to a method and system providing prepositioned content to users, where such prepositioning improves the overall availability of certain services and total performance of any wide area network.

BACKGROUND

The statements in this section merely provide background information related to the present disclosure and may not constitute prior art.

In many regions, internet service underperforms relative to the amount of content consumption that is desired. That is, many areas of the country and around the world do not have sufficient high-speed internet access. For example, wireless, dial-up, DSL, or satellite services are examples of services that may not provide adequate speed or economical capacity to support the downloading of high quality of video content or other large forms of data in a timely or economic manner. However, over-the-top (OTT) video services are becoming increasingly commonplace in the United States market and globally, rapidly not only offering an attractive alternative to traditional cable bundles but beginning to replace "Pay TV" altogether. However, many consumers across the U.S. and globally, whether in urban areas or in rural areas, either desire to adopt a competitive service to a cable bundle to reduce cost or to gain access to additional features (as in the case of mobility and portability as with wireless services) or to enhance their existing slower speed or lower capacity services to support a viable over-the-top video or data intensive service. Enabling these slower speed or lower capacity services to support high quality OTT video and data delivery is desirable.

A large number of people are dropping traditional cable television service in favor of over-the-top services. This contributes to the volume of data used to watch videos. Nearly half of the approximately 125,000,000 households in the United States now subscribe to at least one video streaming service. By one estimate, the amount of traffic attributable to the most popular video services such as Netflix®, Amazon Prime Video® and iTunes® together account for more than 40% of all peak internet traffic in the U.S. Another 18% is attributable to YouTube®. Ultra-high definition (UHD) content is also beginning to appear on the market. Thus, the increase in internet traffic is expected to grow for the foreseeable future. For Netflix® service, a 5 Mbps is recommended for HD content. However, for ultra-high definition content, a 25 Mbps connection is recommended. Ultra-high definition streams may consume up to 7 GByte per hour.

Today, it is estimated that 20,000,000 Americans lack access to 10 Mbps+ service, and that number grows to roughly 1.6 billion global households. Their options range satellite broadband and long-loop DSL connections for those that can afford it, or a mobile broadband only solution to their smartphones across many of the other parts of the world where even satellite or DSL broadband is unaffordable. Same time, a rapidly growing trend in lower income households, and even more so in the cord-cutting focused youth segments of the population, is using as mobile service as a preferred means to access video data, while shedding the more expensive fixed wired broadband.

However, satellite or long-loop DSL services are typically unsuitable for supporting sufficient quality over-the-top OTT video-on-demand (VoD) services due to their limited levels of network performance because 10 Mbps+ is typically required for high quality OTT VoD. Similarly, accessing video content on TVs in the homes using wireless networks, or even the other alternatives, is limited by data caps and the per GB pricing models of each of the service providers. Because of the high data intensity of a video service, data caps can be easily surpassed and costs can skyrocket from use of extra GBs. For instance, only a few HD movies may cause a family to exceed its mobile broadband data cap.

Other data services are also highly intensive in the use of data. For example, software updates and internet of things (IoT) devices may also consume a large amount of data that are also desired by underserved users.

Broadcast television is also known as over-the-air television. Broadcast television may also be referred to as terrestrial television. Broadcast television has been around for decades and has experienced many changes over the years. From black and white television, to color television to digital television. The current Advanced Television System Committee (ATSC) 1.0 is currently used for broadcasting over-the-air digital television. The broadcast of digital television is linear in that the content is communicated in a well-defined pre-announced schedule. Local television stations are allocated a predetermined amount of over-the-air spectrum capacity. The over-the-air broadcast spectrum capacity is used for communicating linear content therethrough. The broadcast spectrum capacity used by a broadcast television network system is used for broadcasting a primary channel and typically several sub channels. Unused spectrum for an allocated amount of spectrum capacity lies dormant. This unused capacity is referred to dormant capacity.

The next generation of over-the-air broadcasting is set forth in the ATSC 3.0 standard. The standard enables the use of broadcast spectrum capacity for new and innovative services by the license holders. Leasing unused spectrum to third parties is also enabled. The new services extend beyond the traditional linear broadcast services. Such services may include internet services, such as broadband data, content distribution and the Internet of Things.

SUMMARY

The present disclosure provides a method for delivering content to user devices through an intermediate storage device that is pre-populated with content using low cost capacity, underused capacity or remnant capacity of a communication network.

In one aspect of the disclosure, an over-the-air broadcast television system has spectrum capacity that has a first portion for linear broadcasting content in real time and a second portion corresponding to a dormant capacity. A content distribution network system receives digital content from a content storage system. A dormant capacity estimator estimates dormant capacity of the spectrum capacity. An intermediate storage device communicates a registration request signal to the content distribution network system using a reverse link. The content distribution network system communicates a registration acknowledgement signal to the intermediate storage device using the dormant capacity. The content distribution network system communicates the digital content to the intermediate storage device through the over-the-air broadcast television network system. The intermediate storage device stores the digital content therein. The content distribution network system communicates the digital content to a user device through a local link after storing the digital content.

In a further aspect of the disclosure, a method of operating an over-the-air broadcast television network system comprising an over-the-air spectrum capacity, the over-the-air spectrum capacity comprising a first portion for linear over-the-air broadcasting content in real time and a second portion corresponding to a dormant capacity. The method includes receiving digital content at a content distribution network system from a content storage system, estimating dormant capacity of the over-the-air spectrum capacity from a dormant capacity estimator in communication with the over-the-air broadcast television network system, communicating, by an intermediate storage device, a registration request signal to the content distribution network system using a reverse link of a communication network different than the over-the-air broadcast television network system, communicating, by the content distribution network system, a registration acknowledgement signal to the intermediate storage device in response to the registration request signal system, communicating, by the content distribution network system, the digital content to the intermediate storage device through the over-the-air broadcast television network system, storing the digital content in the intermediate storage device, and communicating, the content distribution network system, the digital content to a user device through a local link after storing the digital content.

The disclosed method uses dormant or remnant capacity of a television system, that is not otherwise being used to broadcast linear content to communicate content to an intermediate storage device to store the content in content storage, and communicate the content from the content storage to the user device at some other point in time using some other communication system such as a local communication link.

The present invention also concerns the following characteristics to be combined with claim 1 and with one or several of the other characteristics wherein the content distribution network system, prior to communicating the digital content to the intermediate storage device, communicates an instruction signal to the intermediate storage device comprising instruction data for downloading the digital content or a portion of the digital content; wherein the intermediate storage device communicates a delivery request signal to the content distribution network system through the reverse link based on the instruction data; wherein the instruction data is for a unicast transmission or a broadcast transmission and the instruction data comprises a target throughput for downloading the digital content based on the dormant capacity, the spectral efficiency and a location for the digital content; wherein the intermediate storage device communicates a radio quality condition signal using the reverse link corresponding to a quality of communication signals received from the television over-the-air network, the target throughput is a function of the radio quality condition signal and an amount of dormant capacity available; wherein the intermediate storage device communicates user data to the content distribution network system through the reverse link and wherein the content distribution network system generates the instruction signal in response to the user data; wherein the user data comprises a user preference; wherein the user data comprises a watch list; wherein after the digital content is stored the intermediate storage device communicates a second acknowledgement signal to the content distribution network system using the reverse link; wherein the second acknowledgment signal comprises feedback data corresponding the content distribution network system communicating content to the to the intermediate storage device; wherein the feedback data comprises a volume of data received; wherein the feedback data comprises a download duration of a download received at the intermediate storage device; wherein the feedback data comprises an achieved throughput; wherein the feedback data is used by the content distribution network system in a subsequent communication; wherein the local link comprises a local area network; wherein the content distribution network system communicates the digital content to the intermediate storage device with a unicast delivery; wherein the content distribution network system communicates the digital content to a plurality of intermediate storage devices with a broadcast delivery; wherein the content distribution network system determines whether the broadcast delivery is used based on at least one of: the plurality of intermediate storage devices in an area, a content commonality of interest at the plurality of intermediate storage devices and radio conditions at the plurality of intermediate storage devices; wherein, prior to the content distribution network system communicating the digital content to the intermediate storage device, the content distribution system communicating a session establishment signal through the broadcast network system to a plurality of intermediate storage devices; wherein the session establishment signal comprises required throughput data; wherein the broadcast television network system allocates broadcast resources based on the session establishment signal; wherein the content distribution network system broadcasts the digital content through the broadcast television network system to the plurality of intermediate storage devices and wherein the plurality of intermediate storage devices stores the digital content therein; wherein each of the plurality of intermediate storage devices communicating a second acknowledgement signal after the digital content is stored therein; and, wherein the registration acknowledgement signal is communicated to the intermediate storage device in response to the registration request signal using the dormant capacity of the over-the-air broadcast television network system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
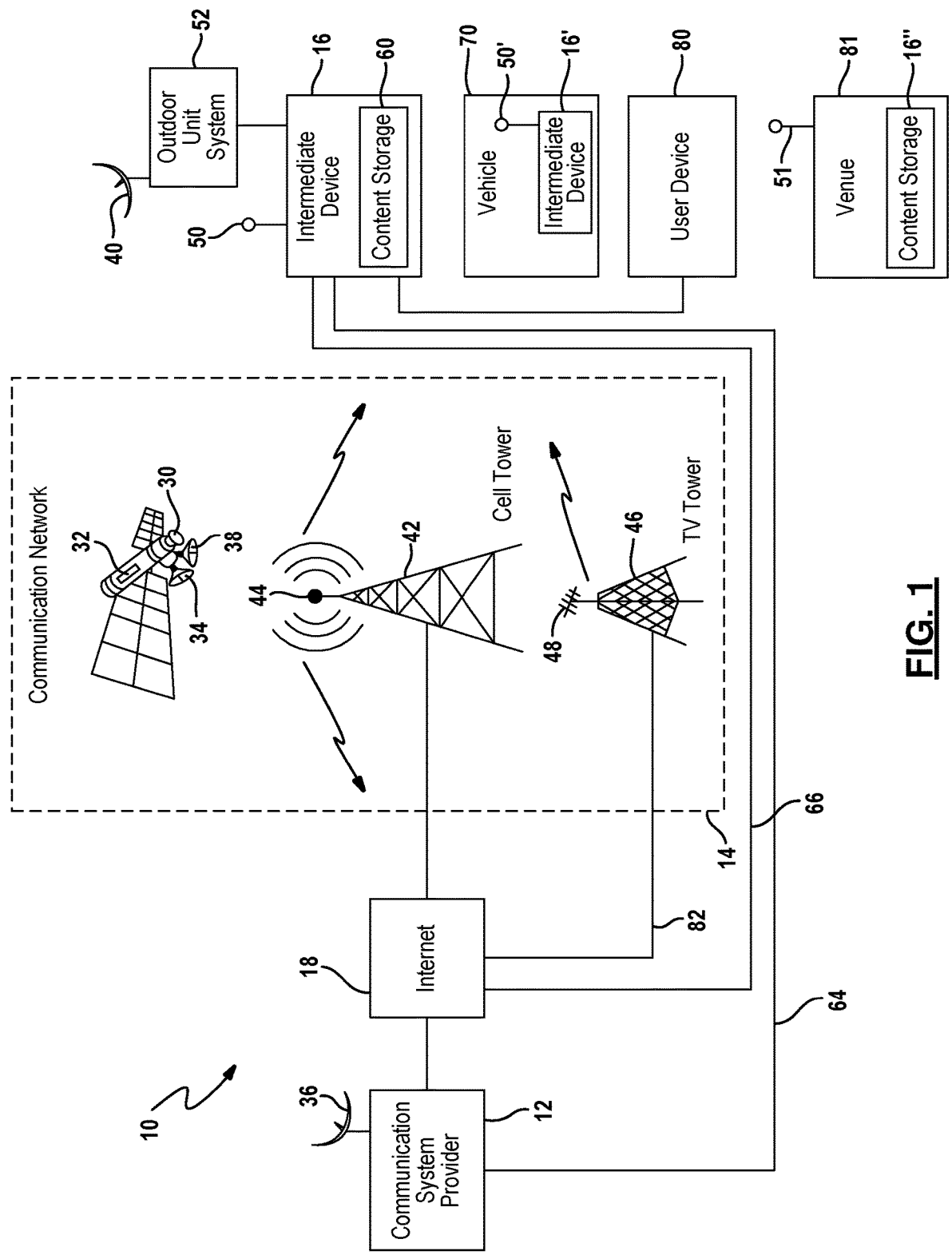
FIG. 1 is a high level block diagrammatic view of a first example of a communication system.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure. The teachings of the present disclosure can be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented electronically in analog circuitry, digital circuitry or combinations thereof. Further, the computing device may include a microprocessor or microcontroller that performs instructions to carry out the steps performed by the various system components. A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, software, software updates, IoT data, weather, application, application data, "best of web" content, e-delivery of materials, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein.

While the following disclosure is made with specific broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, or mobile distribution systems, power-line broadcast systems, any point-to-point and/or multicast Internet Protocol (IP) delivery network, and fiber optic networks. Further, the different functions collectively allocated among a service provider and intermediate devices as described below can be reallocated as desired without departing from the intended scope of the present disclosure.

User devices may be coupled to the Internet through a constrained network or not even coupled to the Internet at all. In a constrained network, the speed or available resources may not be sufficient to provide a quality level of service. In the present examples, remnant capacity of the constrained network or a second less constrained network may be used to pre-position content at an intermediate device. The pre-positioned content may then be provided from intermediate device storage directly or through a second communication network (i.e. local network) when demanded at the user device for real time consumption, without having to rely on using the constrained network for that real-time consumption.

Remnant capacity is a resource or a plurality of resources that are not being used for transmitting data or content by a content system provider during regular customer use. Regular use of a communication network for primary customers may be referred to as a primary use. Remnant capacity may be referred to as a secondary use and may be governed between agreements between a content provider and a communication system provider. The content provider may wish to provide a service to users using the remnant capacity. Users may not be aware of the path the content traverses. The use of resources for the remnant capacity has a lower priority that can be allocated to another for a higher priority use. In the simplest sense, remnant capacity is a data path or bandwidth that is increasingly left unutilized during non-peak times of network use. Inversely, there is limited remnant capacity available during the peak times of network use. In all cases, such peak time of network use is characterized as the time when most of the usage of the services offered by the network is taking place by the network's users or direct customers. The non-peak time is the time when the least usage of the services is taking place by their users. For example, in a long term evolution wireless network (LTE) system, remnant capacity may be the bandwidth not being used for voice or data content requested from users in real time. In the cases of "spectrum re-use", capacity used by some users for real-time consumption of some content during peak times, may leave remnant capacity at the same time, as capacity that is either unusable by other users for real-time consumption of other content or only usable by other users for real-time consumption of the same content, if that content is broadcasted instead of unicasted. In the cases of "network re-use", capacity used by some users for real-time consumption of content during peak times, may leave remnant capacity at other times, as capacity that is not demanded to be used for real-time consumption of content by other users at these times as they are non-peak-times and are not of interest to users to use at such times (such interest to users to use as why there is a peak time in the network after all). In a satellite system, the remnant capacity is the bandwidth not being used for broadcasting of content to users for the sake of real-time consumption of such content or for voice or data content requested from users in real time and may similarly be under-utilized as in wireless network systems. There is a very limited incremental cost for utilizing this remnant capacity, or the unused or under-used resources of a communication provider's network, as that cost is already being borne for the provision of regular customer use services, and as such offers means for highly cost effective content distribution. By utilizing the remnant capacity that would otherwise be wasted, the present system allows communication system providers to use it to offer other services to customers or to sell the capacity to others.

The remnant capacity may be used in various ways by intercommunication of the intermediate devices, the communication system provider, and the content service provider. In the cases of "spectrum re-use", there have been many efforts to generate additional parallel uses of the same spectrum for real-time consumption by multiple users, using the same spectrum. However, utilizing remnant capacity, an almost infinitely high (as far as the number of users benefitting) amount of re-use can be generated by simply broadcasting this content, instead of unicasting it, and by having some users use it for real-time consumption, and for the remnant capacity to be used for non-real-time consumption by storing this same content at other intermediate storage devices at this same time, and then accessed by other users during a different time in the future, directly or using other communication networks, which may also be less constrained than the network described herein. Further, in the cases of "network re-use", today this remnant capacity goes largely unutilized as operators have had a challenging time of incentivizing "changes in user behavior" to use the network more during "off-peak" times than they otherwise would like for real-time consumption—the benefit to consumers of using the network during peak times for real-time consumption instead of during off-peak times, far outweigh any incentives or benefits which the operators can pass on to the consumers to shift their real-time consumption. However, such remnant capacity can be used in-full for non-real-time consumption, by unicasting or broadcasting content using remnant capacity and by storing this content at other intermediate storage devices, and then accessed by other users during a different time in the future, directly or using other communication networks, which may be less constrained than the network described herein.

Queries as to the current availability of capacity and the upcoming availability of capacity, including real-time consumptions and the remaining capacity, may be formed in order to identify the availability of remnant capacity. Further, Quality of service (QoS) prioritization using evolved multimedia broadcast and multicast services (eMBMS) quality class identifiers, as well as quality-of-service class identifiers (QCIs) used in any wireless or other communication system, may be performed, providing higher QCI levels to traffic for real-time consumption, while leaving traffic for non-real-time consumption on lower QCI levels, effectively rendering it to use of remnant capacity only.

Prioritization of content to be communicated using the remnant capacity may be formed. Delivery of content using remnant capacity may be queue-driven. All of the content to be delivered may be placed into the queue with attributed priority levels for each portion of content, and then served from the queue automatically upon remnant capacity availability, coordinating which content is served in which sequence per what rule. Content may also be retransmitted using remnant capacity. User preferences (queuing), missing content (error correction), content most popular for some users (personalization), content most popular for most users (popularity or short-tail optimization), as well as the remainder of content may all be used in prioritizing within queues.

The present system provides a high-capacity broadcast delivery system or a targeted unicast delivery system for pre-positioning content, that combines the strategic use of excess capacity or remnant capacity in a content communication network with pre-positioning content close to the users by caching and storage of such content at local content stores, to allow users to access a large amount of content such as over-the-top (OTT) content, software updates, or other highly intensive data applications without needing to traverse the content communication network at the time the content is desired. This system may use the remnant capacity of a system over the same exact spectrum (in the case of spectrum re-use) as real-time consumption by broadcasting content to users including to those requesting it for real-time consumption and to others using the remnant spectrum capacity for pre-positioning, instead of just unicasting it to only the users requesting it for real-time consumption, or over remnant capacity left-over from non-peak-use of networks for real-time consumption, by unicasting or broadcasting content for pre-positioning. As will be further described below, the system may use remnant capacity of different types of communication systems including but not limited to mobile or cellular systems such as an LTE system, a satellite system or a digital television system. Content such as video content may be provided to an intermediate device which stores the content therein. When users request content for real-time consumption, the content may be provided from the stored or cached content store, rather than requiring that content to be served by the content communication network in response to users' requests and subjecting users to slow speeds of the constrained content communication network or from further burdening the content communication network. A wide variety of video programming including movies, television, shows, documentaries and news may be provided based upon user preferences. Also, other types of video programming such as instant replays may also be provided to users. The system may also be used to provide software and application updates for various types of users that are coupled to the intermediate device. The system may also be used for defense purposes or purposes in which high amounts of data are required, but whereas such data may be pre-positioned at the local content store by the content communication network and not be required to be delivered from the source of such data on a live or real-time basis.

The system is particularly suitable for rural customers, customers in markets with lower speed, lower capacity networks, or customers of companies that want to utilize their lower speed networks to offer an equivalent of high speed cable or fiber network offerings, to have access to large data, over-the-top services or other large data applications. Specifically, the system may also allow non-rural or other customers to use wireless, satellite, TV, or DSL or other wired networks to effectively meet their content demands, without the need for an additional high-speed cable or fiber network offering. Thus, large data content, including over-the-top content (OTT) video, software updates, and other large data, may be offloaded to be served by the present system while the lower speed content communication network serves users' real-time/live voice and data requests, that cannot be pre-positioned effectively, using peak or regular capacity, and thus the need for high-speed cable or fiber network offerings within the home may be eliminated so that expenses may be reduced. The system may also allow congestion on even high speed cable and fiber networks, or any of the aforementioned networks, to be alleviated by combining content delivery through pre-positioning and subsequent use from local content stores and by serving users' real-time/live voice and data requests, that cannot be pre-positioned effectively, using peak or regular capacity, in a unified system. Further, this system may also increase the effective capacity of broadband networks by using a much greater portion, or the entirety, of a content communication network's capacity, by using the combination of remnant capacity for pre-positioning of content and subsequent use from local content stores, and peak or regular capacity for serving users' real-time/live voice and data requests. If content that is likely to be downloaded to the user is pre-positioned at the local content store, or the intermediate device, and then served from the intermediate device, the need to instead use the content communication network on a real-time/live request basis is reduced, especially in peak hours. Pre-positioning of large data, including over-the-top video and software updates, frees the capacity of mobile and fixed broadband networks for other real-time content requests, real-time two-way communications, or other live content consumption, especially during peak times. By combining a pre-positioning, remnant capacity approach with a real-time voice and data request, peak or regular capacity approaches, lower speed broadband service providers may compete head-to-head with established cable or fiber providers while any of the aforementioned networks improve their performance by leveraging such a combination of approaches.

It is also desired for a system to be able to serve users requests from a first user for real-time consumption, using broadcast transmissions, not only when there are other users desiring the same content for real-time consumption (like in the case of the mode described in eMBMS), but also when there are other users who may desire this content for non-real-time consumption, in order to store this same content as in the first user's request in intermediate storage and then to access this content for real-time consumption but in the future, at a later time. When a first user requests to access content, instead of serving that first user's request using a unicast transmission, the system can instead serve that first user's request using a broadcast transmission, allowing that first user and any other user, desiring to access that content for real-time consumption, to real-time consume that content; while at the same time, the remnant broadcast transmissions to be able to be received by devices of any and all other users addressable by the broadcast transmission for non-real-time consumption, to store such content in those devices and for such any and all other users to access such content directly from their devices for real-time consumption at some later time.

The system could further make determinations of when it is advantageous to serve a given first user's request using a unicast transmission, as unicast transmissions are today higher throughput and have higher spectral efficiencies than broadcast transmissions on the order of 50-1,000%, and when it is advantageous to instead serve such first user's request using a broadcast transmission, where even though a broadcast transmission may be 50-1,000% disadvantaged in throughput and spectral efficiency than a unicast transmission, there are more than 50-1,000% more users than the first user which would benefit from having this request be received and stored by their devices for non-real-time consumption, and accessed for real-time consumption at a future time. This could involve analysis of not just how many users may benefit, but the likelihood of how many users may benefit based on analysis of their usage preferences, the popularity of the content in the request, and the likelihood that the cost of serving those users using unicast transmissions at a future time will be greater than the cost of using a broadcast transmission vs a unicast transmission at the current time.

Further, such system could also include a mechanism for determining whether any given device should receive the remnant capacity broadcast and store the data for non-real-time consumption, or if it should simply let it pass by. This determination could be based on its current available storage, the content already stored on that device for non-real-time consumption, and the content scheduled to be delivered to that device for non-real-time consumption, and the relative value of such opportunistic broadcast data and the cost of receiving it and storing it versus the value of the content already stored on that device or scheduled to be delivered to that device for non-real-time consumption.

For example, a first user desires to watch a movie #1, which is a relatively popular film, and requests it to be delivered for real-time consumption. The system analyzes that only 10% of the users in the same area as the first user, have movie #1 already stored on their devices for non-real-time consumption, but that of the remaining 90% of the users, 70% of those 90% or 63% would have a high likelihood of consuming movie #1 at a future time if it was stored on their devices for non-real-time consumption. The system serves movie #1 to the first user using a broadcast transmission instead of a unicast transmission, while having the other 63% of the users in the area as the first user receive the remnant broadcast transmission and store movie #1 for non-real-time consumption by these 63% of the users. In the future, some of these users whose devices stored movie #1 for non-real-time consumption, request to watch movie #1 at some future times, and movie #1 is served to them directly from their devices instead of using the network.

Referring now to FIG. 1, a high level block diagrammatic view of a communication system 10 is set forth. In this example, a communication system provider 12 is a system that is in communication with a communication network 14 and controls the operation of the communication network 14. The communication network 14 is in communication with an intermediate device such as an intermediate device 16. The communication system provider 12 is used for controlling the communication network 14. The communication network 14 may be in direct connection with the communication provider or to the internet 18. The communication system provider 12 controls the schedule and placement of content through the communication network 14. The communication system provider 12 may receive content from various sources as will be described further below.

The communication network 14 is in communication with the internet 18. The communication network 14 may be a single stand-alone network or may be a combination of networks. That is, the remnant capacity of one or more networks may deliver content to the intermediate device 16. The communication network 14 may be wireless. The communication network 14 for communicating content to the intermediate device 16 may include a satellite 30 that has one or more transponders 32 therein for receiving and communicating content therefrom. The satellite 30 may also include a receiving antenna 34 that is in communication with an antenna 36 of the communication system provider. A transmitting antenna 38 communicates content to an antenna 40 of the intermediate device 16. The antennas 34, 36, 38 may represent multiple antennas or multiples types of antennas.

The communication network 14 may also include a cell tower 42, or any other wireless transmission device, having an antenna 44 (or antennas) thereon. The antenna 44 may represent a cellular antenna, a Wi-Fi antenna, or any other wireless transmission antenna of the cell tower 42 and may communicate content wirelessly to the intermediate device 16 through the antenna 44, from the communication system provider 12, including also wirelessly through the antenna 44.

The communication network 14 may also include a television tower 46 having an antenna 48 thereon. The TV tower 46 may communicate content to the intermediate device 16 from the communication system provider 12.

In all communication system cases, the communication network 14 may communicate using remnant capacity as will be further described below. The remnant capacity may include various types of resources, that are not being used for serving users' real-time/live voice and data requests and their real-time/live voice and data consumption, and that are more ideally used for pre-positioning of content to the intermediate device 16. As mentioned above, the communication network 14 may effectively distribute (pre-position) content on a non-real-time basis to the intermediate device 16, for subsequent consumption by users directly from the intermediate device 16 instead of from the communication network 14.

The communication network 14 may communicate with the local area network 310, which would in turn communicate the content to the intermediate device 16, or the intermediate device 16 directly, using various types of access systems so that a maximum amount of content may be provided to the various intermediate devices. For example, the communication network 14 may use frequency division multiple access, timed division multiple access, spatial division multiple access, code division multiple access and orthogonal frequency division multiple access. Depending upon the requirements of the system and the types of systems provided, different types of access protocols may be used.

The intermediate device 16 may also have an antenna 50 disposed thereon. The antenna 50 may communicate with the antenna 44 and the antenna 48 of the communication network 14. By making the intermediate device portable the antenna 50 may be placed in a position of high reception. The intermediate device 16 may act as a small cell.

An antenna 40 of an outdoor unit system 52 may be used to communicate with the antenna 38 of the satellite 30. The antenna 40 may be a flat faced phased-array antenna. Details of the outdoor unit system 52 and the intermediate device 16 are provided below.

The intermediate device 16 may also include a content storage 60. The content storage 60 may include a solid state content storage, a hard disk drive or a combination of both. The content storage 60 may be designed to hold a substantive amount of data on the order of multiple terabytes or greater. The content storage 60 is used to store pre-positioned content received through either the antenna 40 or the antenna 50. The intermediate device 16 may also be in communication with a back haul network 64. The back haul network 64 may be part of the communication network which, as demonstrated, is presented as wireless systems. The back haul network 64 may be a wireless network as well.

The system 10 may be suitable for prepositioning content using a wired network 66 as well. That is, the intermediate device 16 may also be coupled to the Internet 18 through the wired network 66. Content may be prepositioned using the remnant capacity of the wired network 66 as will be described below. The wired networks may be a DSL network, a cable network, or a fiber network.

The communication network 14 may also be in communication with a vehicle 70. The vehicle 70 may include an intermediate device 16' configured in the same manner as that of the intermediate device 16. The vehicle 70 may include various types of vehicles including an automobile, a ship, a bus, a train, an airplane or the like. The intermediate device 16' is coupled to one or more antennas 50' that may be located on the exterior of the vehicle. Of course, the antennas 50' may be located within the vehicle 70 at the intermediate device 16'. A user device 80 is in communication with the intermediate device 16. For convenience, a line representing either a wireless or wired connection is presented between the user device 80 and the intermediate device 16. The user device 80 requests content from the intermediate device 16 and, more particularly, from the content storage 60 of the intermediate device 16. A venue 81 such as a stadium, office building, hotel or multiple dwelling unit may have an intermediate device 16" with an exterior antenna 51 in communication with the satellite antenna 38, the antenna 42 of the cell tower 42 and/or the antenna 48 of the TV tower.

The cell tower 42 may use LTE technology or other cellular technology. In particular, the cell tower 42 may use LTE-B technology to communicate with the intermediate device 16. A wired connection 82 may be disposed between the communication network 14 and the internet 18 and/or communication system provider 12. As will be described below, the intermediate device 16 may be part of the cell tower 42 and thus the antenna 44 may act as a Wi-Fi 33 or WiMAX antenna for communicating with the user devices.

The connection between the communication network 14 and the internet 18 or the communication system provider 12 may also include remnant capacity. This remnant capacity may be utilized by the system in a similar way as the afore described remnant capacity, to distribute pre-positioned content to the communication network 14 or to the internet 18, for their in-turn distribution of such pre-positioned content, including using remnant capacity, to ultimately reach the intermediate device 16.

Figure 2:
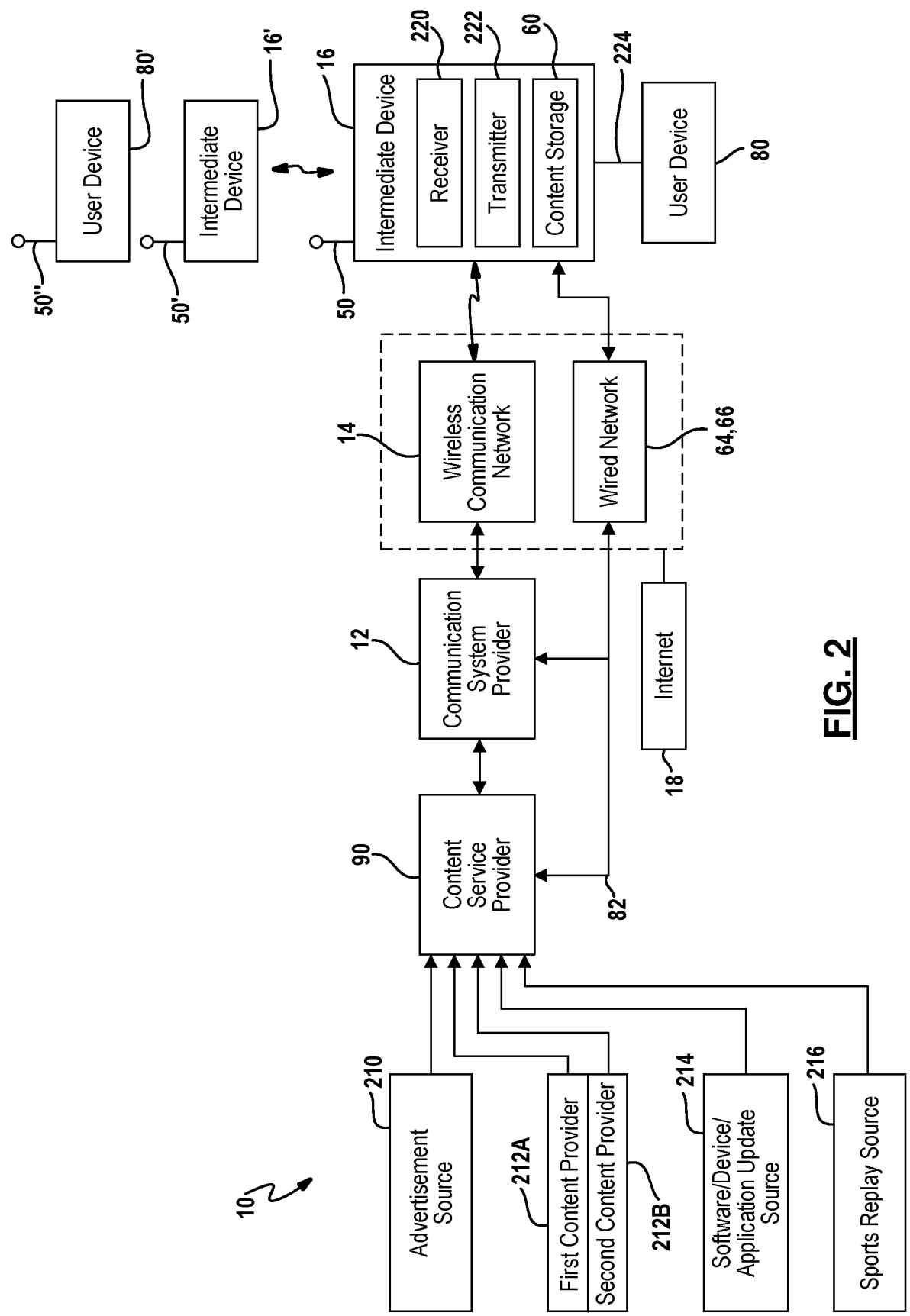
FIG. 2 is a block diagrammatic view of a more detailed communication system of FIG. 1.

Referring now to FIG. 2, the communication system provider 12 is shown in communication with a content service provider 90. The content service provider 90 is a system that is used for providing content to the communication system provider 12. The content service provider 90 and the communication system provider 12 may be business entities. The content service provider 90 may purchase the remnant capacity of the communication system provider 12. The content service provider 90 may be a service provider that is subscribed to by the users of the user device 80. However, the content service provider 90 may include pre-existing services such as mobile phone service providers, cable providers and the like. The content service provider 90 communicates various instructions to the communication system provider 12 so that the content is distributed using the remnant capacity of the communication system provider 12. Details of the intercommunication between these systems are described in further detail below.

The content service provider 90 may receive content from various sources including an advertisement source 210, a first content provider 212A, a second content provider 212B, a software/device/application update source 214 and a sport replay source 216. The advertisement source 210 may communicate advertisements to the content service provider 90. The advertisements may include video, audio and metadata associated therewith. The metadata associated with an advertisement may include desired targets or which users would find the content desirable and a product definition.

The content providers 212A and 212B may also provide video and audio content as well as metadata for the content. The metadata may include the content title, actors or actresses, and various other identifying data including various categories such as genres and the like. The content may be requested from the content providers or indicated to be pre-positioned at the intermediate devices by the content providers.

The software/device/application update source 214 may provide new software, software updates, device updates and application updates to the intermediate device 16 through the content service provider 90 and the communication system provider 12, intended for the user device. The updates may be incremental changes to software resident in a user device, whereas the new software may be software not currently within the user device or intermediate device 16. The software and updates may be requested by a device for non-real-time delivery or delivered through no action of the device and pre-positioned at the intermediate device based on the identity of the user device, the software or the applications residing thereon.

The sports replay source 216 may provide sports replays to the content service provider 90 for distribution to the intermediate device 16. The sports replay content may be short video clips of certain special or important events of a game or match. Sports replays may be clips that include both audio and video content. The sports replay may also include metadata that identifies the team, the players involved, the sport, the clip or replay display title and the like. The clip display title is what may be displayed to a user in a user interface.

The metadata included with the various types of content described above allows the content to be distributed to the proper intermediate device or intermediate devices on the right schedule while accommodating any other content distribution priorities while using the remnant capacity of the communication network under the control of the communication system provider 12.

The intermediate device 16 is illustrated having content storage 60 and also a receiver 220. The receiver 220 may be used to receive communications from the wireless communication network 14. A transmitter 222 may be used to transmit wirelessly or by wire to and from the wireless communication network 14, the wired network 64 and/or the wired network 66.

The user device 80 is illustrated having a direct or wired connection 224 with the intermediate device 16. The intermediate device 16 may thus be a dongle or other type of directly connected device to the user device 80. The wired connection 224 may be an HDMI or USB connection.

More than one intermediate device may be disposed in a system. The intermediate device 16 may also communicate with a second intermediate device 16'. The intermediate device 16' may be configured in the same manner as that of the intermediate device 16. The intermediate device 16 may communicate from the antenna 50 to the antenna 50' of the intermediate device 16'. The intermediate devices 16, 16' may form a peer-to-peer network which is described in more detail below. Of course, more than two intermediate devices may form a peer-to-peer network. The peer-to-peer network may communicate various types of content therebetween. That is, if one intermediate device misses a portion of a content transmitted from the wireless communication network 14, another intermediate device may be queried to determine whether the intermediate device includes the missing content. The missing content may thus be communicated in a peer-to-peer basis between the antennas 50 and 50'. The wireless communication network 14 may also distribute various portions of the content which are then communicated to various other intermediate devices in an intentional way rather than a "missing" way. If content is desired by the user of one intermediate device but is not available at that intermediate device, the intermediate device for the intentional request may request the content from another intermediate device within the peer-to-peer network. Further, some such intermediate devices 16' may be configured to not have an ability to receive content from wireless communication network 14, and be only able to communicate with other intermediate devices 16 and 16' to receive such "intentional" or "missing" content.

The intermediate device 16' may be in communication with a user device 80'. The user device 80' may be in communication with the intermediate device 16' through the antenna 50". The user device 80' may be configured in a similar manner to that set forth at the user device 80' but may be a wireless device rather than a wired connection as is illustrated with respect to the user device 80.

Figure 3:
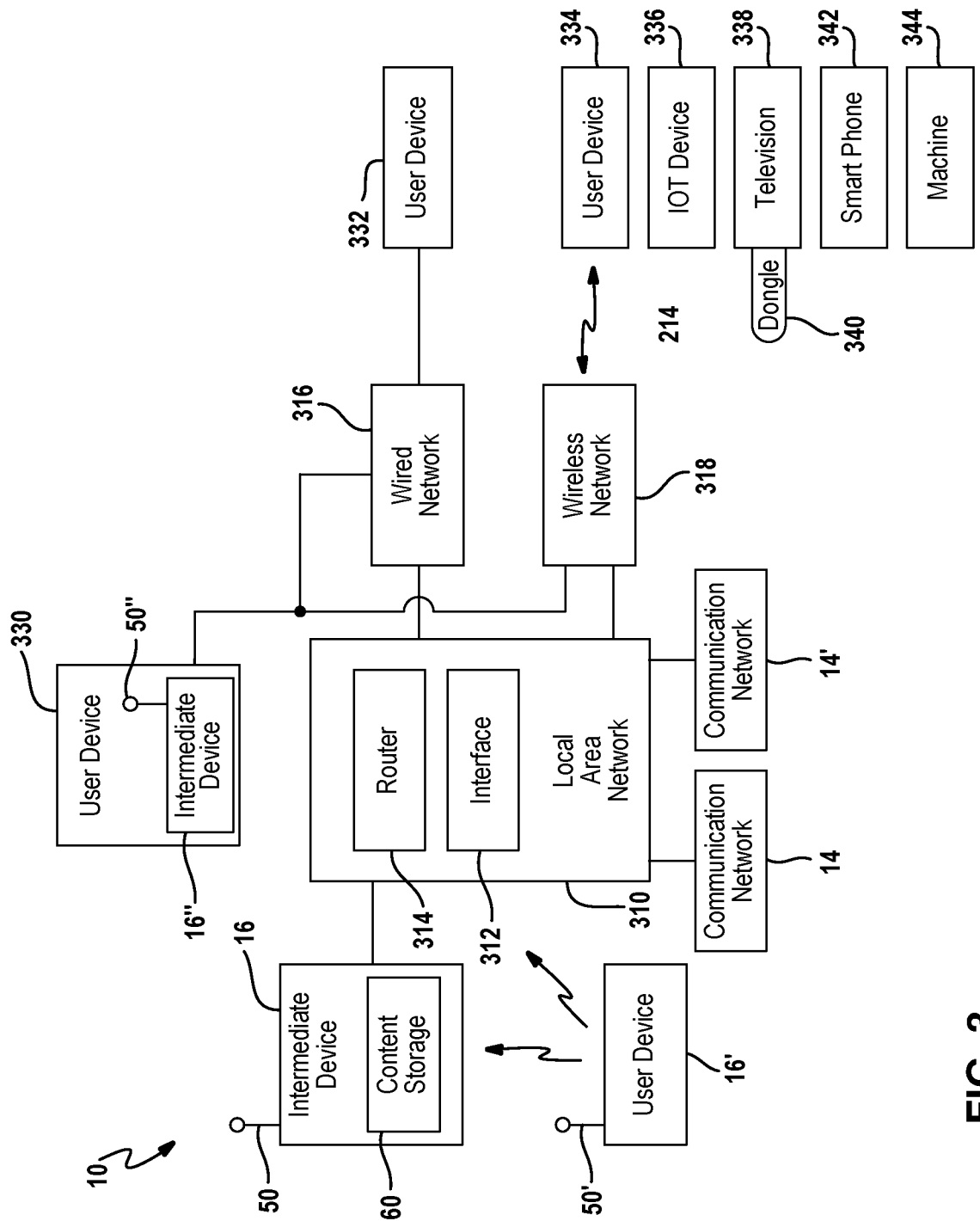
FIG. 3 is a block diagrammatic view of a plurality of user devices in a local area network.

Referring now to FIG. 3, the communication system provider 12 may be in communication with a local area network 310 through the communication network 14 as described above. Only the communication network 14 is illustrated for simplicity. FIGS. 1 and 2 do not illustrate the local area network 310. The local area network 310 may have an interface 312 for communicating with the communication network 14. The interface 312 may be a modem.

The local area network 310 may also be coupled to a second communication network 14'. The second network 14' may be the primary two way connection to the Internet for the user devices 332-344. The second network 14' may represent dial-up or a digital subscriber line. As described in the examples set forth herein, the system 10 may be used to preposition content in the intermediate device 16. The supplementation of content is particularly useful when the second communication network 14' for providing regular internet service to user devices 332-344 is slower than the speed of the communication network 14, although not necessarily. It is possible that the local area network 310 may not have a two way connection to the internet except the prepositioned content received through the communication system.

The local area network 310 may also include a router 314. The router 314 may be used for connecting the intermediate devices with user devices within the local area network 310. The local area network may provide both a wired network 316 and a wireless network 318. Various devices may take advantage of each method of communicating.

The local area network 310 is in communication with one or more intermediate devices 16 as described above. The local area network 310 may also include an intermediate device 16, along with an interface 312, and a router 314. The local area network 310 may also include a user device 332, along with an intermediate device 16, interface 312, and a router 314. The intermediate device 16 includes the content storage 60 and the antenna 50 as described in FIGS. 1 and 2. The intermediate device 16' is in communication with the local area network 310 and may exchange content or other signals with the intermediate device 16 through the local area network 310. An intermediate device 16" may also be located within a user device 330. The user device 330 or the intermediate device 16" therein may include an antenna 50"' for communicating with the local area network 310. The intermediate device 16" may receive content using the remnant capacity of the communication network 14. The user device 330 may be one of a variety of types of devices including a video game console, a cellular phone, a set top box or the like.

The user device 330 may be coupled to the local area network 310 through either the wired network 316 or the wireless network 318.

A user device 332 may be coupled to the local area network 310 through a wired network 316. The user device 334 may be coupled to the local area network 310 through a wireless network 318. As mentioned above, the user devices 332, 334 may be various types of user devices including a cellular phone or smartphone, a tablet, a laptop, a TV or the like.

An internet of things (IoT) device 336 may be coupled to the local area network 310 through the wireless or wired networks 316, 318. The IoT devices 336 may require software and application updates suitably delivered via remnant capacity.

A television 338 may also be coupled to the local area network 310 through the wired network 316 or the wireless network 318. The television 338 may be a smart television for directly coupling to the wired network 316 or the wireless network 318. However, the television 338 may also require a dongle 340 that is used for communication with the wireless network 318. The dongle 340 may have an application therein for providing the television 338 with a graphical user interface. The dongle 340 may also include a content storage for storing content therein. The dongle 340 may also act as an intermediate device for receiving and storing content.

A smartphone 342 may also be in communication with the wired network 316 and the wireless network 318 so that access to the local area network 310 may be obtained.

A machine 344 may also be in communication with the local area network 310 through the wired network 316 or the wireless network 318.

All of the user devices 330-344 may be in communication with the wireless network 318 using many different types of standards including Bluetooth and Wi-Fi. Each of the user devices 330-344 may receive content through the local area network 310 from at least one of the intermediate devices 16, 16' and 16". The application for retrieving and serving content to the user devices 330-344 may be in the devices 330-344, in the intermediate device 16, in the local area network 310, in the router 314 or in the interface 312.

The types of content may include audio content, video content, operating system updates, other software updates, applications, weather information, "best of web" content and e-delivery of various materials. The users of the user devices 330-344 may each obtain the various types of content from the content storage 60 of the intermediate device 16. The content may be obtained individually or simultaneously from the content storage 60. As will be described below, the user devices 330-344 may provide an inventory list or a list of desired content that is communicated through the local area network 310 and ultimately back to the communication system provider 12 of content service provider 90 illustrated in FIGS. 1 and 2. The communication back may be performed with either the communication network 14 or 14'.

Figure 4:
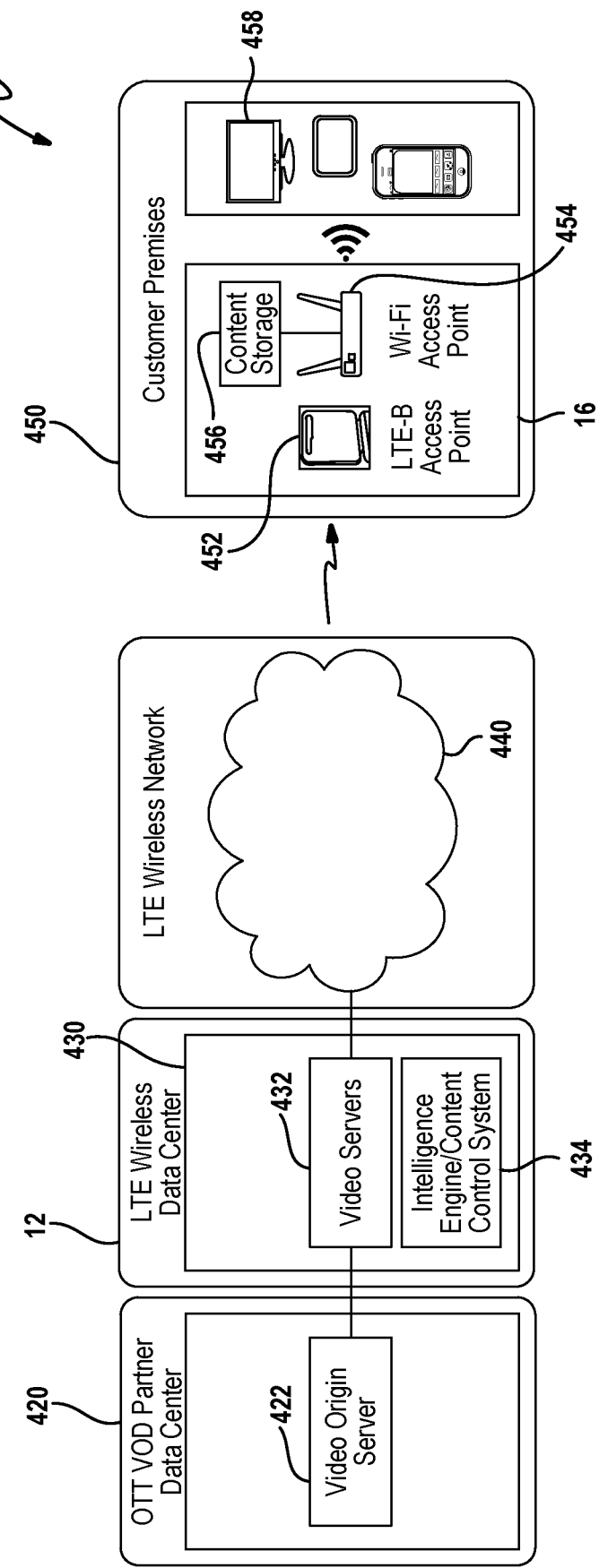
FIG. 4 is a high level block diagrammatic view of a communication system using an LTE wireless network.

Referring now to FIG. 4, an LTE content delivery system 410 is illustrated. In this example, the communication modules are specifically directed to an LTE system that provides an over-the-top video system. However, other cellular phone systems may be used. An over-the-top video on-demand partner data center 420 acts as the content service provider 90 and has a video origin server 422 disposed therein. The video origin server 422 receives video content from various sources including the sources set forth in FIG. 2. The partner data center 420 is in communication with the communication system provider 12. In this case, the communication system provider 12 is an LTE wireless data center 430. The LTE wireless data center 430 includes video servers 432 that are in communication with the video origin server 422. The wireless data center 430 is also in communication with an intelligence engine/content control system 434. The intelligence engine/content control system 434 may be used for various functions as will be described in detail below. The intelligence engine/content control system 434 may, in general, be used for identifying remnant capacity, including that of LTE wireless network 440, and scheduling the delivery of content to the intermediate devices, including using LTE wireless network 440. The intelligence engine/content control system 434 may also be responsible for managing the content at the intermediate devices by removing the content when necessary. The intelligence engine/content control system 434 may also be responsible for calculating the optimal amount of content, the frequency of such content re-distribution, and the relative timing of different content to be distributed by the LTE wireless network 440 and to be distributed to any intermediate device 16.

The video servers 432 of the wireless data center 430 is in communication with an LTE wireless network 440. The LTE wireless network 440 is in communication with a customer premises 450. The customer premises 450 may include an intermediate device 16. The intermediate device 16 may include an LTE-B access point 452 used for accessing the content at the wireless network 440. The access point 452 may also be used for receiving instructions for tuning to the wireless network 440. Specific instruction signals may be provided for tuning to content at specific times. Channels, frequencies and times may all be communicated in the instruction signals.

The intermediate device 16 may also include a Wi-Fi access point 454 and a content storage 456. The Wi-Fi access point 454 may establish a Wi-Fi network with the various user devices 458 within the system. The Wi-Fi access point may be referred to as a router. The content storage 456 may be used to store the content received through the LTE-B access point 452. Of course, other wireless technologies may be accessed by the wireless access point. Each of the user devices 458 may include an application for accessing the content within the content storage 456. The application may also be received through the access point 452 or it may be pre-stored within the content storage 456 when a user purchases the system. The application may also be pre-stored within the user devices 458.

Figure 5:
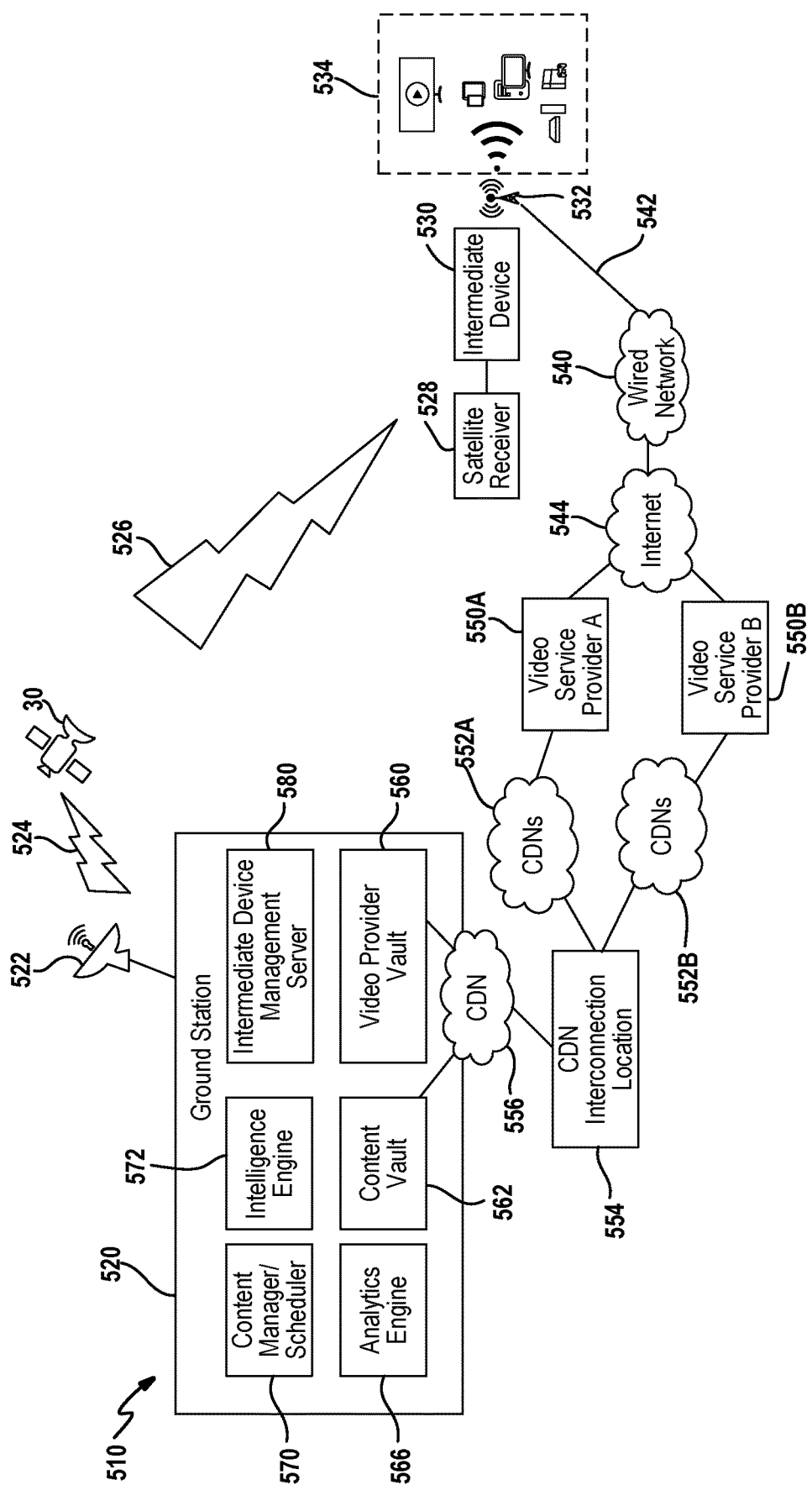
FIG. 5 is a block diagrammatic view of a remnant capacity communication system using a satellite.

Referring now to FIG. 5, a content provider system 510 based upon the satellite 30 is set forth. In this example, a ground station 520 communicates content to a transmitting antenna 522. The transmitting antenna 522 communicates content to the satellite 30 through an uplink 524. A downlink 526 communicates content to a satellite receiver 528 located at the customer premises or other user. The downlink 526 may be formed from signals from one or more transponders of the satellite 30. Multiple paths or beams may communicate to an intermediate device 530 or multiple intermediate devices. Of course, a single wide beam such as a continental United States beam (ConUS) may be used as well. The intermediate device 530 is in communication with the satellite receiver 528. The satellite receiver 528 may also be disposed within the intermediate device 530. The intermediate device 530 communicates content through a wireless network 532 to the user devices 534. The content from the ground station may be communicated using remnant capacity from resources that are not fully used at any predetermined time. The intermediate device communicates with a network 540 to provide a return link 542. The network 540 may be any type of network supporting an uplink including but not limited to cellular network, a satellite, a wireless network or a wired network. The network 540 may be in communication with the internet 544 which provides data to a first video service provider 550A or a second video service provider 550B. Various analytic data, content lists, preferences and the like may be communicated from the intermediate device 530 to the video service providers 550A, 550B.

The video service provider 550A may be in communication with a content delivery network 552A. The video service provider 550B may be in communication with a content delivery network 552B. The content delivery networks 552A, 552B may correspond to a business partner of the service. The content delivery networks 552A, 552B may communicate content to a content delivery network interconnection location 554 where the content is then communicated to a communication system provider content delivery network 556. The content delivery network 556 communicates content to the ground station 520 which may be part of the communication system provider 12. A video provider vault 560 may receive the content from the content delivery network 556. A second vault 562 may also receive content from the content delivery network. The vault 562 may store different types of content than that of the video provider vault 560. As mentioned above, the system may provide different types of data to the intermediate devices including software, video replaced, original video content, audio content and the like.

An analytics engine 566 is disposed within the ground station 520. The analytics engine 566 may receive feedback from the plurality of intermediate devices 530 disposed in the system. The analytic servers interpret the feedback from the intermediate devices for various aspects including usage trending, troubleshooting, preferences, demographics, behavioral data for advertising, pricing, intelligence engine performance and other analytic functions.

The vaults 560, 562 provide protected storage of video and metadata based upon content partner needs and various agreements.

A content manager/scheduler (CMS) 570 may be incorporated within the ground station 520. The content manager/scheduler 570 manages the schedule by which all content and commands are sent to the intermediate device including receiving content prioritization information from an intelligence engine 572 and creates the appropriate schedule for the broadcasting content, receiving intermediate device control messages from the intermediate device, management server and creating an appropriate schedule for broadcasting messages, instructing the servers to pull content from the content vault 562 and broadcasting the content according to the schedule. The CMS 570 may also generate commands for the intermediate device, instructing the intermediate devices to use specific tuners at specific times. The content manager/scheduler 570 also determines the remnant capacity based upon the content being broadcast through the system and forecasted content. The content manager/scheduler 570 enables the broadcasting of the content using the remnant capacity.

The intelligence engine 572 receives information from the various content partners determines the content available to be distributed and that the content is available to be distributed at the vaults 560, 562. The intelligence engine 572 also may schedule the removal of content previously delivered to the intermediate devices for removal. The intelligence engine 572 may also monitor the intermediate devices and the amount of content storage available on each intermediate device. Different partners may be associated with the ground station 520. That is, the data may be retrieved from the intermediate devices on a partner-by-partner basis so that the content may be scheduled accordingly. The intelligence engine 572 may also specify the times and the periodicity for broadcasting and rebroadcasting content. As will be described below, the carousel used for broadcasting the content using the satellite may be regulated using the intelligence engine 572. The ground station 520 includes an intermediate device management server 580. The intermediate device management server is responsible for the management of the intermediate devices at the customer premises. The intermediate devices generate secured management messages for the intermediate devices and monitor the utilization and health of the intermediate devices. The allocation of storage may be managed by the intermediate device management server based upon various partner agreements. The intermediate device management server 580 also manages the remote configuration, authentication and troubleshooting for the intermediate devices.

Figure 6:
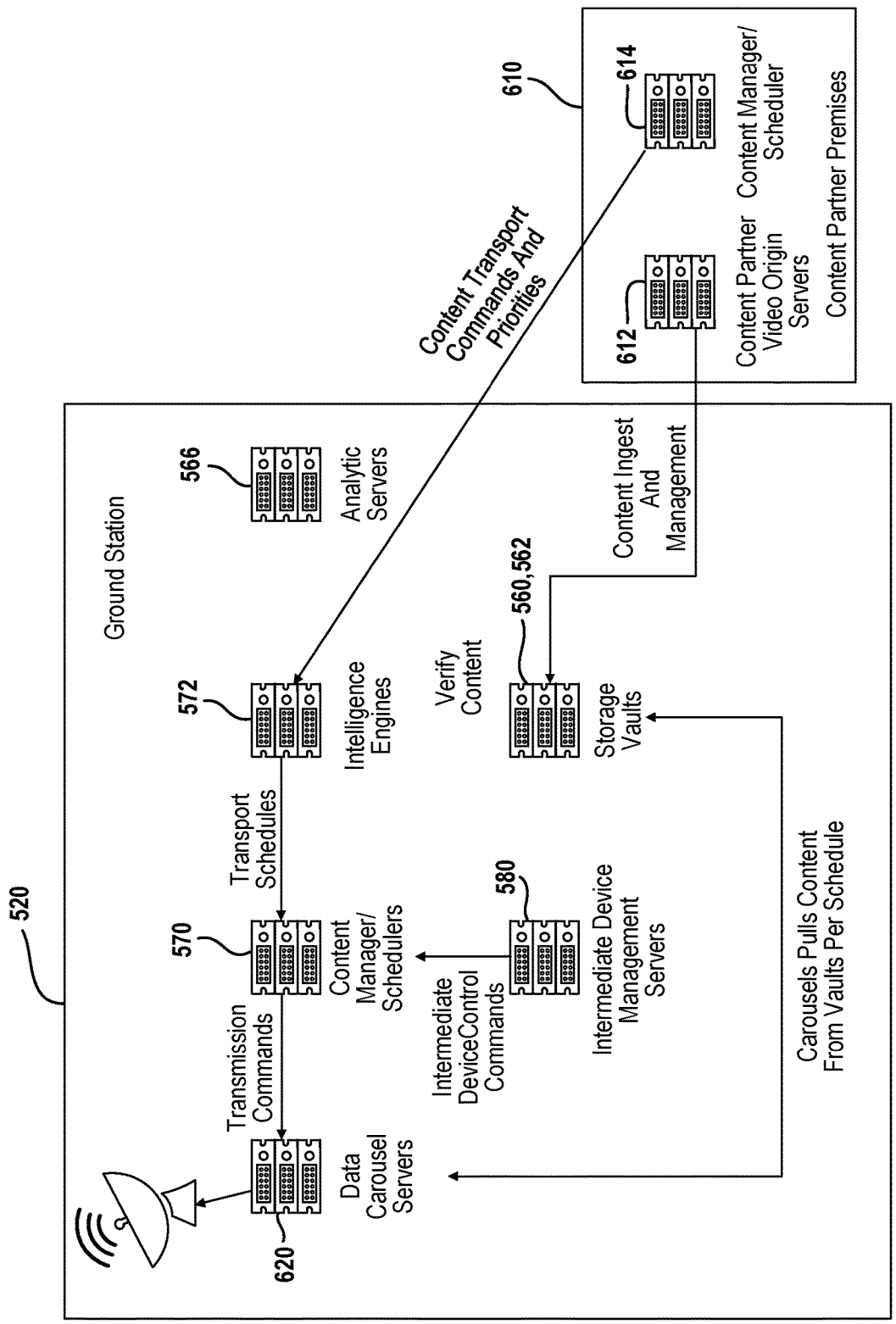
FIG. 6 is a block diagrammatic view of a satellite ground station used in FIG. 5.

Referring now to FIG. 6, a ground station 520 similar to that set forth in FIG. 5 is set forth with the same reference numerals. The ground station 520 may be in communication with a content partner premises 610. The content partner premises 610 may include the content partner video origin server 612 and a content manager/scheduler 614.

Figure 7:
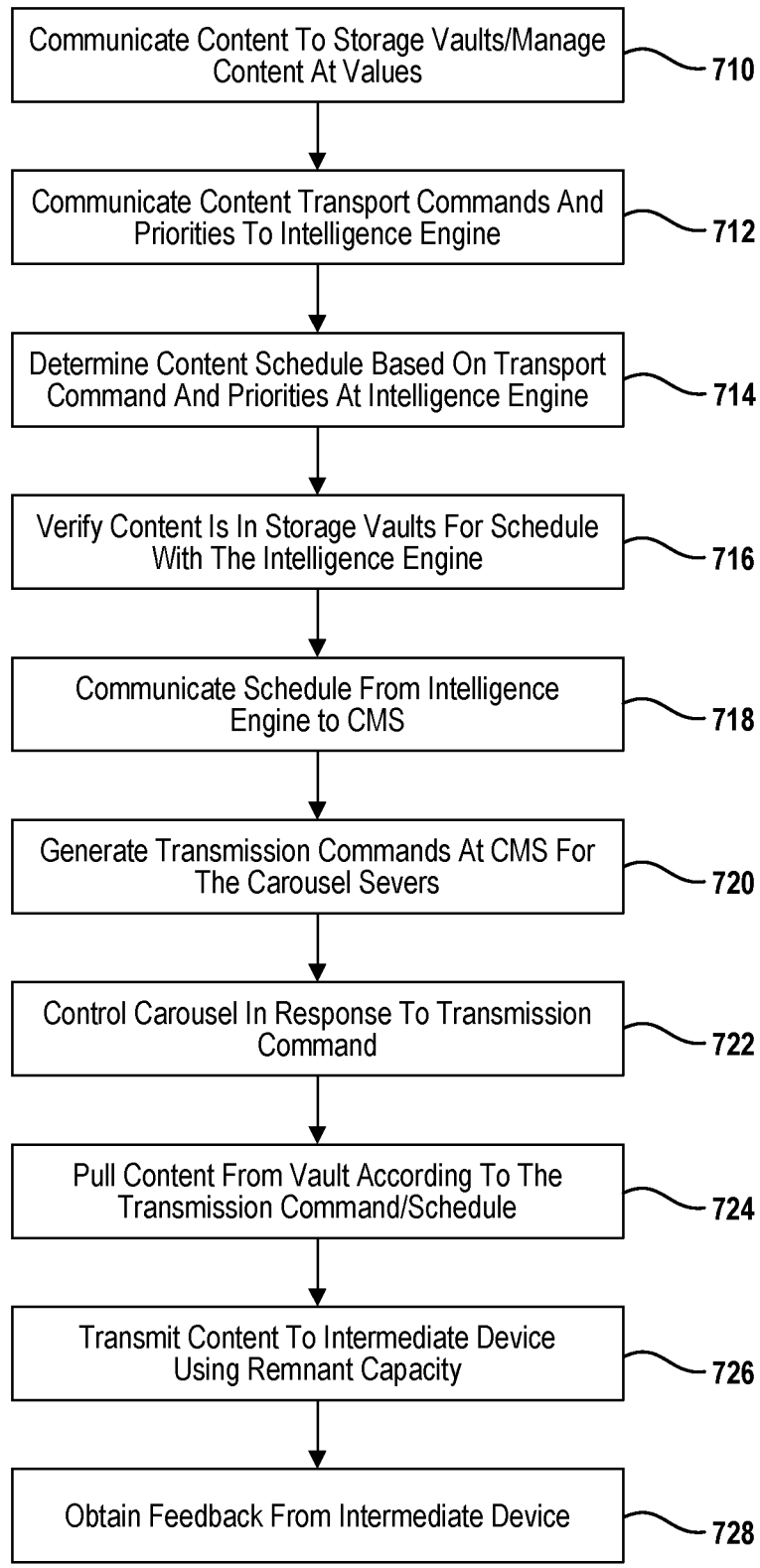
FIG. 7 is a flow chart of a method for communicating content to an intermediate device using remnant capacity.

Referring now also to FIG. 7, the ground station 520 may include a plurality of data carousel servers 620. The operation of the ground station 520 relative to the content partner premises 610 is set forth in FIG. 7. In step 710, the content is communicated to the storage vault and the content is managed at the storage vaults 560, 562 from the content partner video origin server 612. The storage vaults 560, 562 store the content therein. From CMS 614, content transport commands are communicated with priorities to the intelligence engine 572 from the content manager/scheduler 614 of the content partner premises. In step 714, a schedule for the distribution of the content is determined based upon the transport command and the priorities at the intelligence engine 572. The priority may be increased by payment from a partner provider. In steps 716, the content that is stored within the vaults is verified for the content schedule by the intelligence engine. That is, the intelligence engine 572 determines whether the vault contains the content for the schedule. In step 718, the schedule is communicated from the intelligence engine 572 to the content manager/scheduler (CMS) 570 of the ground station 520. In step 720, transmission commands are generated at the CMS 570 and communicated to the carousel servers 620. The carousel servers 620 are controlled in response to the transmission commands in steps 722 and format multiple paths. The repetition rate, the number of servers dedicated to a particular content and the bitstream may all be established with the transmission command so that the carousel servers are controlled in response thereto. When it is time for distributing the content, the carousel servers 620 pull the content from the appropriate vault according to the transmission command or the schedule associated with the transmission command in step 724. In step 726, the content is transmitted to the intermediate devices using the remnant capacity as determined by the intermediate device management server 580.

The content partner premises or the ground station 520 may receive feedback from the individual intermediate devices including usage trending, troubleshooting, preferences, demographics, behavioral data for advertising, pricing, intelligence engine performance and other analytic functions, including but not limited to delivery acknowledgements, delivery feedback information, quality of service and air interface channel quality metrics The feedback is used to ultimately form the schedules and the different types of content that may be provided including various types of advertisements for the different systems.

Figure 8A:
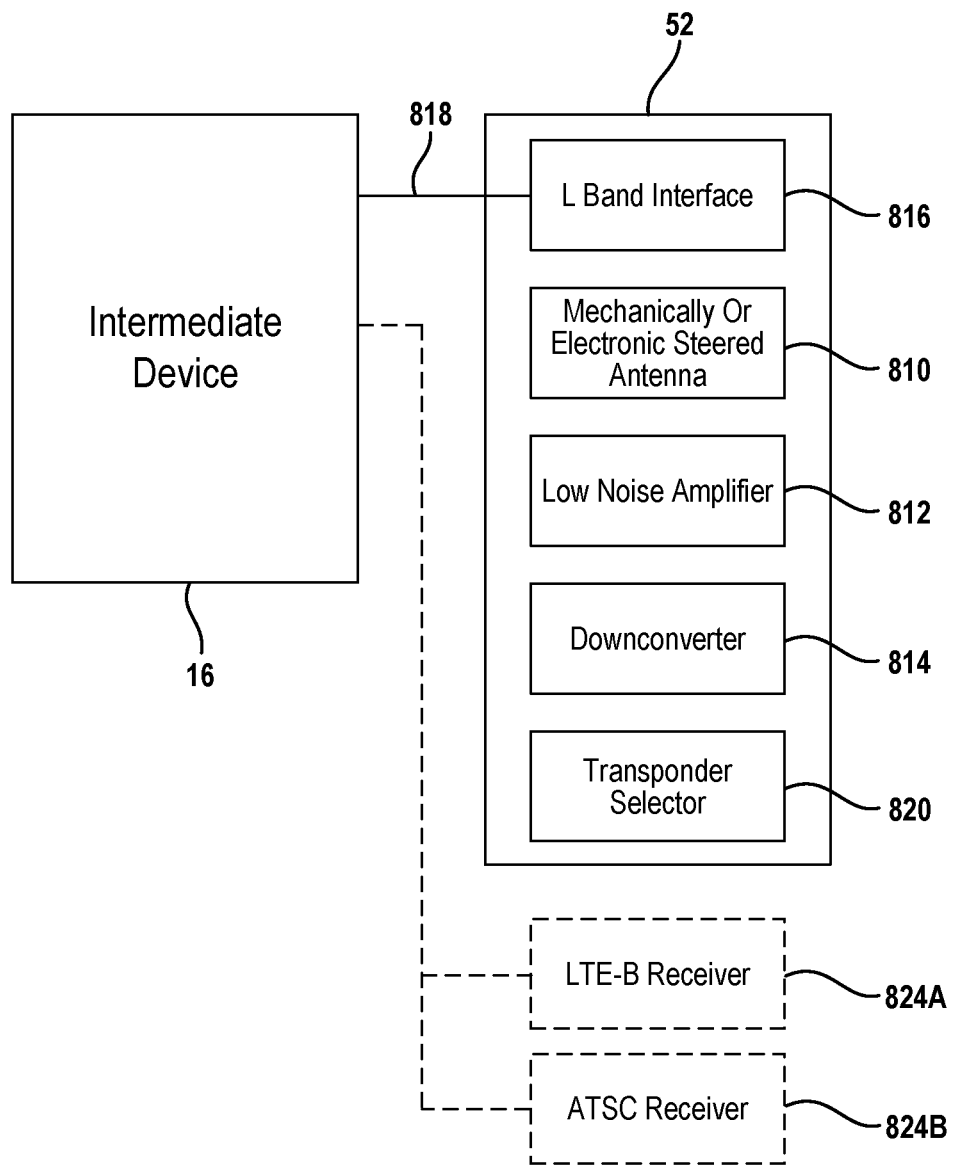
FIG. 8A is a block diagrammatic view of the outdoor unit of FIG. 1.
Figure 8B:
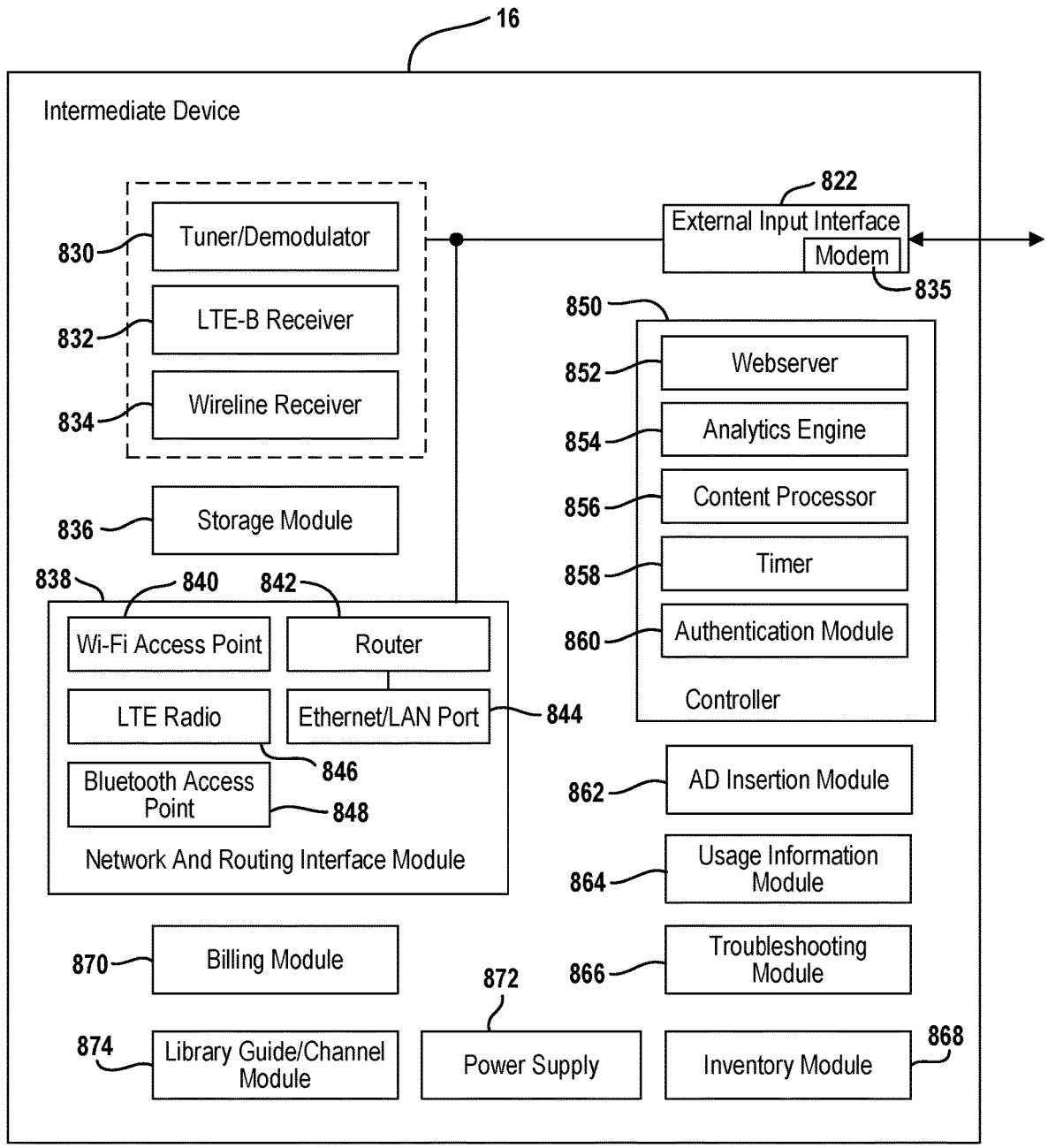
FIG. 8B is a block diagrammatic view of the intermediate device.

Referring now to FIGS. 8A and 8B, the intermediate device 16 relative to the outdoor unit system 52 are illustrated in further detail. The outdoor unit system 52 includes an antenna 810 that is mechanically or electronically steered. The antenna 810 may be a small size such as a 45 cm or 75 cm parabolic dish. A flat planer antenna may also be used and mounted flat on a rooftop, awning or on a vehicle. The antenna 810 may, for example, contain single, polarization, a single band wide aperture device or a dual polarization self-aiming adaptive array to allow the satellites to be followed. A parabolic antenna may be motorized to physically move to track the antenna flight path. If a phased array antenna is used, the phased array antenna can be electronically steered to view the satellite. The antenna is coupled to a low noise amplifier. That is, the satellite signals received at the antenna 810 are communicated to a low noise amplifier 812 to electronically amplify the signal. A down converter is used for down converting the received signals to L-band for transmission over a coaxial line. The down converter 814 communicates signals to the L-band interface 816.

The outdoor unit 52 may also include a transponder selector 820. The transponder selector 820 may be used for tuning to the proper transponder of the satellite for which content is to be received. As mentioned above, the various data including the time may be provided by the intelligence engine of the ground station. The signal may be received at the transponder and the transponder selector 820 tunes the antenna in response thereto.

The outdoor unit 52 includes a coaxial L-band interface 816 that may provide a powered connection to the outdoor unit 52. The L-band interface 816 may receive the L-band signal transmitted through the coaxial cable 818. Although an "L-band" signal is described, various other types of interfaces to various types of antennas and various frequencies may be used. Outside of a satellite system, a television antenna or an LTE antenna may be used and interface with the interface 816. The interface 816 may thus be configured to receive LTE-B (eMBMS or MBSFN) or may interface with an LTE-B receiver 824A or an ATSC receiver 824B for receiving over-the-air television signals with remnant capacity. The ATSC receiver 824B may be an ATSC 3.0 receiver. Thus, the intermediate device 16 may have a tuner demodulator 830 for tuning to and demodulating the signal received over the external input interface 822. The tuner demodulator 830 may tune and demodulate the L-band signal or an ATSC signal received through the input interface 822. The tuner demodulator 830 may also have error correction therein such as forward error correction (FEC). The intermediate device 16 may also have an LTE-B receiver 832 for receiving external inputs from the interface 822. The LTE-B receiver receives the broadcast signals over an ATSC system. A wireline receiver 834 may be used to receive networking traffic. The wireline 834 receiver may be a USB or HDMI interface.

The external interface 822 may also represent a connection to the Internet 18 through the wired or wireless communication network. That is, the external interface 822 may comprise a modem 835 for communicating content to the intermediate device 16.

The intermediate device 16 includes a storage module 836 that is used to store content therein. The storage module 836 may include solid state devices or a hard disk drive.

A networking and routing interface 838 may include various network and routing access points. For example, a Wi-Fi access point 840 may be used to interface with a router 842. However, the router 842 may also be used for wired communications using the Ethernet/LAN port 844. The networking and routing interface 838 may include an LTE radio 846 for communicating LTE radio signals from the device. The LTE-B receiver 832, as well as the LTE radio 846, may be incorporated into a signal unit. The intermediate device 16 may also communicate using Bluetooth. That is, a Bluetooth access point 848 may be incorporated into the network and routing interface module 838.

The intermediate device 16 may include a controller 850. The controller 850 may perform many functions, including as a web server 852, an analytics engine 854 and a content processor 856. Although individual interconnections are not illustrated in FIG. 8B, the controller may control the underlying timing and functions of the various modules within the intermediate device. The web server 852 may communicate content from the intermediate device in an IP format. The controller 850 may also tune to the data at predetermined times as determined by the timer 858. The timer 858 may be synchronized with various other intermediate devices within the system using GPS or internet-based time standard. The content processor 856 tunes to receive the content at predetermined times, manages the storage of the content, verifies the integrity of the stored content and receives and manipulates manifest files which provide instructions for downloading the content. The analytics engine 854 handles the intermediate device-based analytic functions for the system.

Neighboring intermediate devices may also receive and transmit from the intermediate device 16. The network and routing interface 838 may communicate with other intermediate devices for receipt of content, content chunks or missing content at the storage module 836. Missing content may occur when network errors, hardware errors or weather prevent the content from being received at the storage module 836. Communication with other intermediate devices may take place using the web server 852 using an internet protocol.

The network and routing interface 838 may communicate a request signal to the communication system provider 12 or the content service provider 90 to request content chunks or missing content at the storage module 836. The communication system provider may communicate the requested content in a unicast manner using remnant capacity to the requesting intermediate device. A complete broadcast retransmission may also be performed in response to the request. Retransmission may occur if a significant number of intermediate devices request particular content.

An authentication module 860 may also be included within the controller 850. The authentication module 860 may communicate authentication signals to the communication system provider or for the content service provider so that the devices may intercommunicate properly. An unauthorized device may not be able to receive content from the communication system provider.

An ad insertion module 862 may be used for inserting ads at predetermined times during a broadcast. The ad insertion module 862 may splice ads based upon user preferences that are predefined. The ad insertion module 862 may act in response to a trigger for inserting advertisements that may be stored within the storage module 836.

A usage information module 864 may provide the communication system provider 12 or the content service provider 90 with information as to the usage of various information and programming within the intermediate device 16. By providing the usage information, content of interest may be communicated to the intermediate device 16. Usage information may also be data related to monitoring the utilization of the network that communicates the signals to the intermediate device 16.

A troubleshooting module 866 is used for transmitting troubleshooting information over the outbound signals to the analytics engine for analysis to identify problems with sourcing video files or the installation of the intermediate device 16.

An inventory module 868 stores an inventory of the content stored within the storage module 836. The inventory module 868 may also be used to remove content that has expired per the metadata received with the content. After the content expires, the inventory module 868 removes the content to free space within the storage module 836.

A billing module 870 may transmit billing information from the intermediate device 16 to the content service provider 90. The billing module 870 may collect viewed content and other information to provide billing to the owners of the intermediate device 16. The billing module 870 may also report inventory data from the inventory module 868 to the intermediate device.

The intermediate device 16 may also include a power supply 872 for powering the various modules therein.

The intermediate device 16 may also include a library guide/channel module 874. The library guide/channel module 874 will be described in further detail below. The library guide/channel module 874 may be used to assemble a program guide or virtual channel based upon the contents stored within the storage module 836. The operation of the library guide/channel module 874 will be described in more detail below. However, the intermediate device 16 may be used to formulate a virtual channel or multiple virtual channels as a series of content for displaying a user interface associated with the user device. In this manner, a familiar grid guide with a plurality of content may be selected by the user. Other types of guides such as a poster guide may also be formed from the library guide with content grouped according to a "channel." A channel may correspond to a typical broadcasting network that provides content to an underutilized area that has no capacity to otherwise receive the linear television channel or the content associated therewith.

Figure 9:
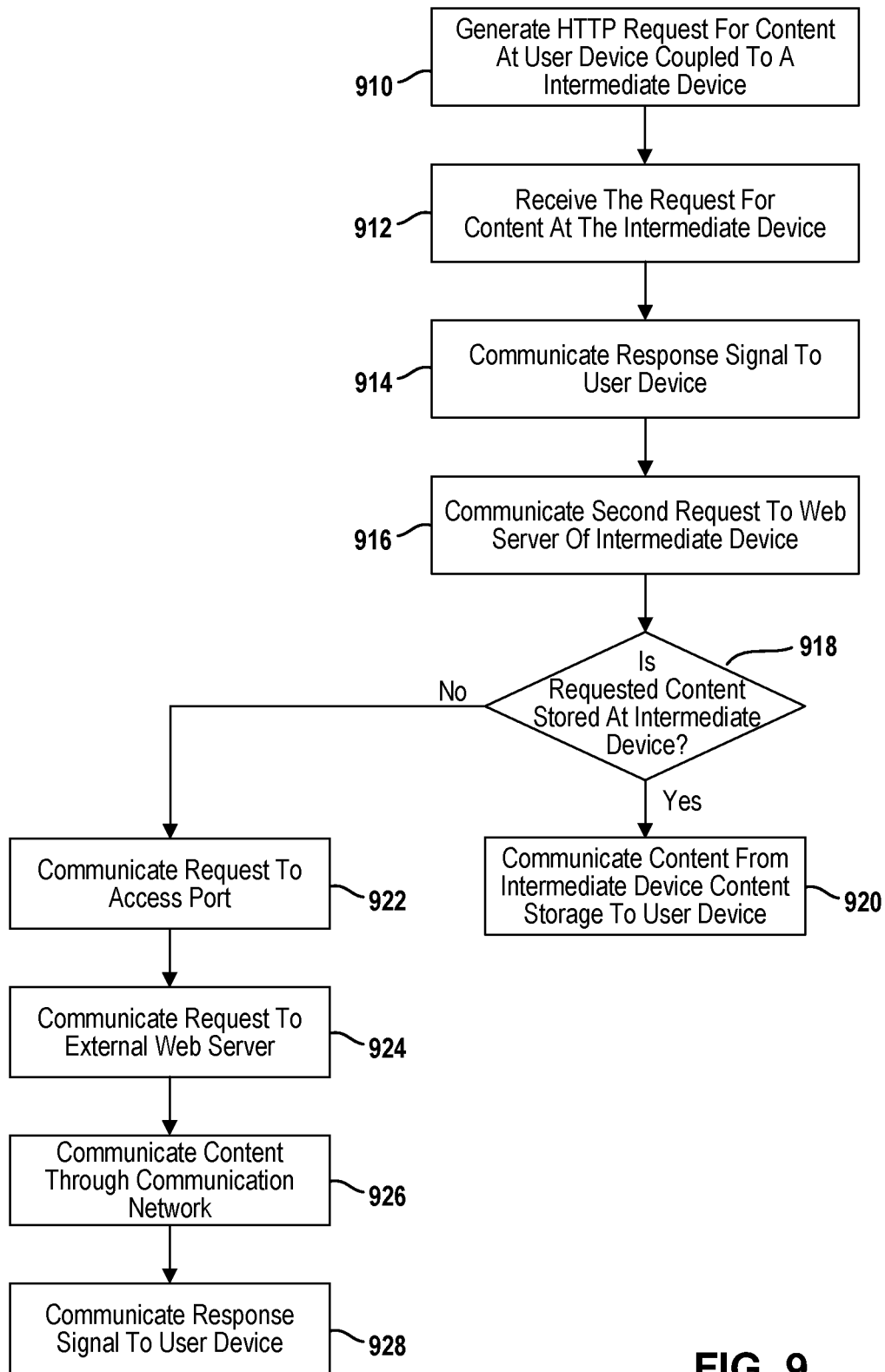
FIG. 9 is a flowchart of a method for redirecting requests from the user device to the intermediate device.

Referring now to FIG. 9, a method for redirecting requests at the intermediate device is set forth. In step 910, a request is received at the intermediate device from a user device, whether coupled to the intermediate device 16 through a local area network 310 or embedded in the intermediate device. The request may come from an application stored within the user device. In step 912, the intermediate device receives the request for content and redirects the user device to contact the web server. That is, in step 914, a response signal is communicated to the user device with the IP address of the intermediate device web server. In step 916, a second request for content is communicated to the web server of the intermediate device. In step 918, it is determined whether the content is stored at the intermediate device. If the content is stored at the intermediate device, content is communicated to the user device through the local area network or the direct connection from the intermediate device to the user device. In step 918, if the requested content is not stored at the intermediate device, step 922 may communicate a request through a port of the intermediate device to the content service provider 90 illustrated in FIG. 2 in step 924. The content may be provided through the communication network in step 926. In many cases, the content may be communicated in near real time or as soon as possible to the intermediate device. The content may also be queued for later delivery to the intermediate device. That is, the content may not be communicated until enough requests for the content may be provided. In step 928, a response signal from the content service provider 90 is illustrated in FIG. 2. The response signal in step 928 may also provide a time, transponder if applicable, and a communication channel or time. The intermediate device may store such subsequently communicated content from the content service provider 90 in the content storage of the intermediate device 16, so subsequent requests for such content from user devices can be served directly from the intermediate device 16, instead of needing to be acquired from the content service provider 90 using a communication network.

The steps of directing and redirecting 914-922 make take place using a domain name server (DNS) associated with the web server of the intermediate device, and/or a web server associated with the communication system provider or the content service provider.

Figure 10:
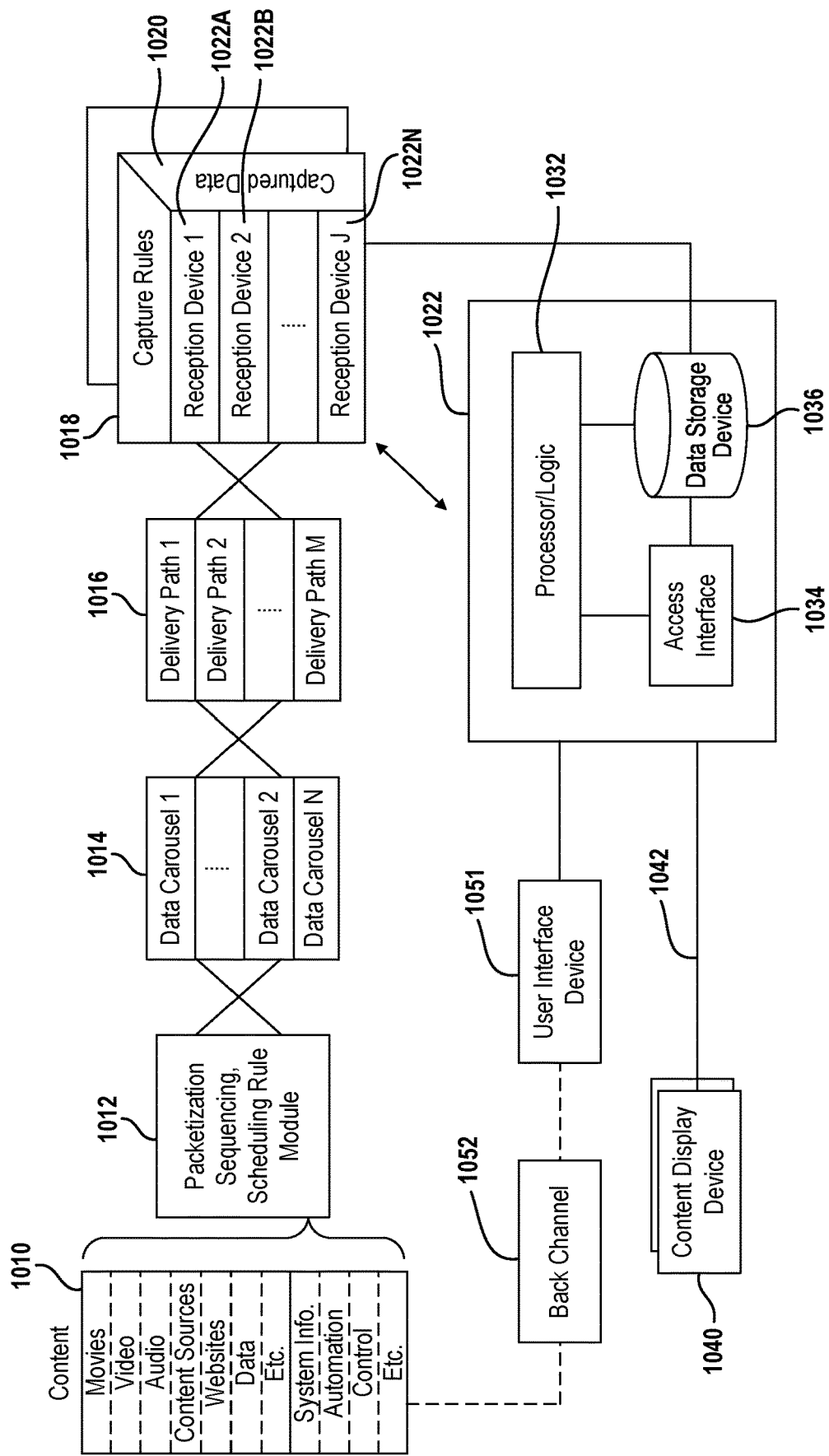
FIG. 10 is a block diagrammatic view of a non-real-time content delivery system.

Referring now to FIG. 10, a high level block diagrammatic view of a simplified system is set forth. Content in block 1010 may include movies, video, audio, content sources, websites, data, etc. The content may also provide system information, automation information and control information. Various types of content are provided to a packetization, sequencing and scheduling rule module 1012. The packetization, sequencing and scheduling rules are used to fill a plurality of data carousels 1014 with data and communicate the content to fulfill the schedule. The scheduling rules may provide the data carousel 1014 with time periods for broadcasting using the remnant capacity of various types of delivery paths. A plurality of delivery paths 1016 such as satellite broadcasting over the air, ATSC broadcasting, cable broadcasting and the like may be used for communicating content, including prioritizing use of one such delivery path 1016 for delivery of certain data carousels 1014 or certain content within a data carousel 1014 over use of another such delivery path 1016 for delivery of the other carousels 1014 or content. Various capture rules 1018 are used to capture the captured data 1020 at various reception devices or intermediate devices 1022A-1022N. The capture rules may be communicated as control content from block 1010. That is, various capture rules including the content to be captured, the time to be captured, a transponder to be captured from, and other data may be used as the capture rules. The intermediate devices 1022A-1022N may be intermediate devices as described above. The intermediate devices 1022A-1022N for different customers may be programmed differently. That is, the intermediate devices 1022A-1022N may have different capture rules and each intermediate device may capture different captured data 1020.

The intermediate devices 1022A-1022N are collectively referred to as an intermediate device 1022. Each intermediate device 1022 may have processor logic 1032 therein. An access interface 1034 allows the intermediate device 1022 to access various interfaces for receiving and transmitting data therefrom. A data storage device 1036 stores data within the reception devices for eventual playout at a content display device 1040. The content display device may be communicated to the intermediate device 1022 using a connection 1042. The connection 1042 may be a network connection or a direction connection. The connection 1042 may, for example, be a home network, a Wi-Fi network, an HDMI cable, a USB cable, Bluetooth or the like.

The intermediate device 1022 may also use a user interface device 1051 for generating a back channel 1052 to control the content that is provided from the content service provider 90 or the communication system provider 12. The user interface device 1050 may be various types of devices such as a remote control, a smartphone or the like. The back channel 1052 may be an internet path, a phone path or various other types of wired or wireless paths. The back channel may be through one of the communication networks 14 or 14'. A return satellite path may also be used. The back channel may also use the remnant capacity of one of the types of terrestrial networks described above. For example, the remnant capacity of an LTE system may be used.

Figure 11:
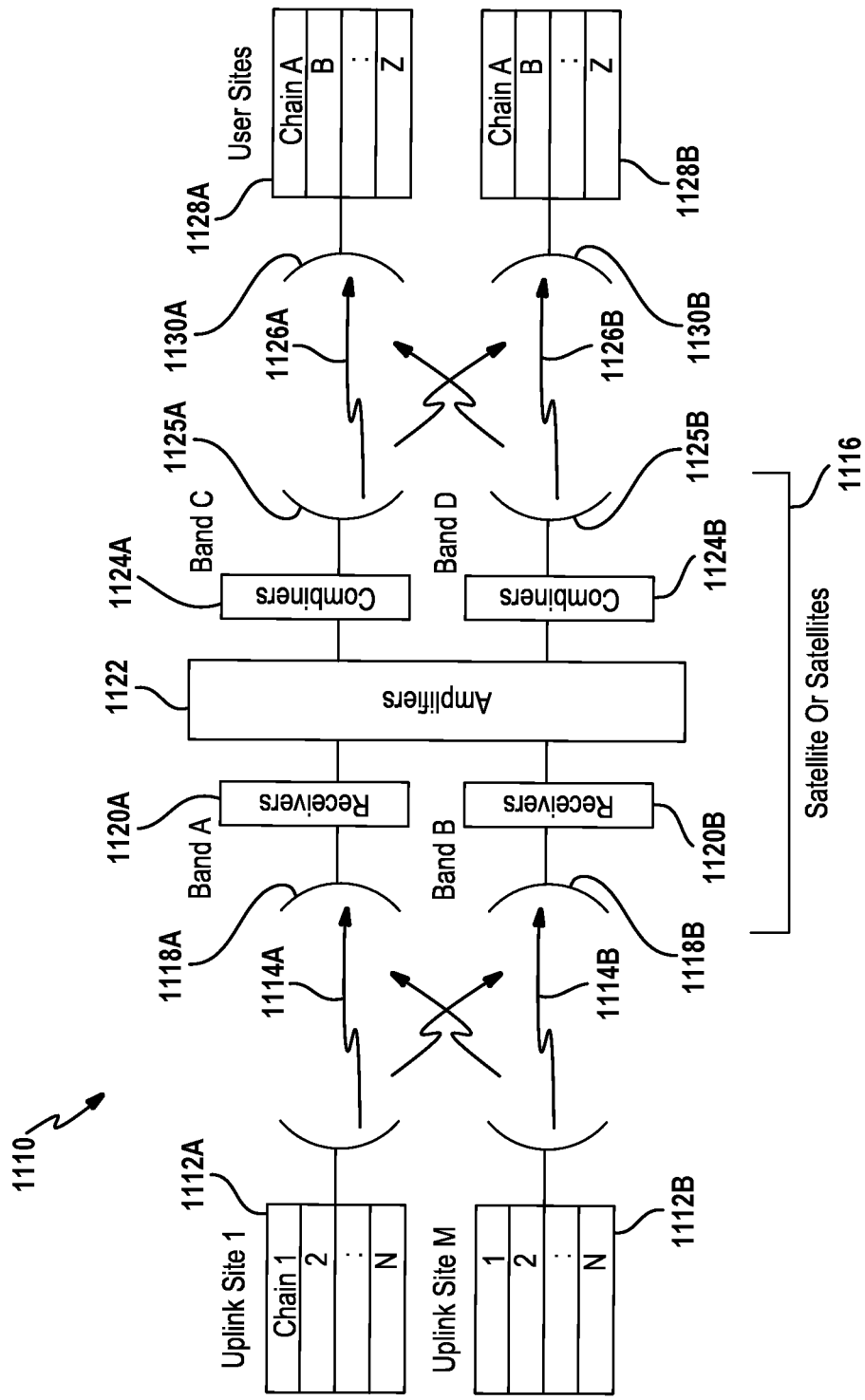
FIG. 11 is a block diagrammatic view of a satellite implementation of a non-real-time content delivery system.

Referring now to FIG. 11, a satellite broadcast implementation 1110 is set forth. Various uplink sites 1112A and 1112B may be used for uplinking content to a satellite. The uplink sites generate uplink signals 1114A, 1114B. The uplink signals 1114A, 1114B are received by a satellite 1116 through a first receiving antenna 1118A and a second receiving antenna 1118B. The first antenna 1118A may correspond to a first frequency band B and the second antenna 1118B may correspond to a second frequency band A. A plurality of receivers 1120A and 1120B receive the uplink signals 1114A and 1114B where they are converted to a different frequency for transmission through the satellite 1116 at the receivers 1120A and 1120B. Amplifiers 1122 amplify the signals. The amplifiers 1122 may be travelling wave tube amplifiers. A plurality of combiners 1124A and 1124B combine the signals from the various amplifiers for transmission through downlink antennas 1125A, 1125B that generate downlink signals 1126A and 1126B. The downlink signals 1126A and 1126B may be frequency and geographic dependent. That is, various frequencies may be used in adjacent signals so that interference between the downlink signals 1126A and 1126B is not formed. Various user sites that represent intermediate devices or other user devices 1128A and 1128B receive various chains from the downlink signals received by the downlink antennas 1130A and 1130B. The antennas 1130A and 1130B may be tracking antennas for tracking the positions of the satellites if middle or lower orbit satellites are used. Certainly, remnant capacity of geostationary satellites may be used so that tracking antennas are not required.

Figure 12:
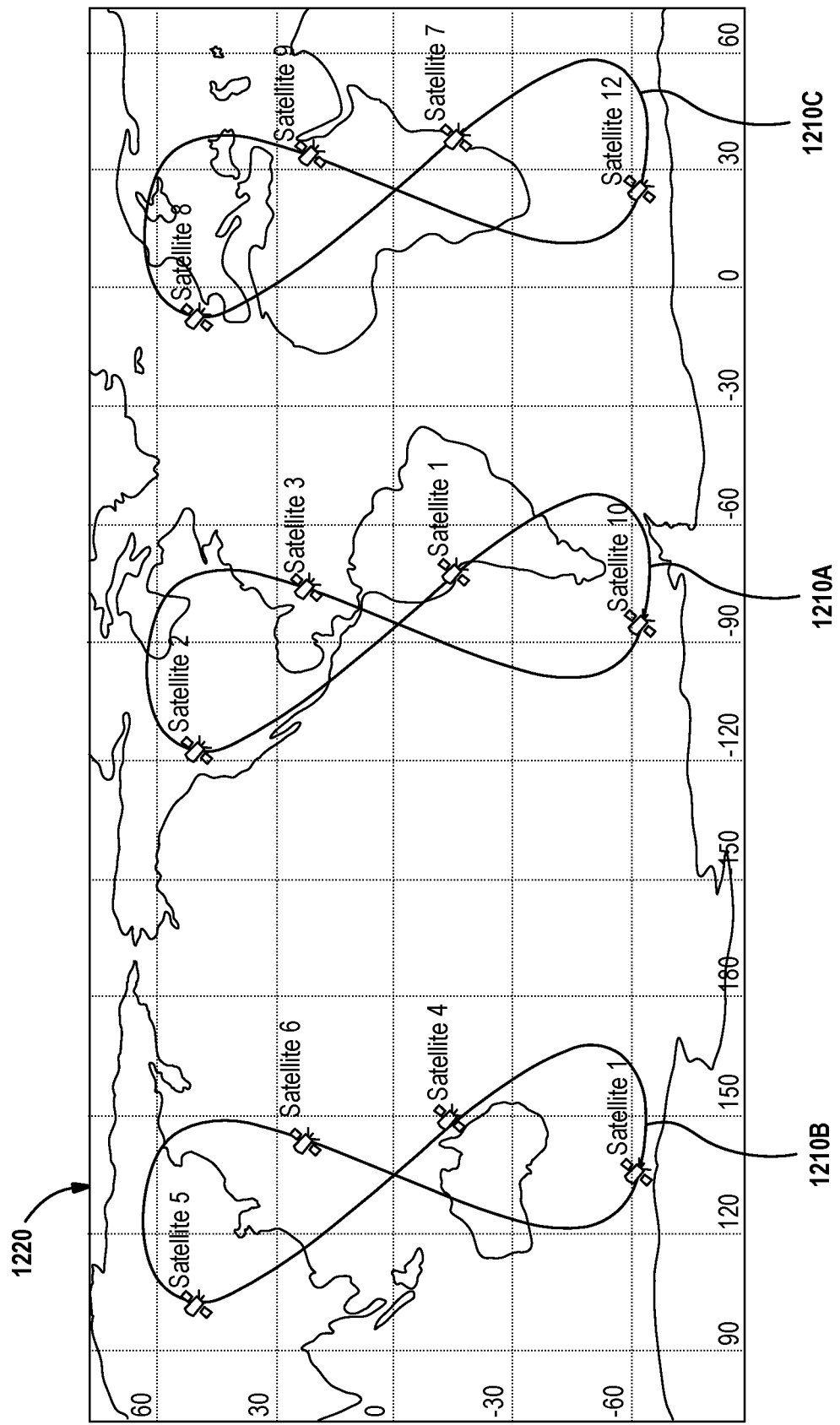
FIG. 12 is a view of three satellite ground traces used for the content delivery system.

Referring now to FIG. 12, the ground tracks of the system relative to the Earth 1220 are illustrated in further detail. In this example, a ground track 1210A has a first satellite Satellite 1, a second satellite Satellite 2 and a third satellite Satellite 3. A second ground track 1210B has a fourth satellite Satellite 4, a fifth satellite Satellite 5 and sixth satellite Satellite 6. A third ground track 1210C has a seventh satellite Satellite 7, an eighth satellite Satellite 8 and a ninth satellite Satellite 9. The satellites 1-9 may be used in an initial deployment of the satellite system. Satellites 10, 11 and 12 may be added to further expand the operating characteristics of the system. The ground traces are formed by inclined orbital satellite systems. The satellite system is a non-geostationary orbit satellite system with geosynchronous periods that can cover two north-south zones. By providing higher elevation angles for the ground terminals, better coverage and more constant coverage for the ground served by the satellites is provided. Frequencies used for uplinking and downlinking may be portions of the Ka and Ku bands. Both right hand circularly polarized and left hand circularly polarized antennas may be used for both transmitting and receiving. By providing three sets of ground traces as illustrated in FIG. 12, three different regions of the Earth can be covered. In an initial deployment, Satellites 1-3 may be used to cover both North America and South America. Eastern Asia and Australia may be covered with Satellites 4-6. Africa and Europe may be covered with Satellites 7-9. However, should the capacity or desired maximum elevation angle require the additional satellites, satellites 10-12 may be added to the system.

Figure 13:
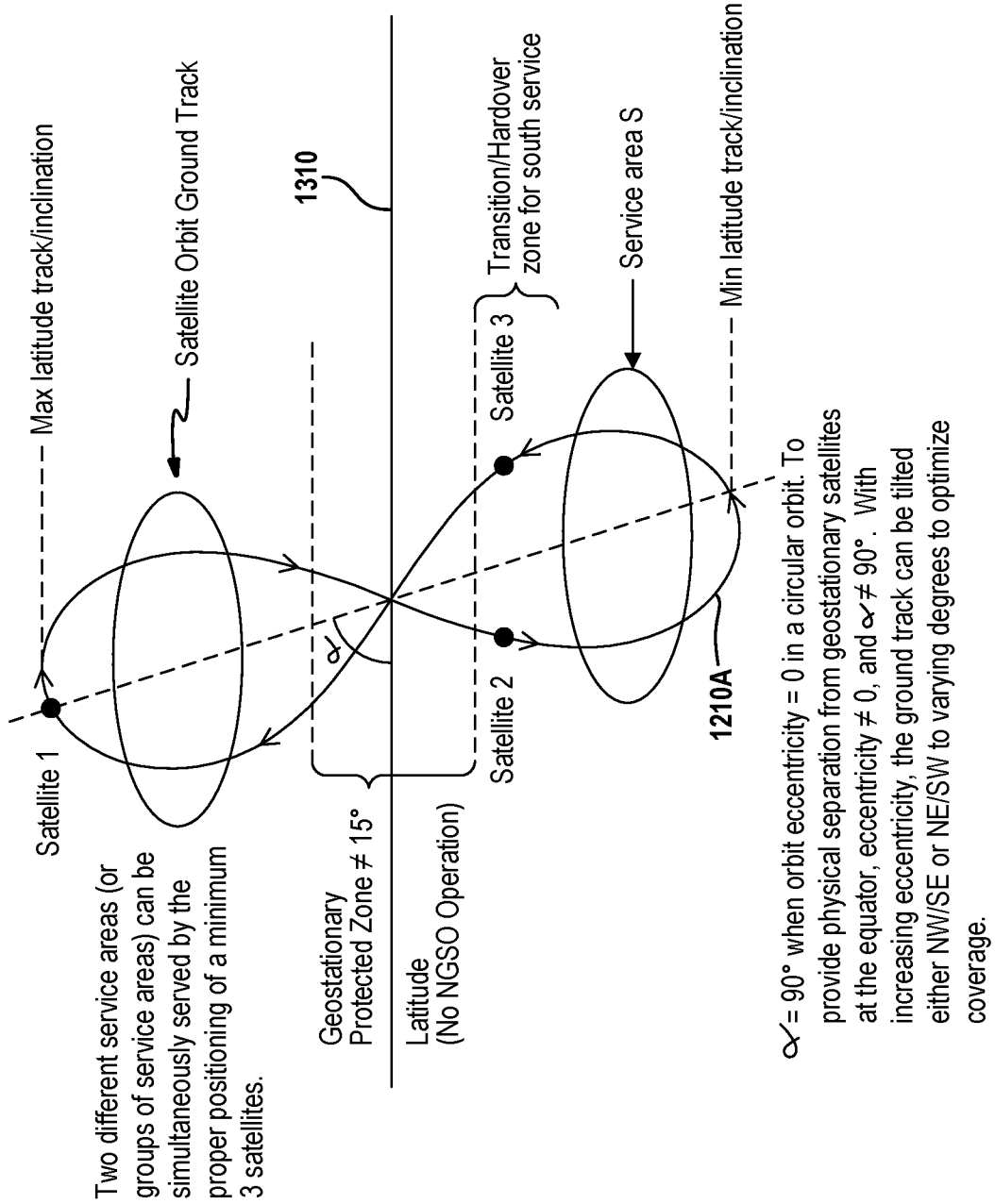
FIG. 13 is an example of a ground trace having various parameters associated therewith.

Referring now to FIG. 13, the ground trace 1210A is illustrated in further detail. A geostationary protective zone of 15° north and south of the equator may be provided so that interference with other satellites is not present using the system. Two different areas north and south of the equator can be served by positioning the three satellites in the illustrated configuration. Angle α is 90° when the orbit eccentricity is zero in a circular orbit. To provide a physical separation for geostationary satellites at the equator, the eccentricity is no zero and therefore the angle α is not 90°. With increasing the eccentricity, the ground track can be tilted northwest, southeast or northeast-southwest to vary the degrees of optimization coverage. The equator is represented as line 1310 in FIG. 13. As the satellites traverse the orbit, one satellite is rising while the other is setting in each of the upper hemisphere and lower hemisphere.

Figure 14A:
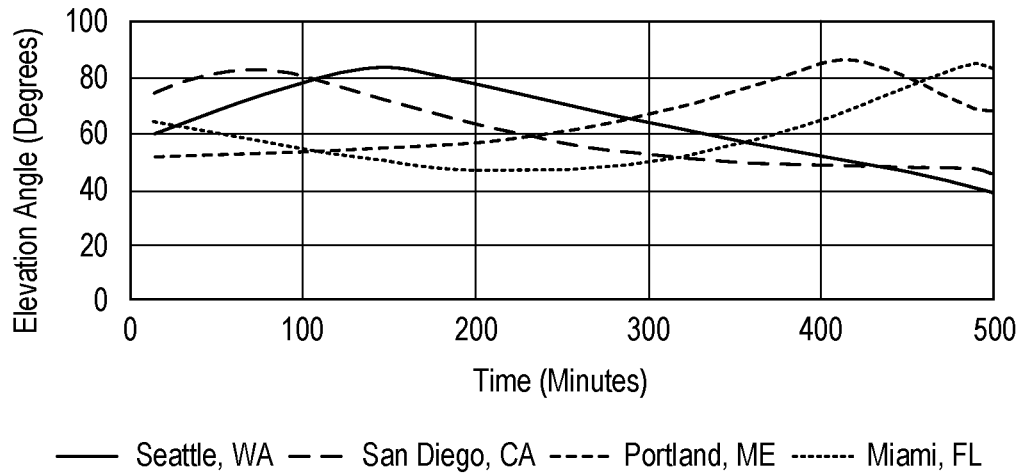
FIG. 14A is an elevation angle vs. time plot for four cites; Seattle, San Diego, Portland and Miami.
Figure 14B:
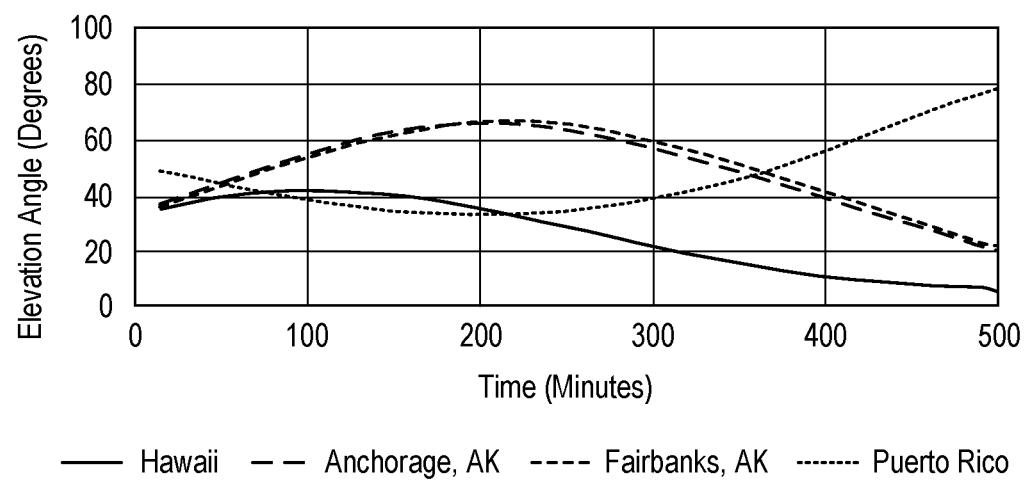
FIG. 14B is an elevation vs. time plot for further reaches of the content delivery system; Hawaii, Anchorage, Ak., Fairbanks, Ak. and Puerto Rico.

Referring now to FIG. 14A, the elevation angle with respect to time for four different cities such as Seattle, San Diego, Portland and Miami is set forth. The time period takes place over 500 minutes and, as can be seen, the elevation angle at any time in any of the four cities is above 40°. In further areas illustrated in FIG. 14B, Hawaii, Anchorage, Ak., Fairbanks, Ak. and Puerto Rico have elevation angles above 20° for most of the time. The switching between different satellites as one is rising and the other is setting is called handover. Handover may occur to maintain minimal elevation angle. When a fourth satellite is added, minimum elevation angles may be maintained for both the northern and southern hemispheres. The satellite antennas associated with this system will be programmed to switch from one satellite to another satellite. Switching should also not be a problem for the receiver since the system is providing non-real-time service.

Figure 15:
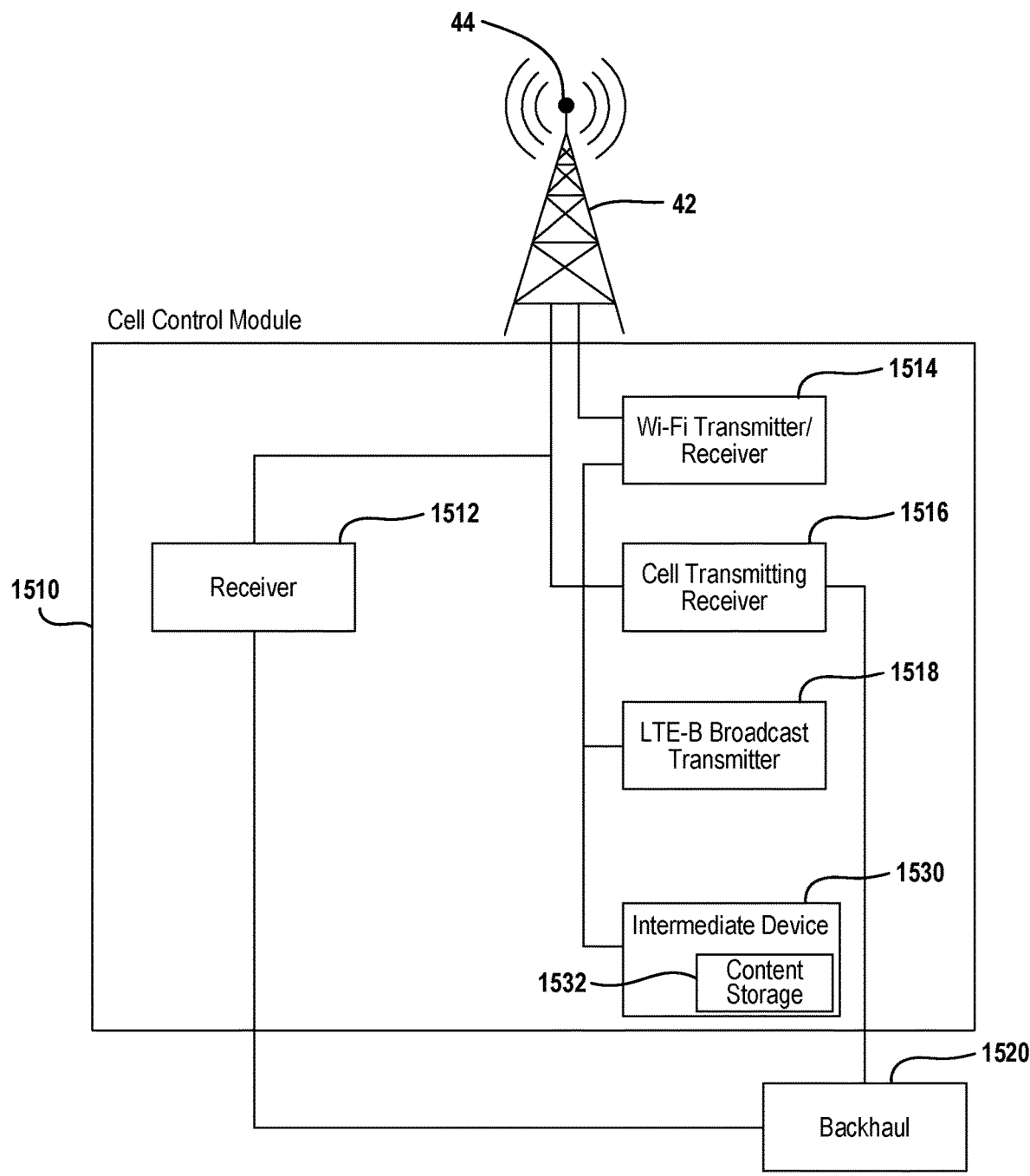
FIG. 15 is a block diagrammatic view of a cell control module.

Referring now to FIG. 15, the cell tower 42, the antennas 44 and the cell control module 1510 associated therewith are illustrated in further detail. The antenna 44 may actually be a plurality of antennas. The antennas 44 may be disposed in panels and thus face in various directions to provide spatial diversity. The antennas 44 may also be a combination of transmitting antennas, receiving antennas for the LTE system. The system may also include a wireless or Wi-Fi antenna for transmitting and receiving wireless or Wi-Fi signals. The signals under the wireless or Wi-Fi system may be used for return signals from the various intermediate devices. The system may thus include a LTE receiver 1512, a wireless network or Wi-Fi system 1514, a unicast cell transmitter 1516, and an LTE-B broadcast transmitter 1518. The cell transmitter 1516 may also act as a receiver for receiving signals from the back haul 1520. The back haul 1520 may return signals to the system for analysis and request purposes. The back haul 1520 may then communicate the signals to the communication system provider or the content service provider.

The cell tower 42 may also have an intermediate device 1530 associated therewith. The intermediate device 1530 may be configured in a similar manner to that described above. In this case, however, the Wi-Fi system 1514 both transmits and receives signals and forms a Wi-Fi network with the various intermediate devices within its transmitting area. The intermediate device 1530 may also have a content storage 1532 and other associated circuitry of the intermediate device described above. The content storage 1532 may receive content from the communication system provider. The Wi-Fi system 1514 may be formed using LTE, 5G or other suitable technology.

Figure 16:
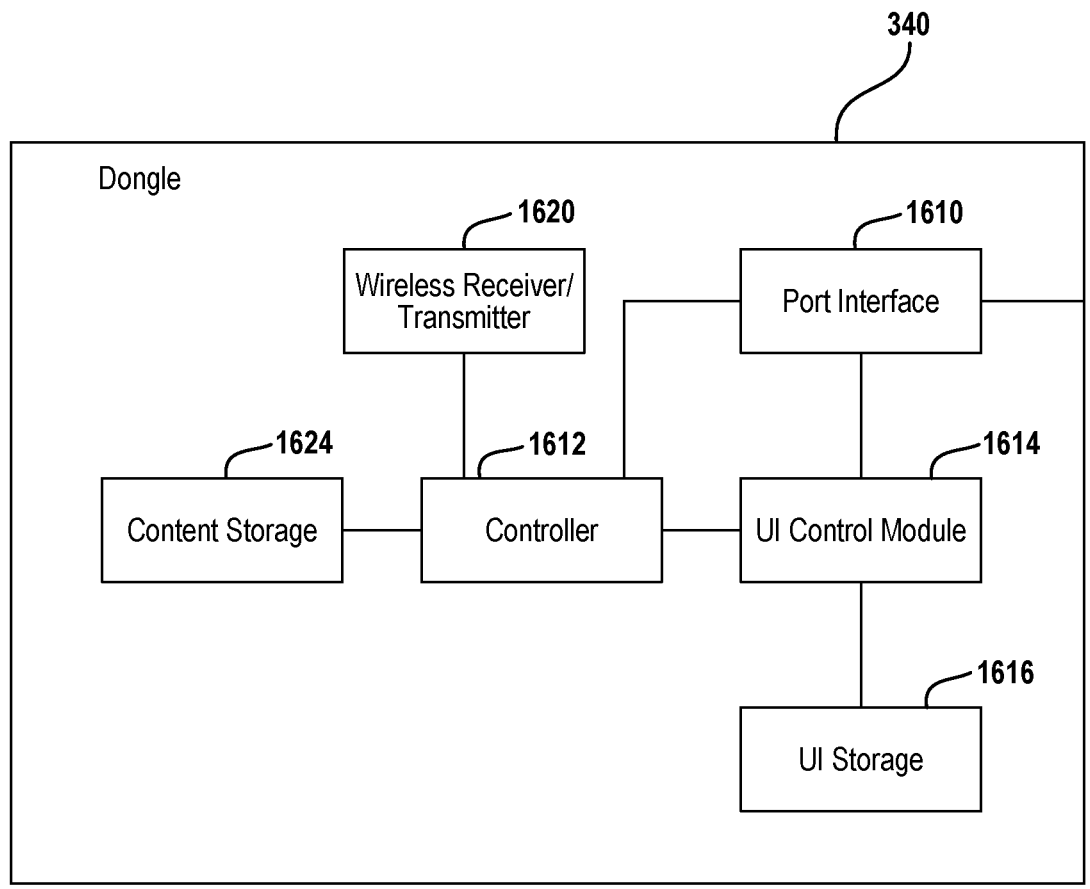
FIG. 16 is a block diagrammatic view of a dongle according to the present system.

Referring now to FIG. 16, the dongle 340 illustrated in FIG. 3 is set forth in further detail. The dongle 340 may include a port interface 1610 which is used for communicating with a port in the connected device. That is, the port interface 1610 may use a standard such as USB or HDMI. The port interface 1610 is coupled to a controller 1612. The controller 1612 may control various aspects of the dongle. The controller 1612 may be in communication with a user interface control module 1614. The user interface control module 1614 may be used for generating user interfaces through the port interface 1610 and on the screen of the attached user device. A user interface storage 1616 provides data for forming the graphics associated with the user interface. The wireless receiver/transmitter 1620 is coupled to the controller 1612. The wireless receiver/transmitter 1620 may receive content from or through the local area network in which the dongle 340 is associated. The wireless receiver/transmitter 1620 may also transmit feedback signals through the local area network to the communication system provider or the content service provider. The received content may be stored by the controller 1612 in a content storage 1624.

Figure 17:
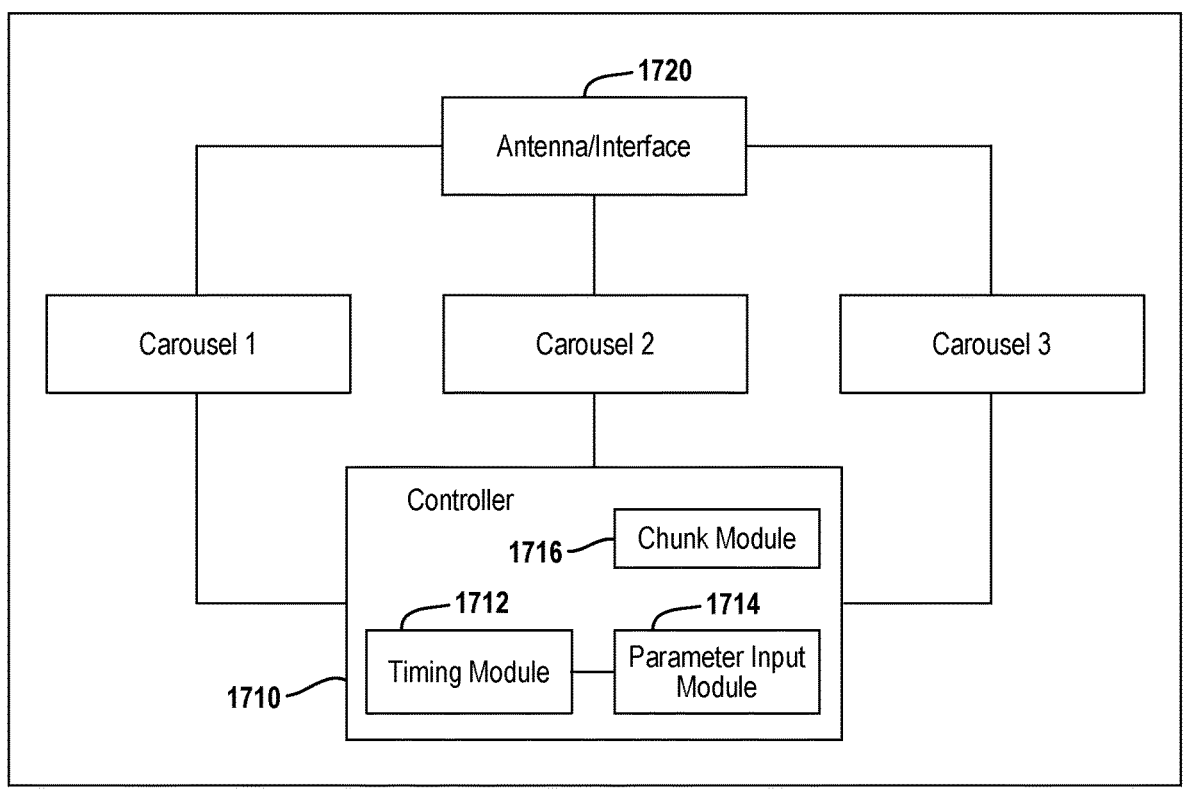
FIG. 17 is a block diagrammatic view of a carousel and controller for the carousel.

Referring now to FIG. 17, a representation of the carousel servers 620 is set forth. In this example, the carousel servers are represented by Carousel 1, Carousel 2 and Carousel 3. A controller 1710 is coupled to each of the carousel servers. A timing module 1712 is used for controlling the timing associated with the carousel. The timing may be a repetition rate for each of the carousel servers or the bit rate. That is, the amount that the carousel repeats a particular piece of content may be changed by the timing module. Carousel 1, Carousel 2 and Carousel 3 may all have different repetition rates for the content therein. The amount of throughput of each of the carousel servers may also be changed. A parameter input 1714 may be used to adjust the timing module. The amount of use or popularity of the content may be used to adjust the timing module 1712. Various other parameter inputs such as priority may be used to adjust the timing of the carousels based on the timing module. For example, emergency alert notifications may have a higher priority or higher repetition rate. Critical software updates and instant replays may also have a high repetition rate due to a high priority. A full length movie may have a lower repetition rate. As mentioned above the repetition rate may also be changed based on a monetary value assigned to the content.

The controller 1710 may also present the Carousel 2 with various chunks of data using the chunk module 1716. The chunk module 1716 may break the content up into chunks which comprise a plurality of packets. Each of the chunks may be the same in size or may vary in size. Chunks of the content are provided to each of the carousel servers. An antenna/interface 1720 may be coupled to each of the carousel servers for communicating the content to the communication system provider. The communication system provider may then communicate the content to the intermediate devices.

Figure 18:
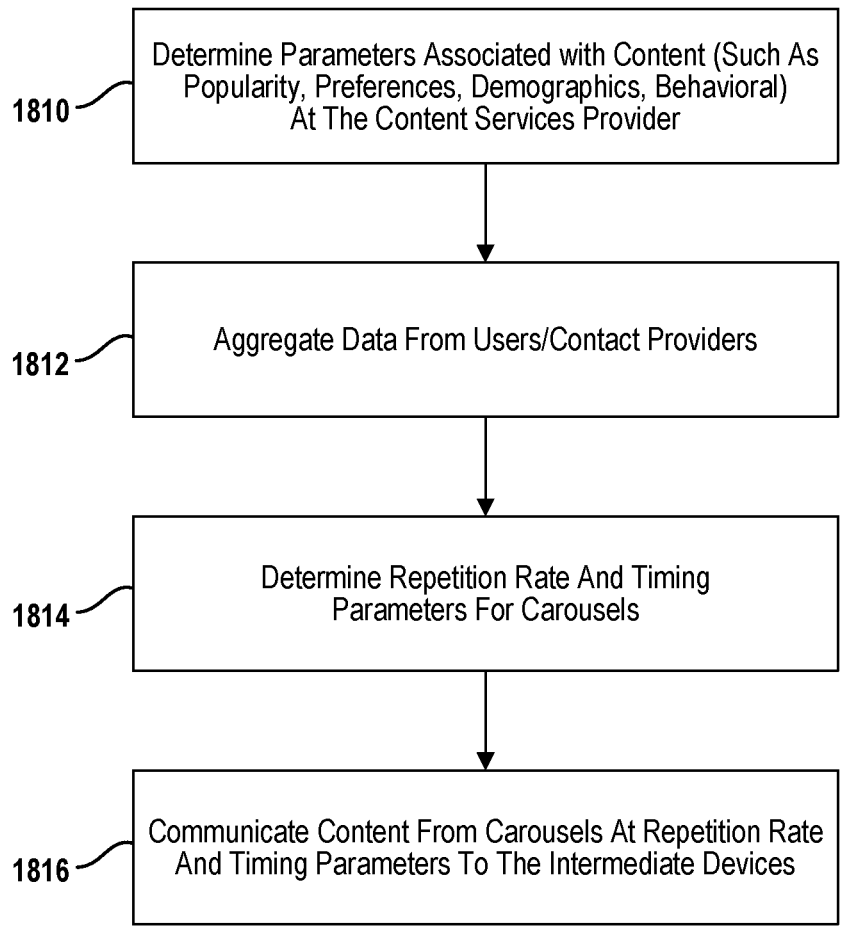
FIG. 18 is flowchart of a method of broadcasting content from a carousel.

Referring now to FIG. 18, a method for controlling the parameters associated with the carousel servers illustrated in FIG. 17 is set forth. In step 1810, the parameters associated with content such as popularity, preferences, demographics, monetary value and behavioral actions may be communicated from the users to the content providers at the content service provider. In step 1812, the parameters may be aggregated from the users or the content providers. The repetition rates, bit rates and other timing parameters for the carousels are determined in step 1814. In step 1816, the content is communicated from the carousels at the predetermined repetition rate. The communication may be performed by broadcasting.

Figure 19:
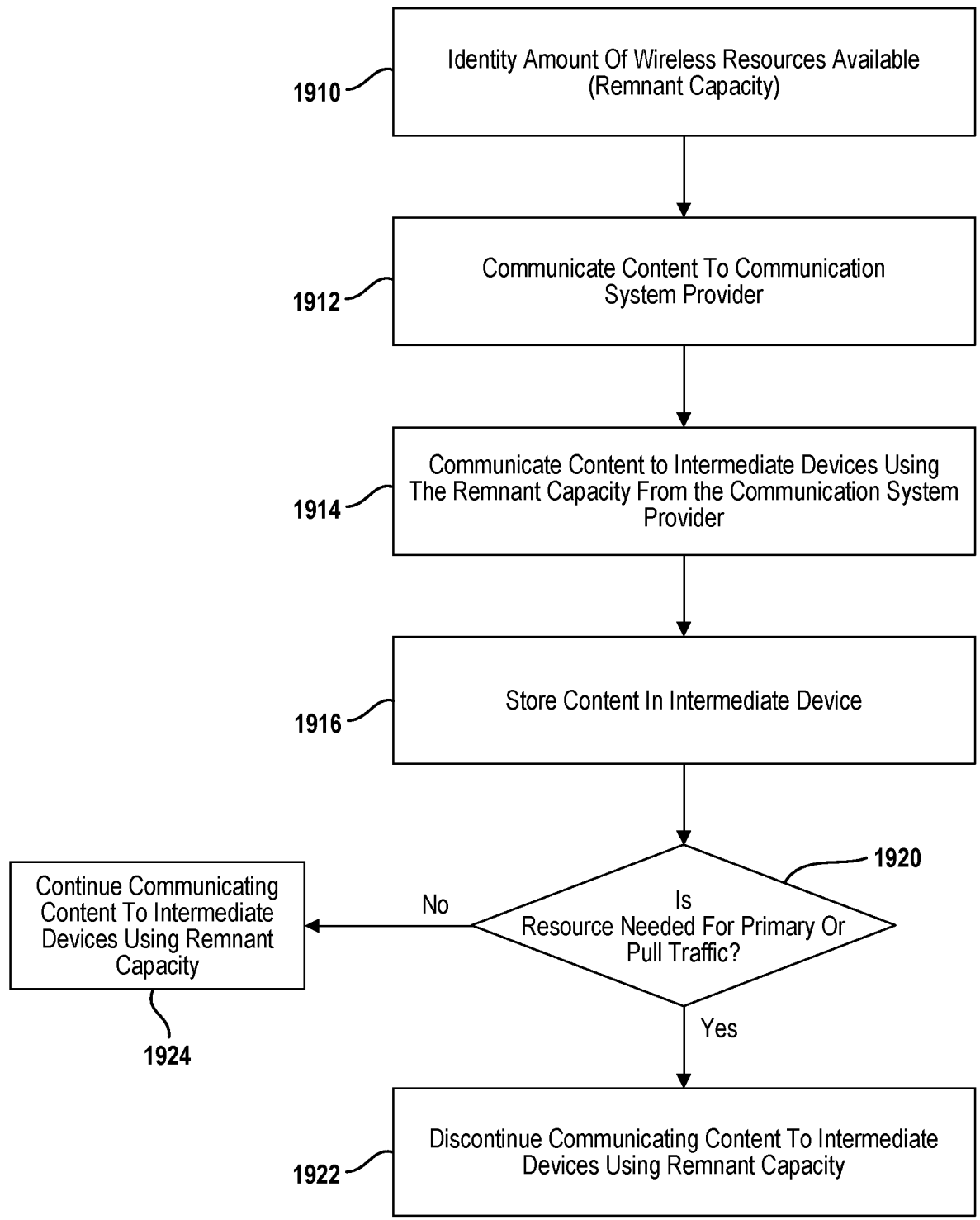
FIG. 19 is a flowchart of a method for communicating content through intermediate devices using remnant capacity.

Referring now to FIG. 19, a method of operating the communication system provider is set forth. In step 1910, an amount of a wireless resource or resources available are identified. The available resources may be remnant capacity as described above. The amount of resources identified as available may be currently available or may be forecasted to be available in the future. Depending on the communication system being used, the type of resources available may vary. However, in all cases, unused capacity is one available resource. The unused resource for a satellite may be bandwidth associated with one or more transponders. If spot beams on a satellite are used, a spot beam resource not being fully utilized may also be the remnant capacity. In an LTE system, when the LTE peak, regular capacity is not being fully utilized, there may be bandwidth available for remnant capacity use. For example, LTE-B transmissions may be scheduled using the portion of the LTE system that is available for remnant capacity use. For an ATSC or ATSC 3.0 digital television systems, the bandwidth used for broadcasting a channel may not require the entire channel for broadcasting. Excess capacity within the digital channel may be used to communicate content to various providers. In all systems, available frequencies, available time, available space spaced upon directional capacity, and available codes may form the remnant capacity.

Remnant capacity can be capacity available outside of the capacity that is required to serve a similar type of traffic that is increasingly served during peak network use and served less-so during non-peak network use. Remnant capacity can also be capacity available for content pre-positioning at the intermediate devices and within their content storage and subsequent consumption of that content by users directly from the intermediate devices, and which is not the capacity required for real-time voice and data requests from users or for distribution of content to users and for its immediate consumption. To identify remnant capacity usage patterns of the "primary, non-remnant" network may be reviewed. Remnant capacity may be automatically identified on a real-time basis by receiving information as to the amount of network not-being-consumed for "primary, non-remnant" use. The identified capacity may be automatically provisioned for use as the remnant capacity in response thereto. "Primary, non-remnant" capacity may run in parallel to "remnant" capacity use such that both are running across the entirety of the resource the entirety of the time but assigning a lower QoS value or identifier to the remnant capacity use so that remnant capacity is only used whenever such resources are not being used by a higher QoS "primary, non-remnant" use such as cellular, television broadcast, cable satellite and the like.

In step 1912, content is communicated to the communication system provider. Content may be communicated to the communication system provider from the content service provider or a content source, either before or after a resource is available. In step 1914, the content is communicated to the intermediate devices using the remnant capacity from the communication system provider. The content communicated is pre-positioned using remnant capacity, and thus is not communicated for real time consumption or in response to a real-time voice or data request from an intermediate device. The content may be communicated in various chunks which may not arrive in time or sequence for real-time playback from the intermediate device.

In step 1916, the content is stored within the intermediate device. In step 1920, it is determined whether the resource is needed for pull traffic, or traffic that is communicated for real time consumption or in response to a real-time voice or data request, or other communications instead of for pre-positioning. This step may be performed on a periodic or regular basis so that if a resource is needed for pull traffic, including for customers demanding a resource for data, voice or other communications for immediate use, then it is made available for that. If the resource is needed for primary service traffic or pull traffic, step 1922 discontinues communicating content to the intermediate devices using the remnant capacity. In step 1920, if the resource is not needed for primary service traffic or pull traffic, the content continues to be broadcast using the remnant capacity in step 1924.

Figure 20:
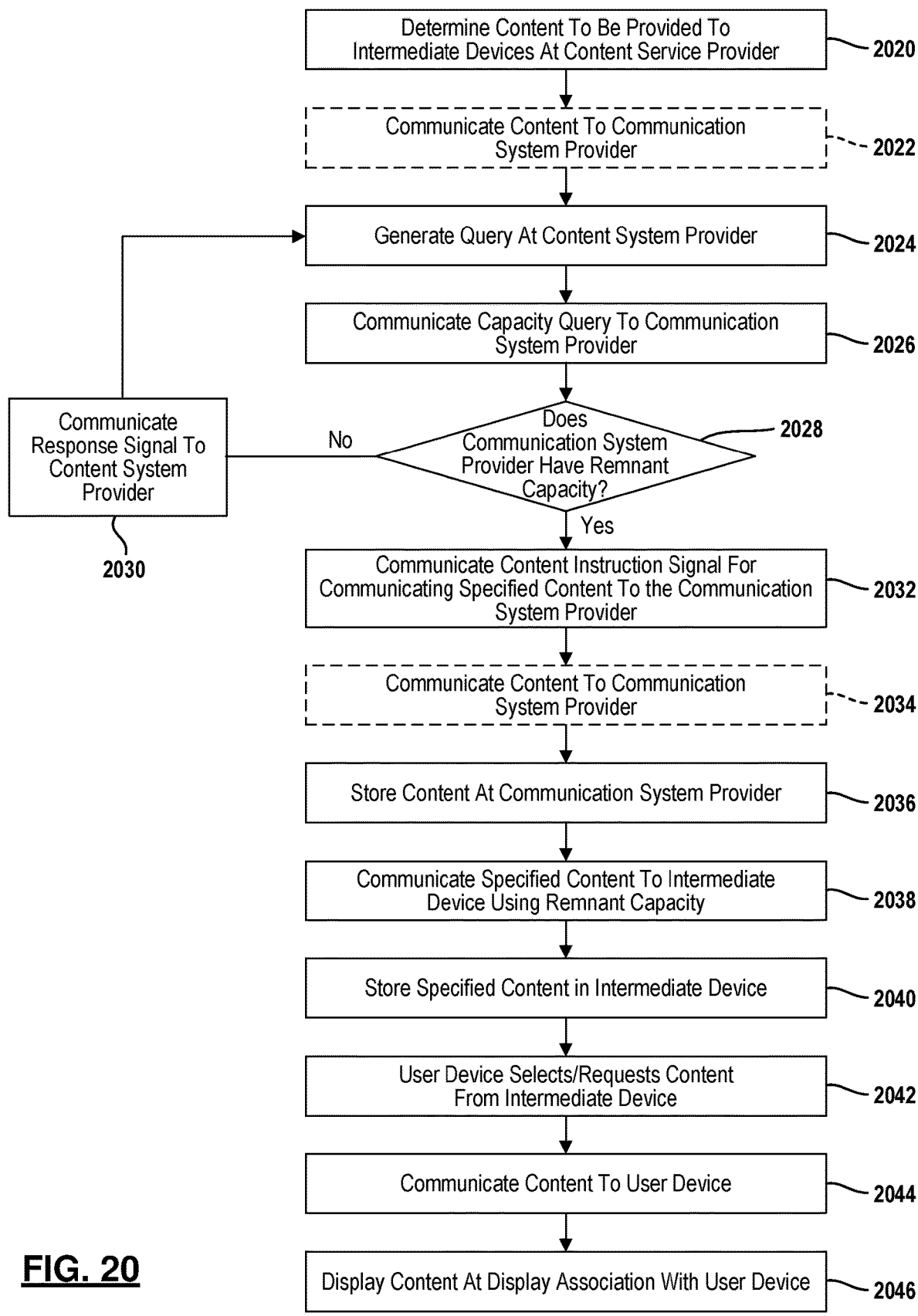
FIG. 20 is a flowchart of a method for communicating content using remnant capacity in greater detail.

Referring now to FIG. 20, a more detailed process for using remnant capacity is set forth. In step 2020, the content to be provided to the intermediate devices is determined by the content service provider. The content service provider may use various types of feedback from the intermediate devices including preferences such as favorites lists, popularity of content, demographics and behavior of the users associated with each of the intermediate devices. In step 2022, content is communicated to the communication system from a content provider or from a content service provider. This step may be performed at any time. In step 2024, a query is generated at the content system provider to determine whether remnant capacity is or will be available. The capacity query is communicated to the communication system provider in step 2026. In step 2028, it is determined whether the communication system provider has remnant capacity. The remnant capacity was described in FIG. 19. If there is no remnant capacity available, a response signal is communicated to the content system provider. The response signal is indicative of no capacity or remnant capacity being available. The determined amount of remnant capacity available is used by the distribution network to determine, for example, target throughput to aim for—whether this is unicast or broadcast transmission.

In step 2028, if the communication system provider does have remnant capacity, a content instruction signal for communicating the specified content to the communication system provider is performed in step 2032. The content instruction signal may specify predetermined content or may be general for the next content that the content service provider wishes to communicate. In step 2034, content is provided to the communication system provider. As mentioned above, content may be communicated at various times during the process. In step 2036, the content is stored at the communication system provider.

In step 2038, the specified content is communicated to the intermediate device using the remnant capacity. The remnant capacity available at any predetermined time might not fit an entire piece of content. That is, the content may be broken into chunks which are placed into the remnant capacity time periods. For example, a high definition movie is about two gigabytes. However, the amount of remnant capacity may only be available in kilobyte or megabyte sized time slots. Therefore, the content may be broken down into chunks and filled with the content.

In step 2040, the specified content is received and stored at the intermediate device. Once the content is stored in the intermediate device, step 2042 is performed in which the content is selected or requested by a user device associated with the intermediate device. In step 2044, the content is communicated from the intermediate device to the user device in real time upon request. Because the content is only stored in the intermediate device, communication through a local area network or wireless area network or through a direct connection may be performed. In step 2046, the content is displayed at a display associated with the requesting user device.

Figure 21:
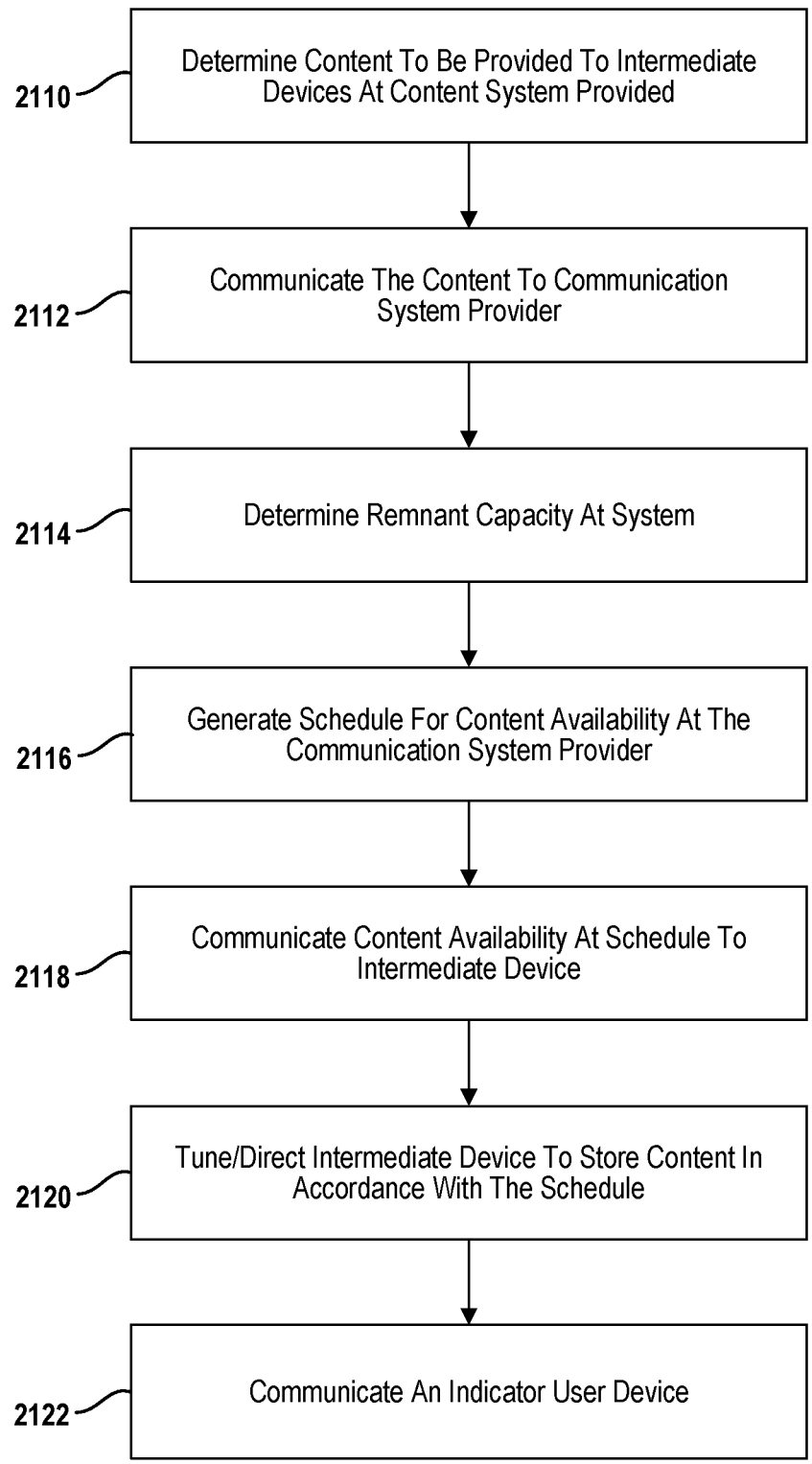
FIG. 21 is a flowchart of a method for scheduling content at an intermediate device.

Referring now to FIG. 21, details of communicating content to an intermediate device is set forth. In step 2110, content to be provided to the intermediate devices is determined at the content provider. The content provider may provide content based upon the element described above such as the popularity, the preferences, the demographics and the behavior of the various users at the intermediate device. Recommended or special content may also be selected.

In step 2112, the content is communicated to the content system provider. In step 2114, the determination whether remnant capacity is available is determined. In step 2116, a schedule for content availability at the communication system provider is generated. The schedule determines the time and the resource to be used for communicating the content. The time may be a common or universal time used throughout the system such as a GPS-based time system. The other resources used for communicating the content may depend upon the system and may specify the frequency, the code associated with the system and the transponder associated with the communication should a satellite system be used for communicating the content.

In step 2116, a schedule for content availability at the communication system provider is set forth. The schedule provides the content availability at the communication system provider. In a sense, the schedule provides a list of content and the time or times that the content will be communicated. As mentioned above, all of the content may not be communicated in one large file. That is, the content may be broken into chunks and the schedule for each of the chunks may be provided. In step 2118, the content availability schedule is communicated to the intermediate device. By communicating the times and the resources being used for the communication of content, the intermediate device may be easily tuned to the communication system for receiving the content. In step 2120, the intermediate device is tuned or otherwise directed to the content so that it may be stored in accordance with the schedule. The content is then made available to the individual users associated with the intermediate device. In step 2122, an indicator associated with content stored at the intermediate device is communicated to the user devices associated with the intermediate device. The indicator may be communicated directly or may be communicated in response to a query from the users.

Figure 22:
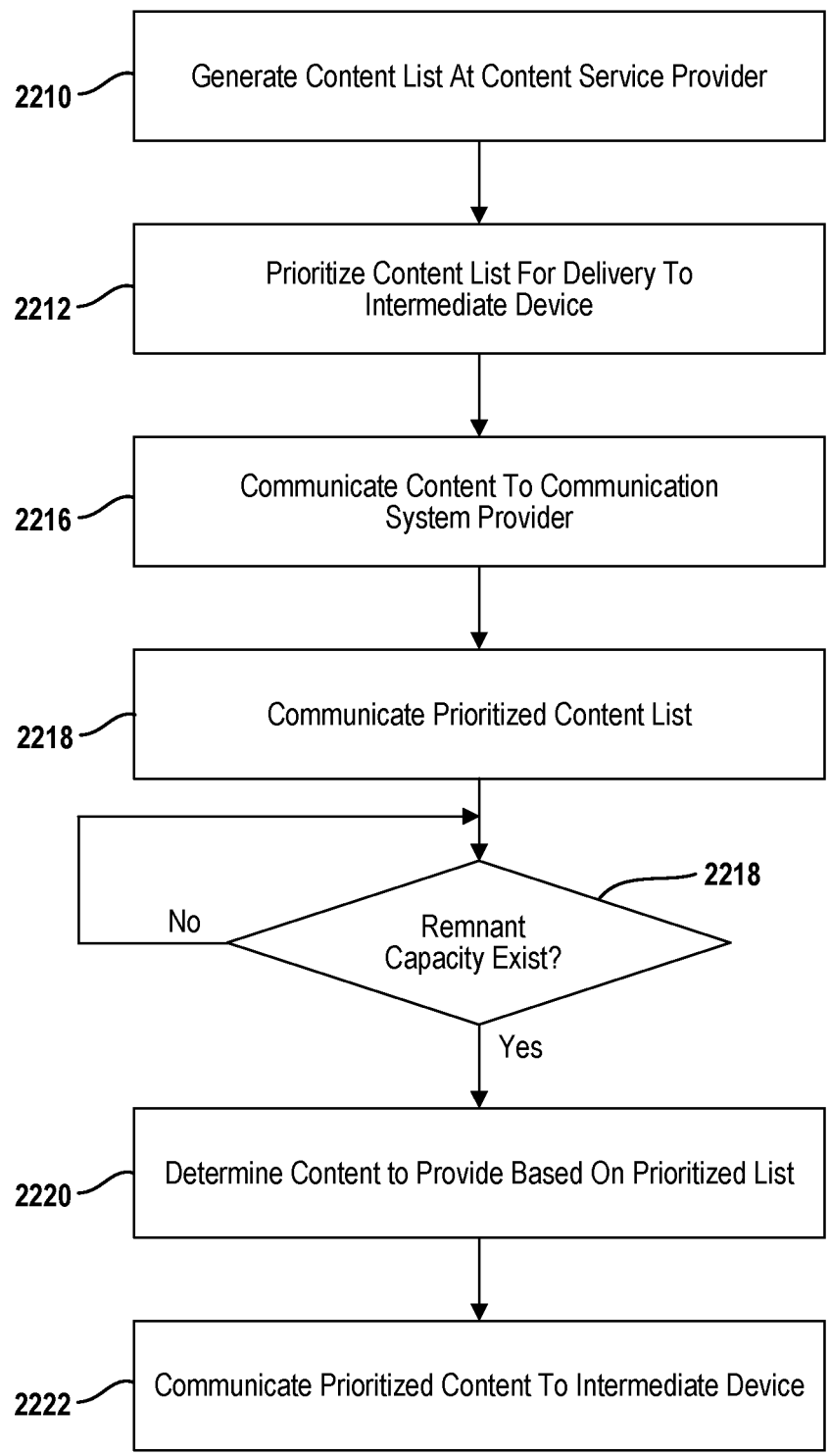
FIG. 22 is a flowchart of a method for prioritizing content for delivery through the remnant capacity delivery system.

Referring now to FIG. 22, the prioritization of content may also be performed when communicating the content to the intermediate device. In step 2210, a content list is generated at the content service provider. In step 2212, the content list may be prioritized for delivery to the intermediate devices. The content list may be prioritized according to various aspects such as popularity of the content, preferences, demographics, and behavioral actions of the users and the time relevance of the content. For example, weather content may be given a higher priority than movie content. In step 2214, the content is communicated to the communication system provider. A prioritized list may be communicated in step 2216. Both the list and the content itself may be communicated in response to query signals such as those set forth in FIG. 20. In step 2218, it is determined whether remnant capacity exists. If remnant capacity does not exist, the system is then checked for remnant capacity. If remnant capacity does exist in step 2218, step 2220 is performed. In step 2220, the content to be provided to the intermediate devices based upon the prioritized list is determined. In step 2222, the prioritized content is communicated to the intermediate device.

Figure 23:
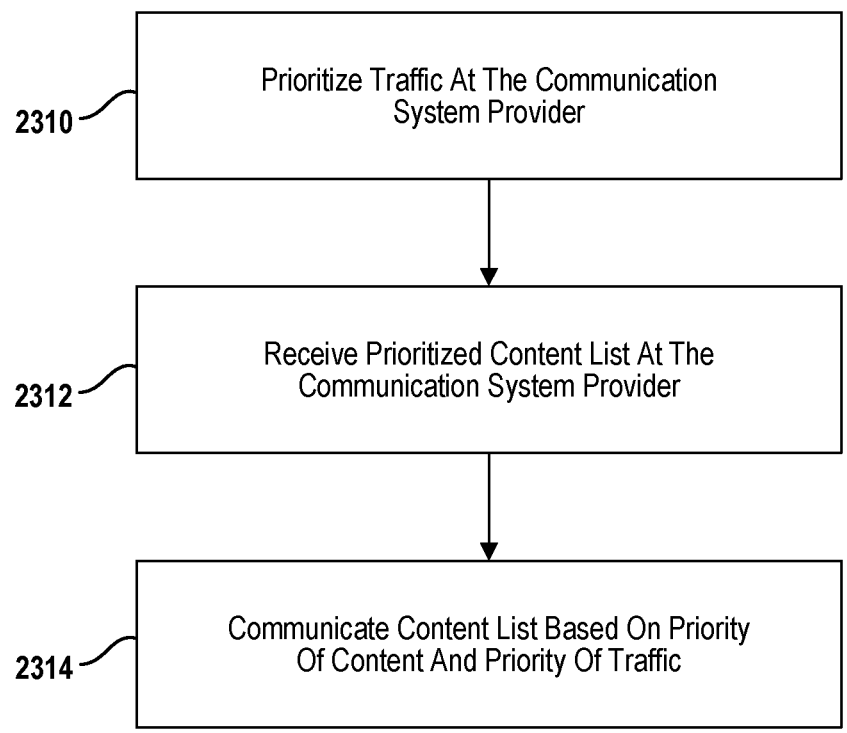
FIG. 23 is a flowchart for prioritizing the traffic through a communication system provider.

Referring now to FIG. 23, a method of prioritizing relative to the communication system traffic and priority is set forth. In step 2310, the traffic is prioritized at the communication system provider. That is, the communication system provider may provide various types of services and content including voice, data, notifications and the like. The different types of services and content may be assigned different levels of priority. As is described above, remnant capacity is capacity that is unused. However, capacity that is being underutilized may be used for communicating content. Thus, a priority may be assigned to communicate content above some of the lesser categories of content. Further, a content provider may pay for content to be prioritized and delivered on a priority basis. For example, a movie studio may pay more for delivery of a certain movie. In step 2312, a prioritized content list may be received at the communication system provider. The priority of the remnant capacity may be as described above. The remnant capacity may be lower than the primary capacity of the system. As mentioned above space within the storage of the intermediate device and certain remnant capacity may be made higher priority due to payment by a content provider.

Figure 24:
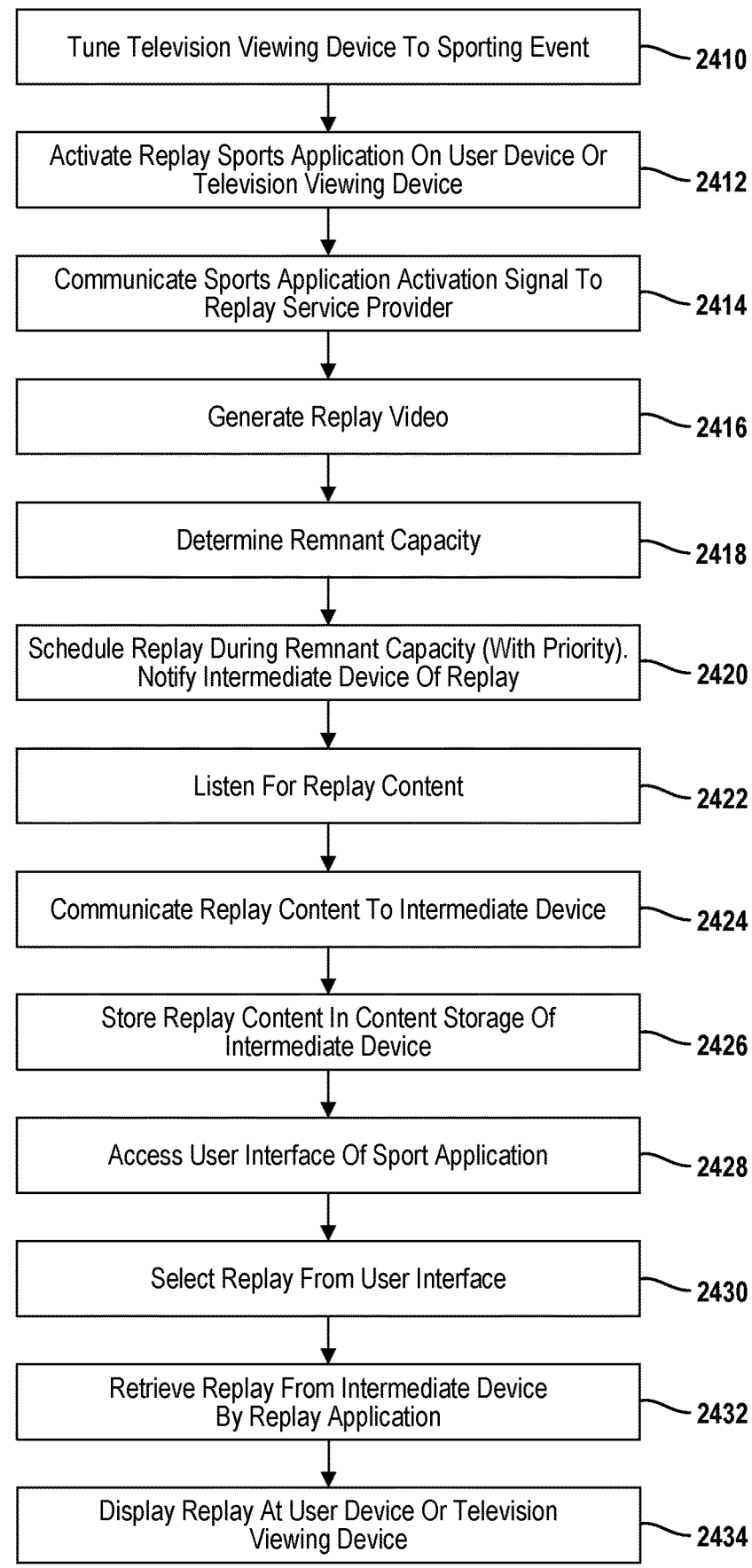
FIG. 24 is a flowchart for a method for providing sports replays.

Referring now to FIG. 24, a method of providing a sports replay is set forth. In step 2410, a television viewing device is tuned to a sporting event. The television viewing device may be a traditional television or one of a number types of devices that can receive television signals through the internet or other types of broadcast network. In step 2412, a sports replay application may be activated on the user device on the television viewing device. In step 2414, the activation signal is communicated to a service provider. The service provider may generate a replay video in step 2416. In step 2418, remnant capacity of the communication system is determined. In step 2420, a replay is scheduled during the remnant capacity. The replay content may be prioritized at a high level for delivery, especially if the replay is for a currently broadcasting event. The replay may be scheduled and an intermediate device may be notified as to the time the replay will be delivered. In step 2422, the intermediate device listens for the replay content to be communicated. In step 2424, the replay content is communicated to the intermediate device. In step 2426, the replay content is stored in the intermediate device.

In step 2428, a user interface of the sports application may be updated when replay content is stored within the intermediate device. The replay may be selected in the user interface in step 2430. In step 2432, the replay is retrieved from the intermediate device by the application at the user device or television. In step 2434, the replay is displayed at the user device or television viewing device.

Figure 25A:
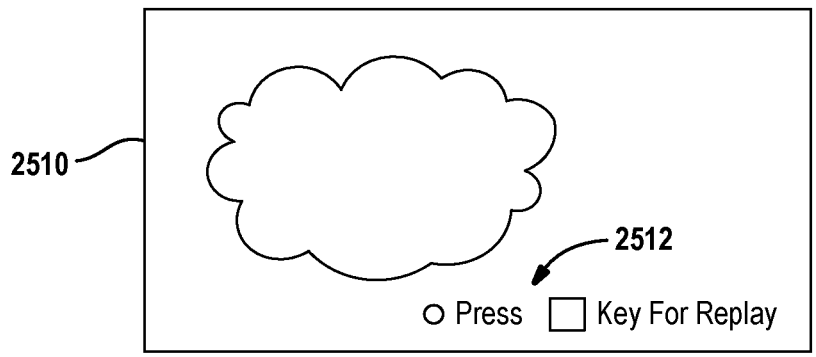
FIGS. 25A-25D are user interfaces for obtaining sports replays.

Referring now to FIG. 25A, screen displays for accessing replays are set forth. A screen display 2510 is used for selecting a replay. A certain key may be pressed for requesting a replay. The request for the replay may communicate through a wired or wireless network. Ultimately, the request is communicated to a content provider or replay clip provider to indicate that a replay is requested. The replay request may be communicated with a time code and program identifier so that the replay may be communicated to the intermediate device associated with the user device. The indicator 2512 instructs the user to select a particular key for replaying. Of course, should the device be a touchscreen device, a tap of the screen may be all that is required.

Figure 25B:
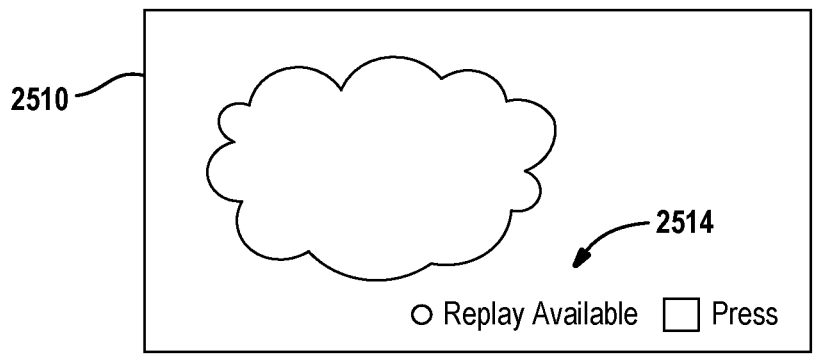

Referring now to FIG. 25B, a screen indicator 2514 may be generated on the screen display 2510. The screen display 2510 may continue to display a sporting event or other event. When a requested replay arrives at the intermediate device, the intermediate device may send a replay available signal to the user device that requested the replay. The indicator 2514 may instruct the user to select using a keyboard or the like for replaying the replay.

Figure 25C:
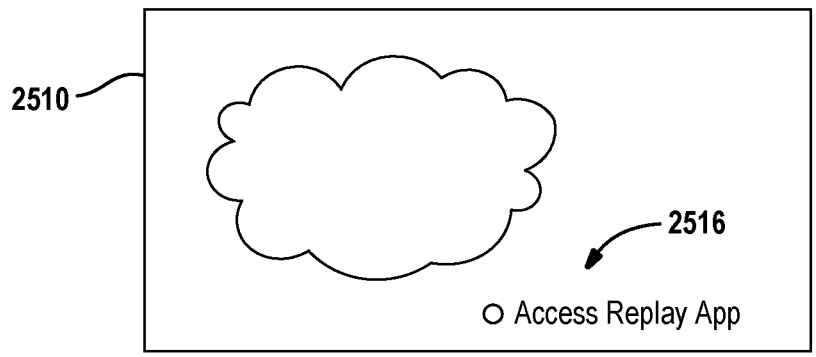

In screen display 2510 of FIG. 25C, the replay may not need to be requested by a particular person or user device. Typically, in a popular sporting event, various plays are important and a centralized location may develop the replays without user input. Thus, a replay app may be provided that may be accessed using various remote control keys or the like. An indicator 2516 may be used to instruct the user to access the app.

Figure 25D:
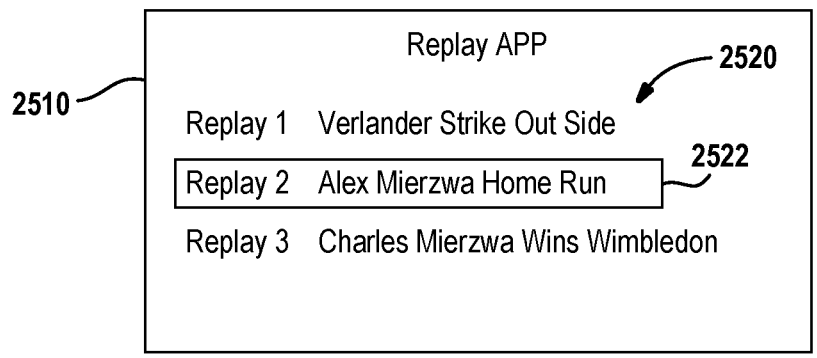

In FIG. 25D, the replay application or app may be accessed. The replay app may be accessed using the screen displays illustrated in either FIG. 25B or 25C or some other numerical or keypad combination associated with the user device. The replay app generates a list 2520 with various replays that are accessible by the intermediate device. A select box 2522 may be scrolled or moved with arrow keys on a remote control for selecting content for playback. Other numerical or alphanumerical characters may be entered into a remote control or keypad for playing back available replay content.

Figure 26:
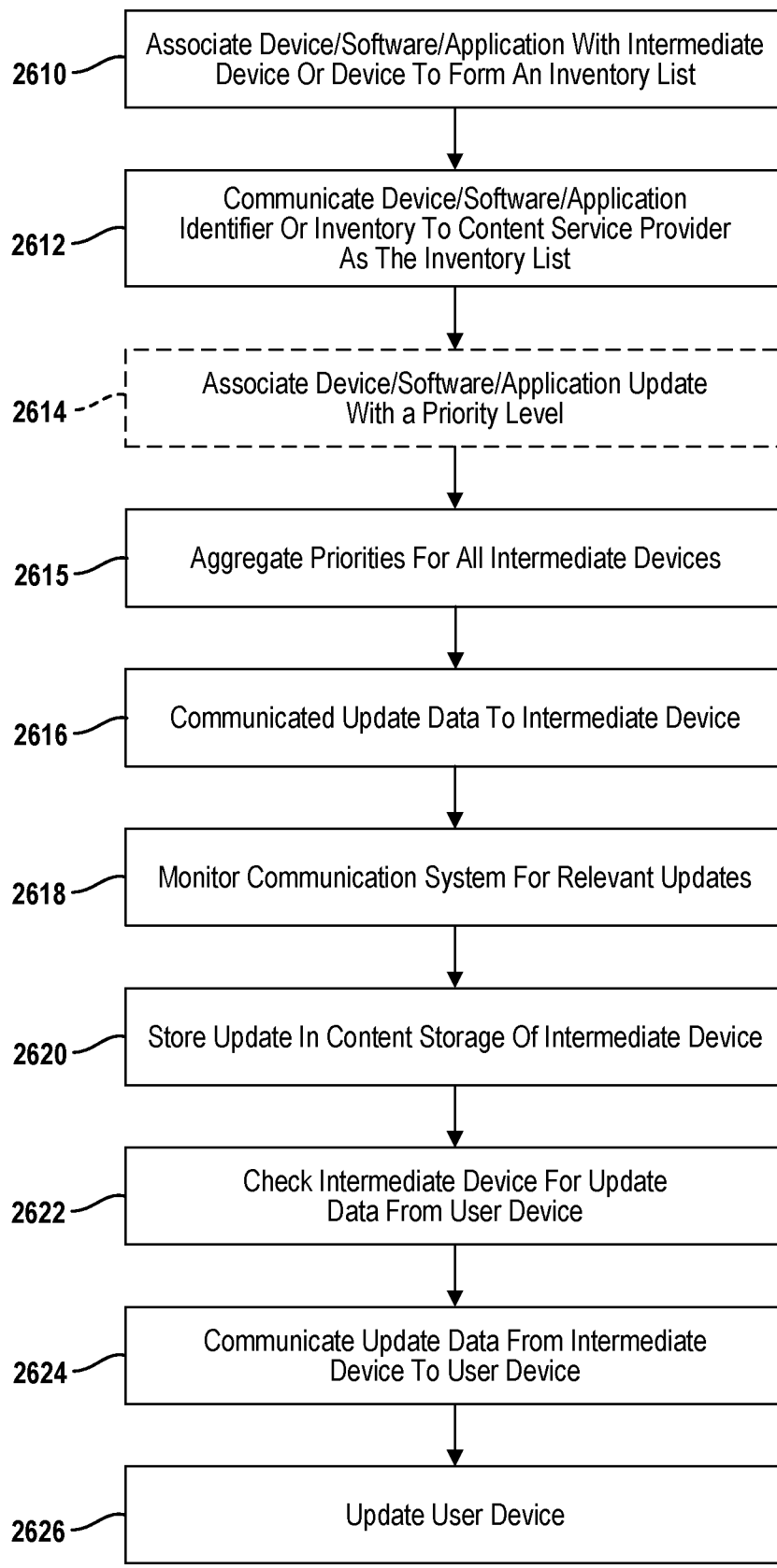
FIG. 26 is a flowchart of a method for providing software, device or application updates.

Referring now to FIG. 26, the remnant content delivery system may also be used for delivering device, software and application updates that are associated with the intermediate device or user devices associated with the intermediate device. In step 2610, the device, software and applications are associated with an intermediate device or device to form an inventory list. In step 2612, the inventory list may be communicated to the content service provider. The inventory list may also include device identifiers, software identifiers and application identifiers. The inventory list may also list the devices associated with the various software and applications. Although, this is not a necessary step. In step 2614, an optional step of associating the device, software and application updates with a priority level is set forth. The priority level may prioritize either high or low priorities for the software, device and application updates. Critical security updates may, for example, be given a higher priority. In step 2615, the content provider or the communication network may synthesize all the content and software requirements for each intermediate device, including re-transmission or missing content requirements, and priority-based software and update requirement. The system may then weigh the individual requirements against what content is better to be transmitted and how to communicate it (unicast vs. broadcast), and adjust the timing. The prioritization or delivery method determination may also be based on the number of intermediate devices that require the content. A master queue of content scheduled to be broadcasted may then be developed. The content may be broadcasted in parallel to updating the intermediate devices about the type of content that is being scheduled to be broadcasted. In step 2616, the update data is communicated to the intermediate devices. In step 2618, the broadcasts from the communication system are monitored for relevant updates. That is, the intermediate device may monitor the broadcast. When the broadcast corresponds to device updates, software updates or application updates on the inventory list may be stored within the intermediate device in step 2620. In step 2622, the user device may obtain a notification or may check the intermediate device for available updates by comparing the list to what is available. In step 2624, the update data is communicated from the intermediate device to the user device. In step 2626, the user device is updated with the new software, software revision or application. During the update, a notice signal to the system regarding the update being successfully executed or implemented may be communicated to the intermediate device or content system provider to prevent further attempts to communicate the same data (update the inventory) and to provide a basis for obtaining the next revision from the communication system.

Figure 27A:
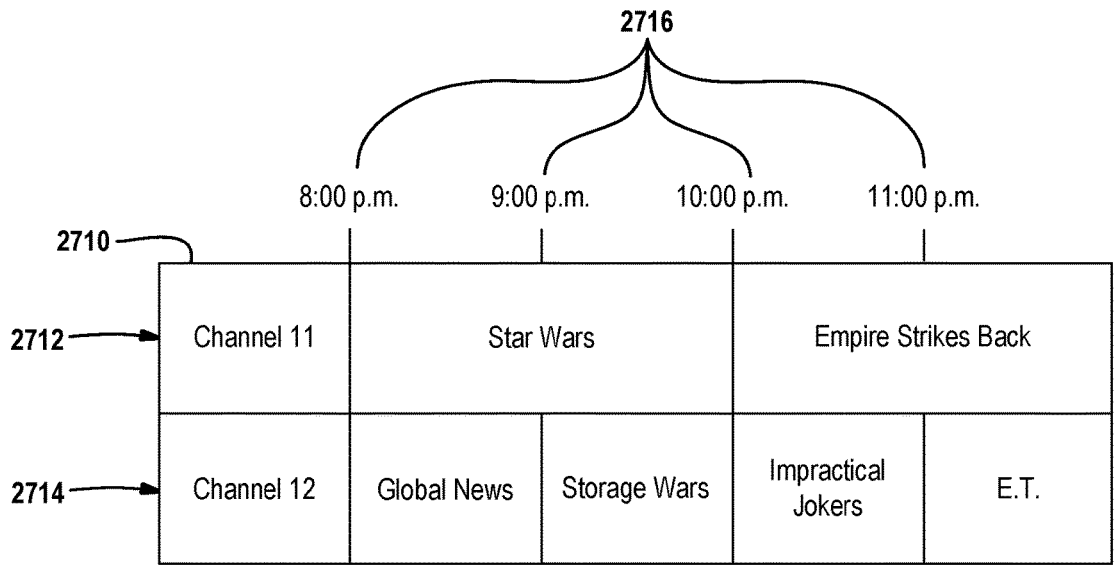
FIG. 27A is a first representation of a channel guide implemented as a grid guide generated at the intermediate device using content available at the intermediate device.

Referring now to FIG. 27A, a screen display for a grid guide 2710 is set forth. The grid guide 2710 illustrates a first virtual channel 2712 and a second virtual channel 2714. The first virtual channel 2712 is associated with the first content provider 212A and the second virtual channel 2714 is associated with the second content provider 212B. The first content provider 212A and the second content provider 212B may communicate metadata with the content to control the arrangement in a virtual channel guide. The channel/content provider, the channel display, screen display name and time may be communicated in the metadata. Although two virtual channels are illustrated, various numbers of virtual channels may be set forth. The guide 2710 includes time indicators 2716 that are provided on a regular basis. In this example, every hour has a time indicator 2716. In this example, the content titles for content stored within the intermediate device are formed into two channels. The channels may be named in the channel column 2718. In this example, "Channel 1" and "Channel 2" are set forth.

Figure 27B:
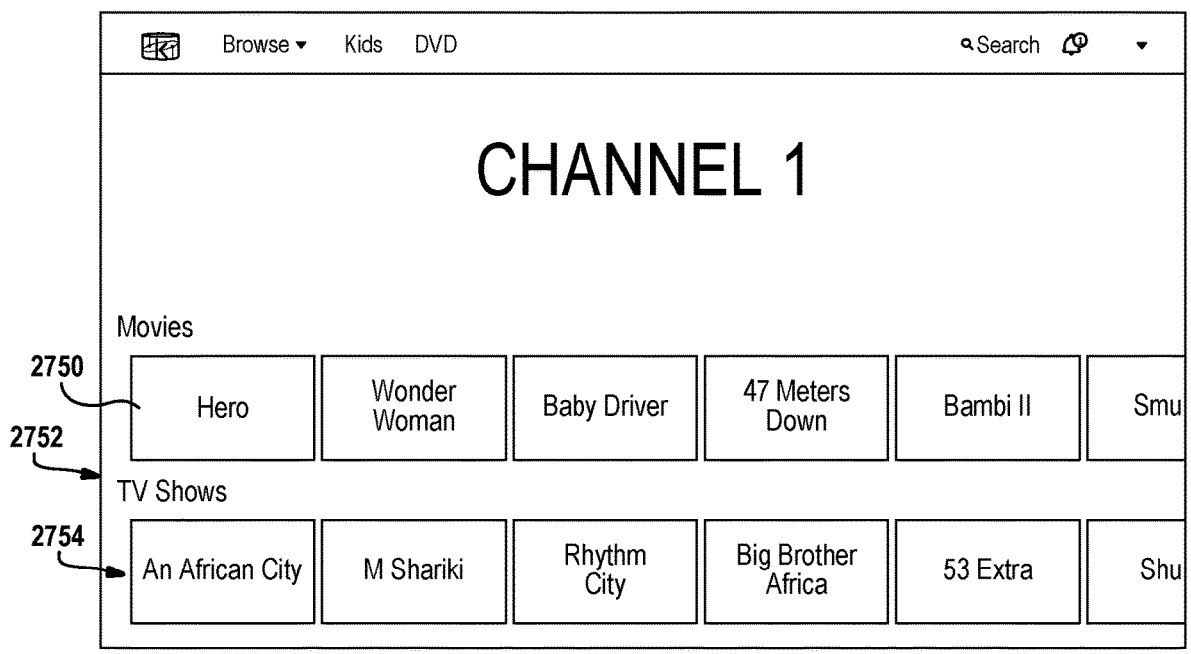
FIG. 27B is a second representation of a channel guide implemented as a poster display generated at the intermediate device using content available at the intermediate device.

Referring now to FIG. 27B, a virtual channel associated with a first content provider is set forth. In this example, a plurality of indicators, identifiers or posters 2750 are arranged in row. A "Movies" row 2752 and a "TV show" row 2754 are arranged to show television show indicators and movie indicators that are stored in the intermediate device that are associated with Channel 1 which corresponds to the first content provider 212A. More than one channel may be associated with the content provider 212A, 212B. Each channel may be displayed separately. Metadata provided with the content may include channel and content provider indicators. By displaying the content stored within the intermediate device, users are directed to lower cost content with high customer satisfaction because the content is immediately available.

Figure 28:
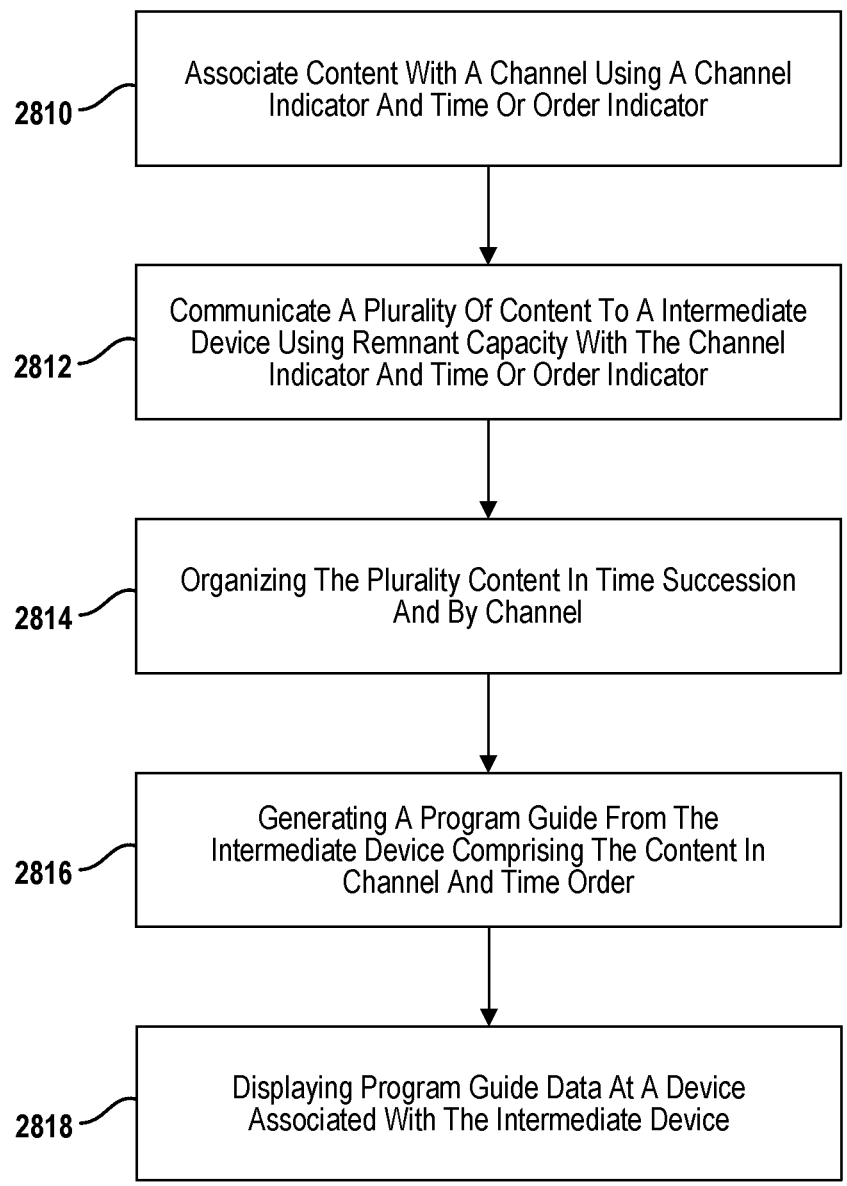
FIG. 28 is a flowchart of a method for generating a channel.

Referring now to FIG. 28, a method for forming channel guide 2710 is set forth. In step 2810, a channel is associated with a content using a channel indicator and/or time or order indicator. These steps may be performed in the intermediate device at the library guide/channel module 874 illustrated in FIG. 8B. The association with a channel may be formed into the metadata for each piece of content as a channel identifier.

In step 2812, a plurality of content is communicated to the intermediate device using remnant capacity with the channel indicator and time order indicator provided within the metadata. In step 2814, the plurality of content is organized in timed succession and channel according to the metadata associated therewith.

In step 2816, a program guide is generated from the intermediate device that comprises the content in channel and time order. In step 2818, the program guide is displayed at the device associated with the intermediate device. In this manner, all or most of the content provided in the channel may be indicated in the program guide. In this manner, having a plurality of content to choose from will allow the user to access the content more rapidly.

Figure 29:
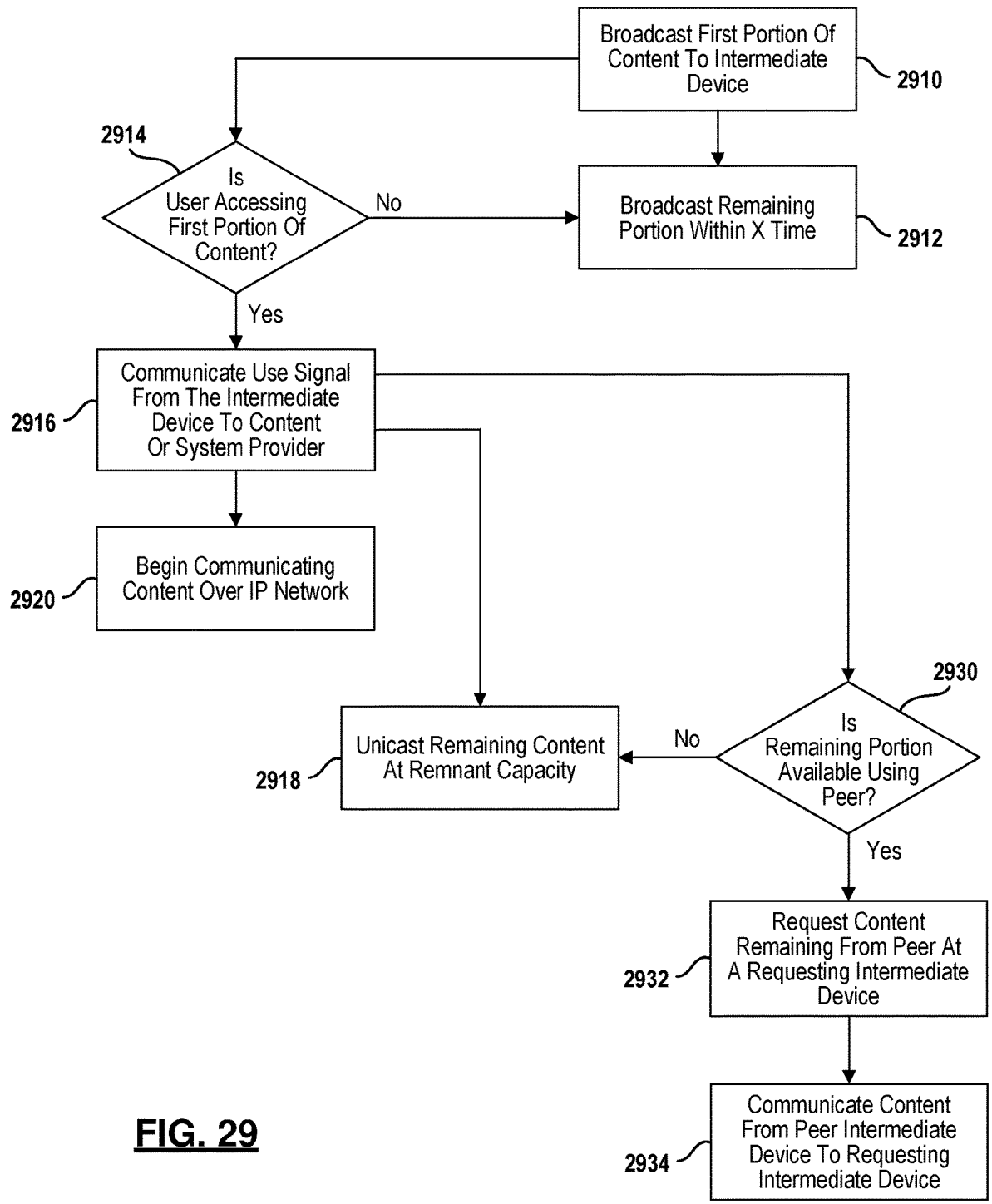
FIG. 29 is a flowchart of a method for broadcasting only a portion of the content and following up with broadcasting the rest of the content.

Referring now to FIG. 29, a method for communicating content where initially only a portion is communicated to the intermediate device is set forth. In step 2910, a first portion of the content is communicated using the remnant capacity system as described above. The remnant capacity may be used to broadcast a first portion. In step 2912, the remaining portion of the content is may be unicasted or broadcasted within a predetermined time. The predetermined time "X" may be determined based upon a statistical likelihood that the content will be viewed.

In an alternative, after a first portion of content is communicated to the intermediate device in step 2910, step 2912 may determine whether the user is accessing the content. If the content is not being accessed, the system may ultimately broadcast the remaining portion as in step 2912 or may terminate and not broadcast any of the remaining portions in step 2912. This decision would take into account whether other users are interested in or are currently using the broadcast.

In step 2914, if the user is accessing a first portion of the content, step 2916 communicates a use signal from the intermediate device to a content or system provider. After step 2916, two alternative choices may be formed depending on the system requirements. In step 2918, the remaining content may be unicast using remnant capacity. This is useful if the content is a large piece of content and it is likely that the remnant capacity could fulfill the remaining portion before the end of the content is watched. For example, the first 20% of a movie may be broadcasted using remnant capacity. When the user begins viewing the content, the signal is generated in step 2916 and the remaining portion of the signal may be unicasted using remnant capacity. Broadcasting of the missing content may also be performed.

In the alternative, after step 2916 and a use signal is communicated from the intermediate device to either the content or system provider, the remaining content may be communicated over an IP network in step 2920. Presumably, this may happen when a slow internet connection is used by the user.

The additional content may also be obtained from a peer intermediate device. That is, after use is detected, it is determined whether or not a peer intermediate device has the remaining content. In step 2930, it is determined whether a peer intermediate device in the local area network or adjacent local area networks has the content. In step 2932, the content is requested from a peer intermediate device by a requesting intermediate device. If the content is not available from a peer intermediate device, the content may be transmitted from the communication system or through an IP network. In step 2934, content is communicated from the peer intermediate device to the requesting intermediate device.

Various business cases uses may be implemented with the examples above including a cell or mobile device provider communicating content to devices on as a pay service or some type of bonus service.

As mentioned above various priorities may be assigned to the content. Content provided from a first content provider may have a priority over content from a second content provider. Higher priority may be paid for by a content provider. The carousel repletion rate or basic bit stream rate may be increased and decrease according to value. Further, the amount of storage space may be allocated to different content providers on a per amount basis. More amounts may be paid for by the content provider.

Figure 30:
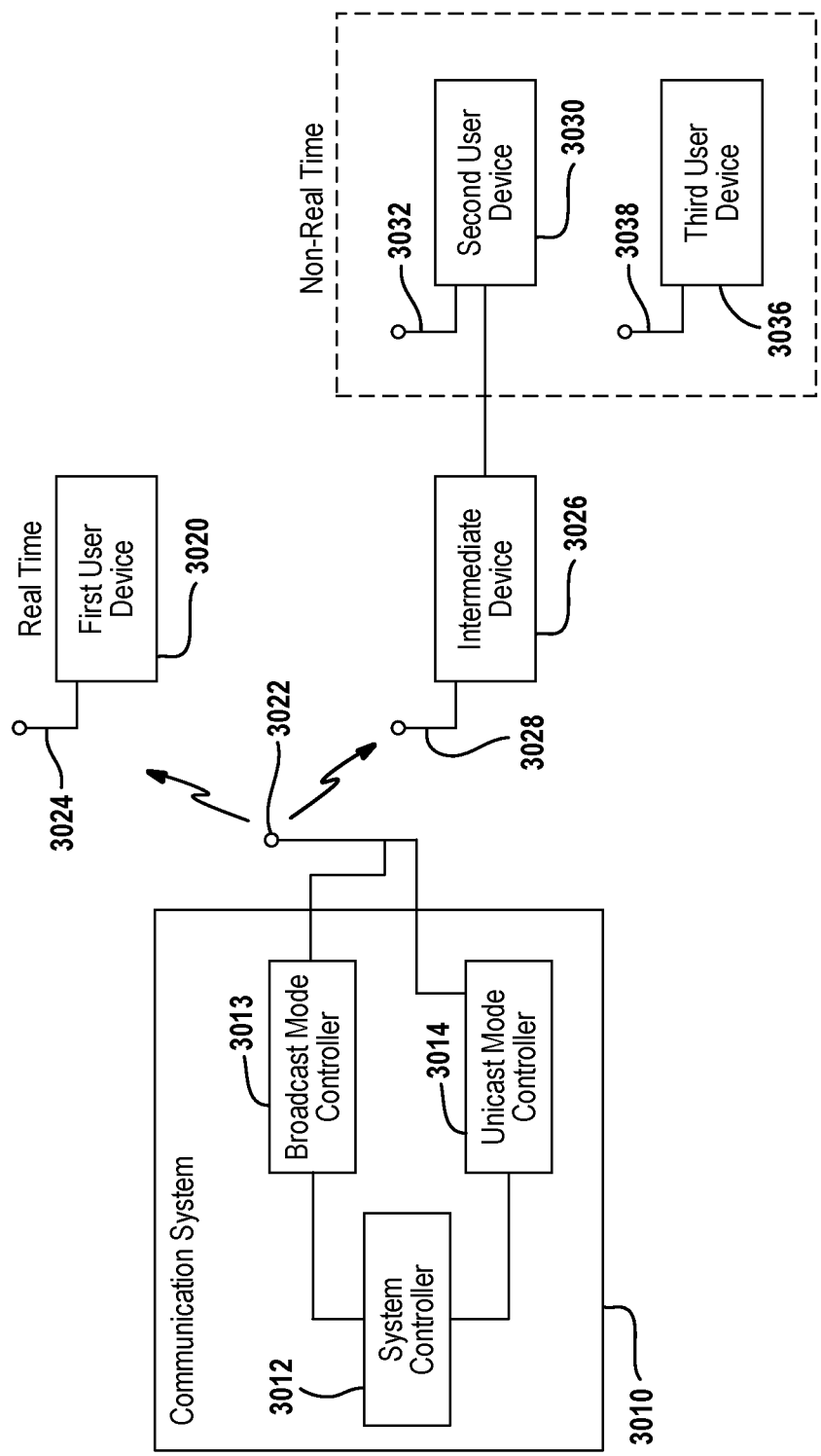
FIG. 30 is a block diagrammatic simplified system according to the present disclosure.

Referring now to FIG. 30, a communication system 3010 such as a terrestrial cellular communication system is illustrated. In this example, many of the features set forth above are provided. In this example, the communication system may be an evolved media broadcast and multi-cast service (eMBMS). The communication system 3010 has a system controller 3012 that is in communication with a broadcast mode controller 3013 and a unicast mode controller 3014. The broadcast mode controller 3013 and the unicast controller 3014 are used to provide various types of data to different users using different communication formats and different portions of the overall system capacity. That is, a first portion of the overall system capacity may be assigned to broadcast mode and a second portion of the overall system capacity to unicast mode. In this example, a first user device 3020 receives content in real time for real time consumption. Real time consumption occurs at the same time as when the user requests to consume the first data. The data may be a web page, video, audio or various other types of data.

The communication system 3010 communicates wirelessly through an antenna 3022 to an antenna 3024 of the first user device 3020. Of course, multiple antennas, multi-segmented antennas may be used but are beyond the scope of this disclosure.

An intermediate device 3026, also having an antenna 3028, receives wireless communications from the communication system 3010. The intermediate device 3026 may be in communication with a second user device 3030 also wirelessly through an antenna 3032. Of course, the second user device 3030 may incorporate the intermediate device 3026 or may be connected in a wired fashion.

A third user device 3036 is coupled to the communication system 3010 wirelessly through an antenna 3038.

The second user device 3030 and the third user device 3036 may be devices that are using the first data or other data communicated from the communication system 3010 in a non-real time manner. The first user device 3020 receives and consumes data in real time. Non-real time consumption is the use of the content at some time later or at a second time which is after the content is received and stored within the device. Both the second user device 3030 and the third user device 3036 store content therein or receive content from the intermediate device 3026 which stores the content, then provides the content to either the second user device 3030 or the third user device 3036. The communication system 3010 may use various formats such as LTE or 5G communications to provide data to the different users.

In prior systems, when users request data for real-time consumption, the requests are fulfilled by unicast transmissions. The unicast transmissions occupy spectrum resources that are not used to serve other users, since wireless transmissions are omni-directional or sectorized but in all cases are not truly 1-to-1 for each user. That is, unicast transmissions are used to relay the content for real-time consumption to a specific requesting user device, but during that time the unicast transmissions preclude other users from receiving other content for real-time consumption. Further, broadcast transmissions can be used to communicate content to user devices but are at a disadvantage spectrally when compared to unicast transmissions, since broadcast transmissions do not have the ability to optimize the transmission beams with regard to a given user and instead have to relay information to all users but based on the worst receiving user's ability to receive the signal—typically, the higher spectral efficiency of unicast transmissions is on the order of 50-1000% than that of broadcast transmissions as a result. However, the broadcast format may have advantage when providing the same content to various user devices such as the first user device, the second user device (or intermediate device) and the third user device, especially in cases when there are more than 50-1,000% more users than the first user which would benefit from having this request be received by their devices as well. To date, this advantage has been realized for real-time consumption of the same content by many users at the same time. That is, one broadcast can address real-time consumption needs of multiple users at once. However, this advantage can be carried over for non-real-time consumption at a future time by the second user device (or intermediate device) and the third user device, using the remnant capacity of a transmission which is otherwise used to serve a real-time consumption request of the first user device, by deliberately using a broadcast transmission instead of a unicast transmission so that the same content requested by the first user device for real-time consumption can be delivered to the second user device (or intermediate device) and the third user device for non-real-time consumption in the future. That is, when content is broadcasted to a first user device, the remnant capacity of the transmission, which is typically unused by other user devices if its unicasted, may be instead used for communicating the same content to other user devices for non-real-time consumption. This same content is received and stored for play back in non-real time by the other devices. Because other user devices other than the first device (requesting device) normally ignore broadcasts, the other users do not request or consume in real-time, or the transmissions are unicast (leaving the same transmission signal being received by the first user for real-time consumption, unused by the other users or remnant, since the signal is omnidirectional or sectorized and is in fact also received by such other users (but is unusable by them), the under-used capacity of the broadcast signal may be referred to as remnant capacity. The other devices in the system such as the intermediate device 3026, the second user device 3030, and the third user device 3036 are enabled to receive broadcast data not specifically directed to them. As will be described in more detail below, by providing broadcast transmission of data, an analysis may take place at the communication system 3010 as to how many users may benefit, the popularity of the content in the request and the likelihood that the cost of serving those users using unicast transmissions at a future time will be greater than the cost of using a broadcast transmission versus a unicast transmission at the current time. A first relative cost of communicating the first data using the broadcast mode for real-time consumption and the remnant capacity of the broadcast mode for non-real-time consumption inclusive of the costs of receiving and storing the first data as well as the likelihood of the first data being used for real-time consumption in the future directly from storage or over another network, and a second relative cost of communicating the first data using the unicast mode for real-time consumption and serving subsequent user requests for the first data for real-time consumption in the future using the unicast mode of the same network once again, may also be determined.

As will be described below, the second user device 3030 and third user device 3036 may receive the first data that is broadcasted in broadcast mode but is directed to a first user device. The communication system 3010 decides whether to communicate the content to the first user device using a broadcast mode through the broadcast mode controller 3013 or through a unicast mode through a unicast mode controller 3014. When the broadcast mode controller 3013 is chosen, the system allows the remnant of the broadcast signal to be used by the second user device 3030 and the third user device 3036 to receive the signal for non-real-time consumption, including storing the first data, and then serving the first data for real-time consumption in the future.

Figure 31:
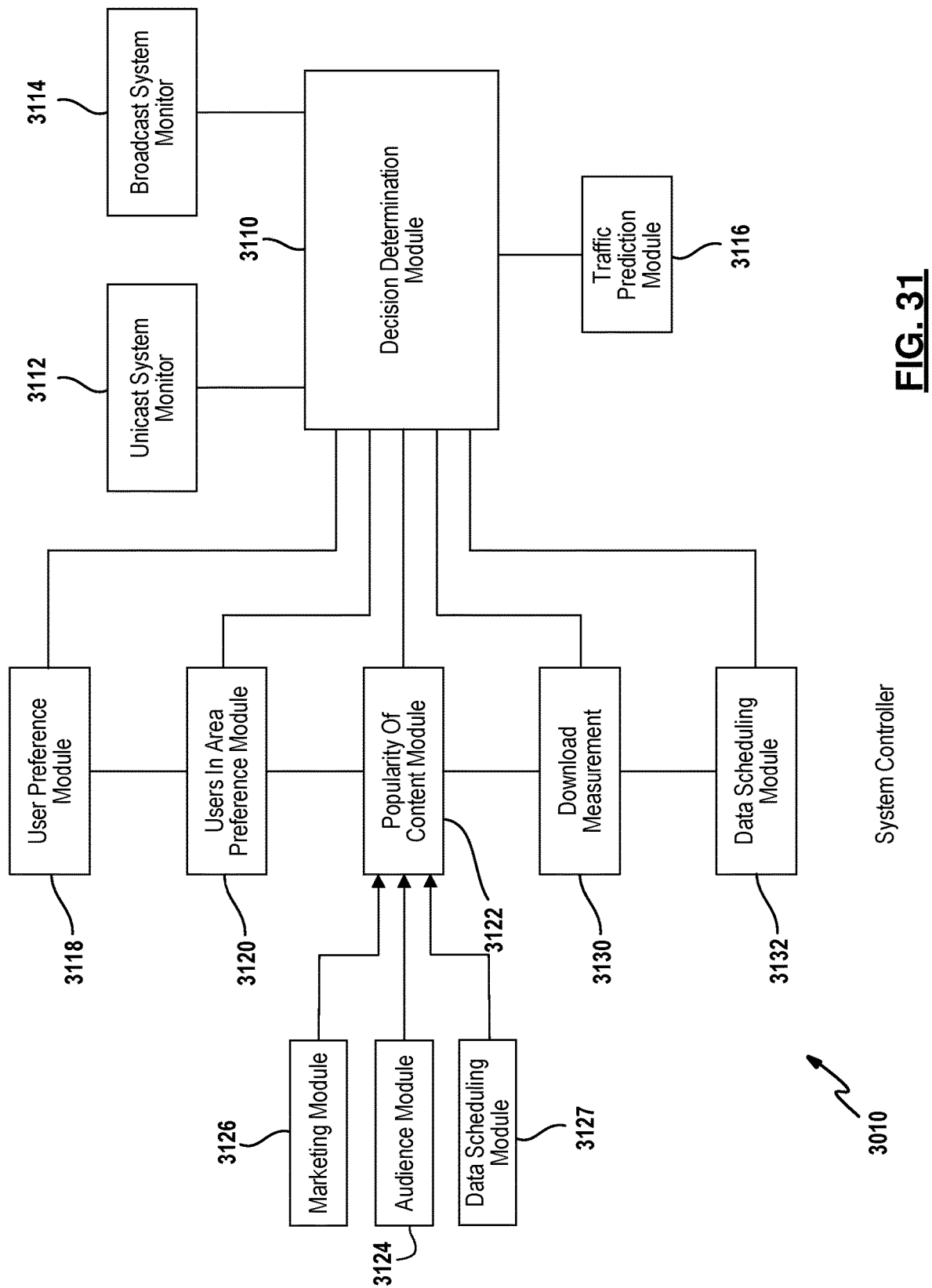
FIG. 31 is a simplified block diagrammatic view of the system controller of FIG. 30.

Referring now to FIG. 31, a block diagrammatic view of the system controller 3012 is set forth. The system controller 3012 as described above includes a decision determination module 3110. The decision determination module 3110 is used to decide whether the broadcast mode controller 3013 or the unicast mode controller 3014 is to be used to communicate the data in a broadcast mode or a unicast mode. As mentioned briefly above, the decision determination module 3110 is used for deciding whether to communicate in a unicast mode or a broadcast mode. The decision determination module 3110 uses a unicast system monitor 3112 and a broadcast system monitor 3114 to monitor the respective systems. That is, the unicast system monitor 3112 monitors the unicast mode controller 3112 and the unicast communications communicated therethrough. Likewise, the broadcast system monitor 3114 monitors the broadcast signals communicated through the broadcast mode controller 3013. Both the unicast system monitor 3112 and the broadcast system monitor 3114 monitors the amount of traffic being communicated through each of the respective systems. The amount of traffic corresponds to the amount of spectrum used for each of the systems.

A traffic prediction module 3116 is used to forecast an amount of traffic likely to be used in the system in a subsequent time to the determination. Various factors such as the location of the system, the day and the time of day may be used for such determination. For example, a cell site close to a freeway or interstate may be more highly used during morning rush hour and evening rush hour. During the middle of the day, lighter traffic around the cell tower may correspond to lighter usage of the data systems. During morning or evening rush hours, the system may be utilized quite extensively. Over time, various traffic patterns may be used for the predictions.

A user preference module 3118 communicates a user preference signal to the decision determination module 3110. The user preference module 3118 may provide user data for users of the first data. The system may have users that merely use one type of data in particular. A user in-area preference module 3120 may provide the decision determination module 3110 with user preferences in the specific area for which the data is requested to be communicated to the first user device. The data provided to the decision determination module 3110 may be more specific to the actual users in the area, whereas data from the user preference module 3118 may be specific to users of the entire system that are not necessarily in a similar geographic area as in the data provided by the user in-area preference module 3120.

The popularity of content module 3122 may provide a signal corresponding to the popularity of various types of content or data. A numerical value may be assigned to content to indicate the level of popularity for the specific content. The popularity of content module 3122 may be determined in an overall system manner by monitoring an audience measurement module 3124. The audience measurement module 3124 may generate a signal corresponding to the amount of users requesting a particular piece of content or data in the overall system. A marketing module 3126 is used for providing marketing feedback to the popularity of content module 3122. The marketing module 3126 may have a human input to adjust or provide a signal that corresponds to the predicted or forecasted amount of content or data. For example, if a very popular movie that was a blockbuster at the box office is going to be released, the marketing module 3126 may assign a high level of popularity to the particular content. Further, a data scheduling module 3127 may be reviewed to determine the priority assigned to a content for non-real-time consumption deliveries, as well as the number of users with such priorities, to generate a signal on the level of importance that a given data be communicated using broadcast, for remnant broadcast receipt for non-real-time consumption by the other users in order to avoid needing to transmit this same content for non-real-time deliveries in the future. The popularity of the content determined by the audience measurement module 3124 and the marketing module 3126, as well as the likelihood and importance of that content being delivered to other users in the future by the data scheduling module 3127, are factored together in the popularity of content module 3122 and provided in a popular signal to the decision determination module 3110. A high level of popularity, for example, may cause the decision determination module 3110 to communicate the content to the first user device 3020 using broadcast instead of unicast, and cause the intermediate device 3026 to receive the remnant broadcast for non-real-time consumption, by storing the broadcasted content for real-time consumption in the future by other user devices such as the second user device 3030 and the third user device 3036. The content may also be communicated using remnant broadcast directly to the third user device 3036 for direct storage therein.

A download measurement module 3130 may also be used by the decision determination module 3110 while the audience measurement 3124 may be used to monitor the amount of use of a particular content, the download measurement module 3130 may measure the number of downloads requested within the system. Through various menus or structures, the users in the system may also select content to be eventually downloaded. This data may be obtained by the download measurement module 3130 and provided to the decision determination module 3110.

A cost determination module 3132 provides a signal corresponding to the cost of using one type of mode versus another type of mode of communication of first data or first content. For example, the cost determination module 3132 may determine the cost now and in the future for broadcasting or unicasting a particular content through the broadcast mode controller 3013 and the unicast mode controller 3014. The analysis of cost may use data from the other modules 3112 to 3130 to determine the cost. That is, the system status (traffic, usage) from the unicast system monitor 3112, the system status (traffic, usage) of the unicast and broadcast systems may be used in a cost determination. Likewise user preferences, preferences of users in the area, popularity of the content and actual downloads already performed and also downloads requested, may also be factored into the present and future cost of broadcasting and unicasting options. The cost determination module 3132 may also be used to determine the spectral efficiency of a unicast transmission and a broadcast transmission. For example, the cost determination module 3132 may provide a signal that provides the likelihood that the cost of serving customers using a unicast mode transmission at the current time for real-time consumption by a customer and unicast mode transmissions at a future time for real-time consumption by other customers at that future time, will be greater than the cost of using a broadcast transmission for real-time consumption by a customer at the current time, with remnant broadcast capacity use for non-real-time consumption by the other customers.

Figure 32:
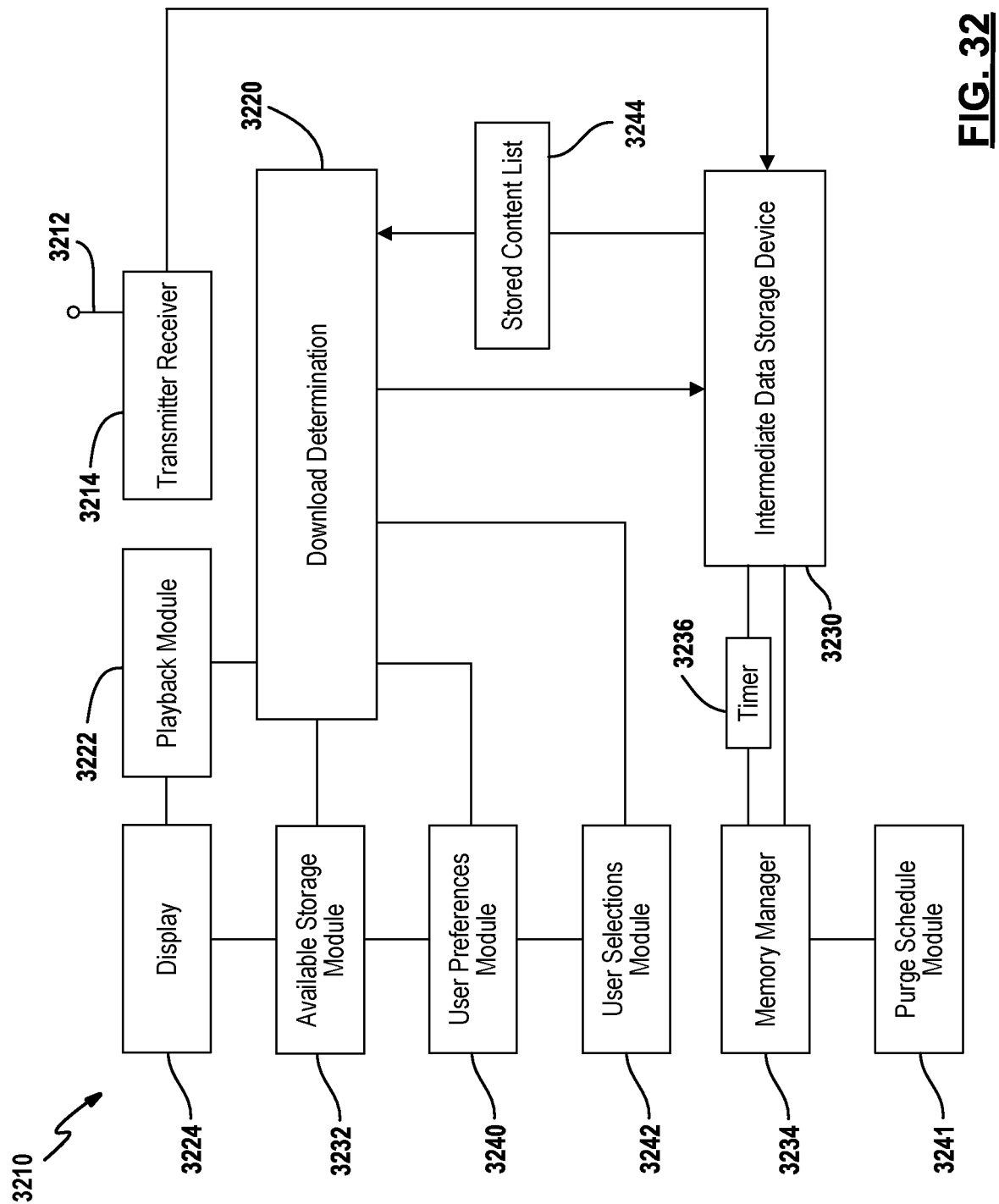
FIG. 32 is a simplified block diagrammatic view of a user device as used in FIG. 30.

Referring now to FIG. 32, a portion of the control for a user device 3210 is set forth. The user device 3210 may be one or more of the first user device 3020, the intermediate device 3026, the second user device 3030 and the third user device 3036. Signals may be received and transmitted to the user device 3210 through an antenna 3212 which is in communication with a transmitter/receiver 3214. The receiver portion of the transmitter/receiver 3214 receives the signal from the antenna 3022 described above. The user device 3210 includes a download determination module 3220 that determines whether the user device 3210 should download a particular piece of content. When a piece of content or data is requested for real time consumption, the download determination module 3220 receives the data or content and allows the playback of the content through a playback module 3222. The playback module 3222 is in communication with a display 3224 for displaying the content. The display 3224 may be an audio display, a video display or a combination of both.

The download determination module 3220 may also determine whether to download content and store the content into an intermediate data storage device 3230. The intermediate data storage device 3230 may be a hard drive or a solid state drive. The intermediate data storage device 3230 stores content for non-real time consumption. The intermediate data storage device 3230 has a limited amount of capacity and thus the download determination module 3220 may selectively determine the content to be stored within the intermediate data storage 3230. The download determination module is in communication with an available storage module 3232 that provides an indication as to the amount of data storage available in the intermediate data storage device 3230.

A memory manager 3234 may be used to manage the content within the intermediate data storage device 3230. That is, data may be removed from the intermediate data storage device 3230 when content is deemed to be stale or expired. The memory manager 3234 may be coupled to a timer 3236 that provides a time indication to the intermediate data device and the memory manager 3234 when an amount of data is to be removed. For example, when data has been stored within the intermediate data storage device 3230 and more than one week or two weeks has passed, the data may be removed from the intermediate data storage device 3230. Of course, different amounts of time may be provided for different types of content.

A memory manager 3234 may also be coupled to a Purge Schedule Module 3241, which in contrast to the User Preferences Module below may dictate the least desired content for a user all the way up to the most desired content for a user within the intermediate data storage device 3230. As new content is delivered, the memory manager 3234 may consult the Purge Schedule Module 3241 in order to identify which data to remove first based on its rank in the Purge Schedule Module 3241 to free up the adequate intermediate data storage to store the new content delivered.

User preference module 3240 may also be used to determine whether to store data within the intermediate data storage device 3230. All broadcast data may be monitored using the transmitter/receiver 3214. When various user preferences in the user preferences module 3240 indicate the user is likely to enjoy the content, or that content has been scheduled for delivery to such user in the future, or even that the importance of the content being received over broadcast is higher for that user than the content already resident on the user device and slated to be deleted whenever higher priority content for that user arrives, such content or data may be stored within the intermediate data storage device 3230. The download determination module 3220 may command the transmitter/receiver 3214 to receive the content and store the data within the intermediate data storage device 3230. The user preferences module 3240 may monitor other types of content that had been used at the user device 3210 to make a determination as to the preferences and content that the user of the device may like or enjoy.

The user selections module 3242 is used to communicate selections to the download determination module 3220. The user selections module 3242 may command the storage of content that is requested by a user. A user may use a menu structure to select different content or data and explicitly request a content. Some content may be immediately delivered for real time consumption such as that described with respect to the first user device 3020 described above. Other types of content may be stored in the intermediate data storage 3230 for non-real time consumption. Once a particular content or data is communicated by the communication system 3010, data may be stored within the intermediate data storage after being received at the transmitter/receiver 3214. In particular, the broadcast mode may be monitored, as mentioned above, and when a content title or data is being broadcasted in broadcast mode, the download determination module 3220 may download and store the content within the intermediate data storage device.

A stored content list 3244 may be used by the download determination module 3220 to prevent the same content from being stored in the storage device 3230, and if the downloaded content is the same as content in the stored content list 3244 then such content may be ignored. The user preferences module 3240 may also be used by the download determination module 3220, in conjunction with the stored content list 3244, to determine if content similar or related to content stored may be deemed more desirable to be stored in the storage device 3230 and stored instead of the existing content in the stored content list 3244.

Figure 33:
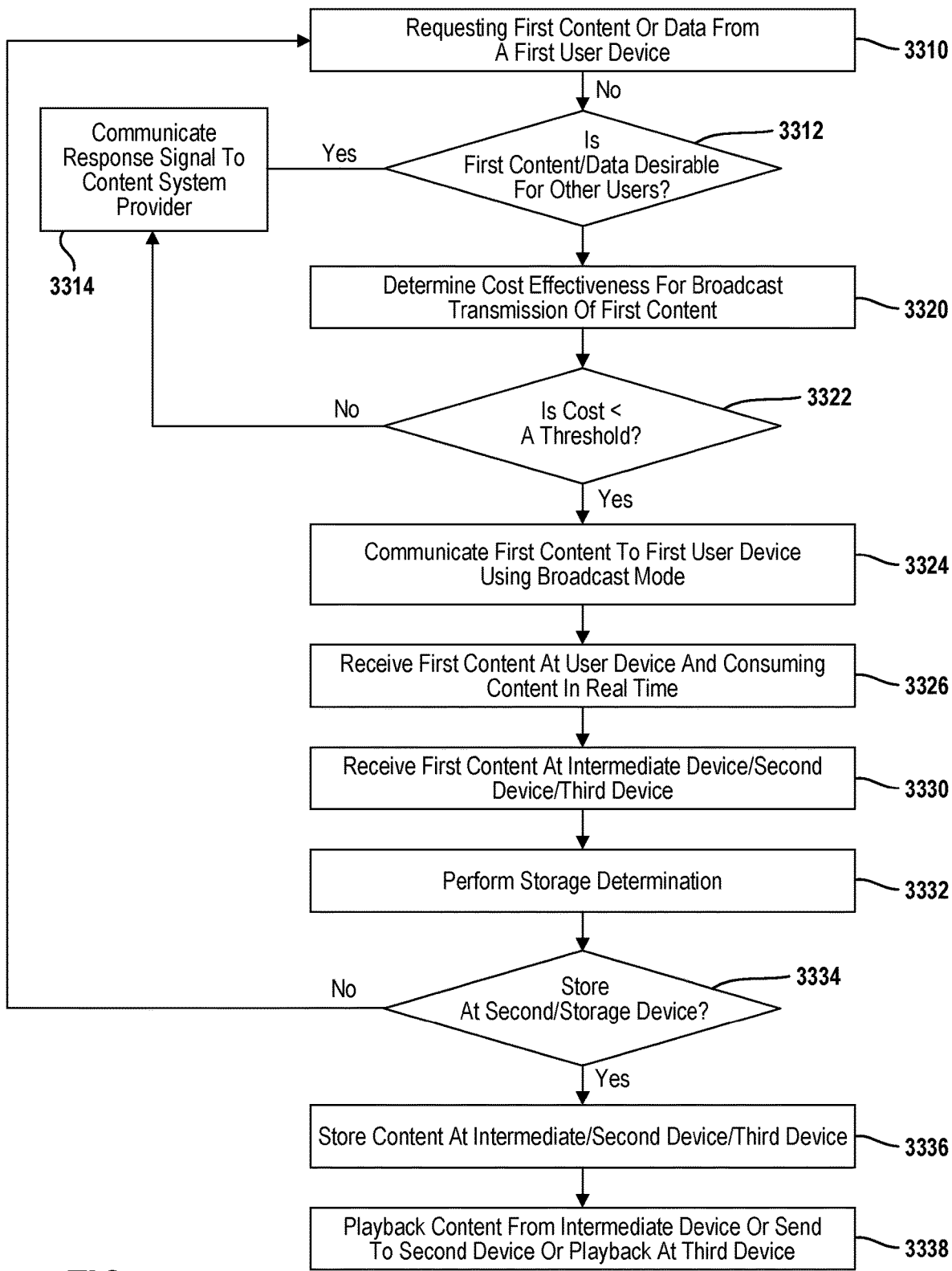
FIG. 33 is a flowchart of a method for operating the system.

Referring now to FIG. 33, a method for operating the system is set forth. In step 3310, first content or data is requested by a first user device. The first user device may use a touch screen interface, voice selection or other type of user interface for requesting content. In step 3312, it is determined whether the first content is desirable for other users. If the first content or data is not desirable for other users in step 3312, step 3314 communicates the first content using a unicast mode.

In step 3320, the cost effectiveness for broadcast transmission of the first content or data is determined as described above relative to the cost determination module 3132. The capacity efficiency is part of the cost in determining whether to unicast or broadcast content. A first relative cost of communicating the data using the remnant capacity of the broadcast mode and a second relative cost of receiving and storing the first data may be determined.

In step 3322, the cost is compared to a cost threshold. When the cost is greater than a cost threshold as determined in step 3320, step 3314 is again performed. The cost threshold may be set by design parameters of the system. In this example, the cost threshold corresponds to one mode of communication versus another. A lower cost for broadcasting versus unicasting will result in the use of broadcasting as described below.

In step 3322, when the cost is less than a threshold, a decision may be made to broadcast the content or data using a broadcast mode rather than communicate the content or data in a unicast mode. In step 3324, the first content or data is communicated to the first user device using a broadcast mode. In step 3326, the first content or data is received at the first device and is immediately consumed or played back in real time. That is, the first content or data is consumed at the same time as when the user receives the content. In step 3330, the first content is received at an intermediate device or the second device. The first content is broadcasted to the first user device as intended. The remaining portion of the broadcast signal may referred to as remnant capacity because it is an underused resource, and may have been used to transmit the first content to be received at an intermediate device or the second device. In step 3332, a storage determination is performed at the intermediate device or the second user device (or the third user device). As mentioned above, various data may be used by the system in order to determine whether or not storage within the intermediate device is desirable. In step 3336, content is stored at the intermediate device or within the third user device.

In step 3338, content from the intermediate device is played back at the second user device or the third user device at a future time, which is not the same as the current time. A request signal or selection signal may be generated at the second user device or the third user device. Content is displayed on a display in response to a selection signal.

Figure 34:
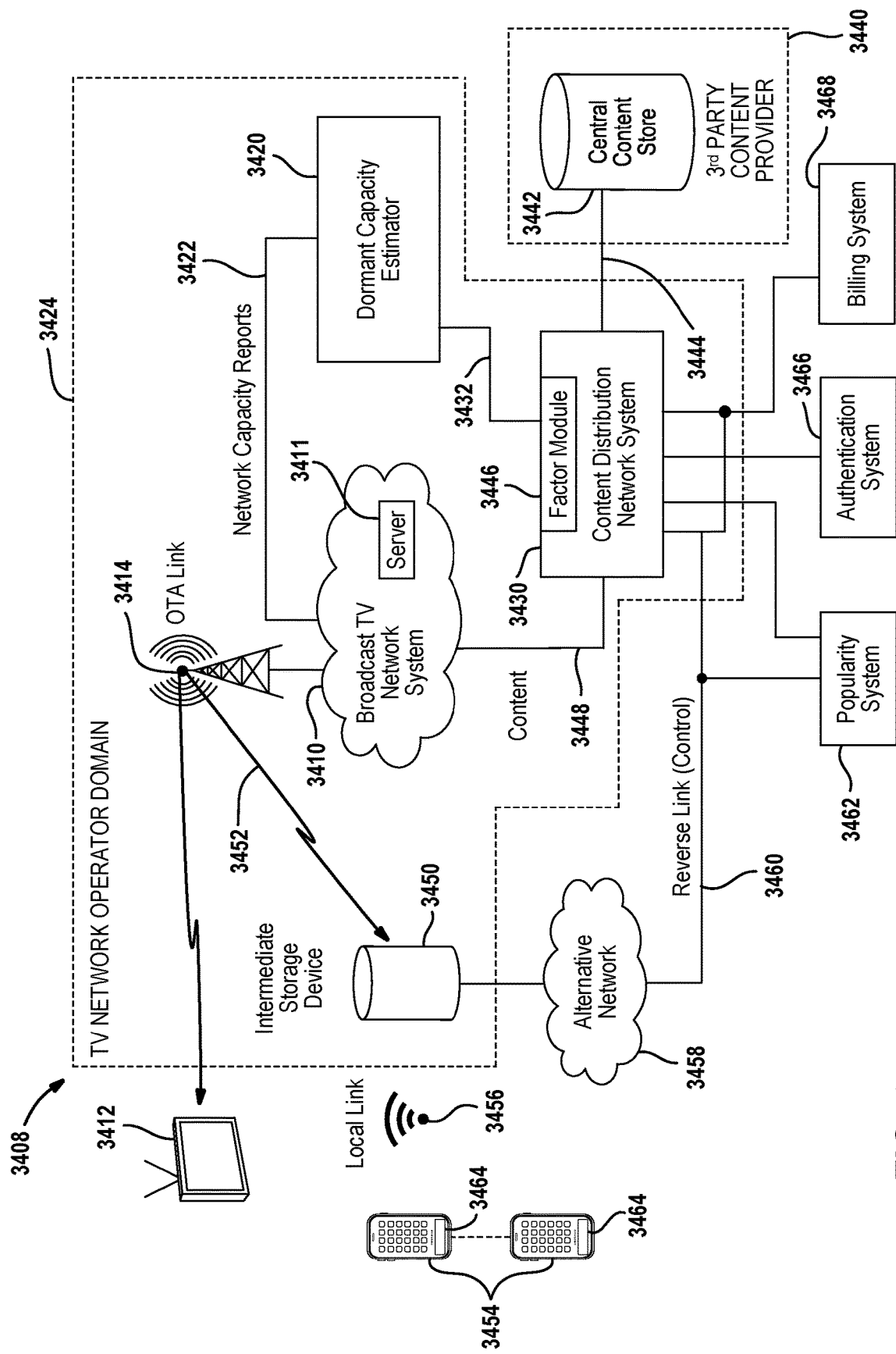
FIG. 34 is a high level block diagrammatic view of a broadcast television network system used for delivering content to an intermediate storage device.

Referring now to FIG. 34, a communication system 3408 that includes a broadcast television network system 3410 is set forth. The broadcast television network system 3410 is used to broadcast television content to television devices 3412 through an over-the-air antenna 3414. The broadcast television content is not protected in any way and can be received by anyone with an over the air tuner and the proper antenna. Digital content such as Internet based data (IP data) and television content may also be communicated through the over-the-air antenna 3414 as a distinct service. The content may be broadcasted or unicasted to subsribers of the service in a protected manner. Advanced Television Systems Committee (ATSC) 3.0 or other digital standards may be used for communicating the digital content. As will be described in more detail below, the broadcast television network system 3410 has an over-the-air spectrum capacity that has been allocated thereto for the communication of free to access television signals to television devices 3412. As mentioned above, the over-the-air spectrum capacity has a first portion for linear over-the-air broadcasting content that is communicated in real time to the television devices 2412. A second portion of the over-the-air spectrum capacity corresponds to dormant capacity that is unused by the first portion that broadcasts linear over-the-air broadcasting content.

A dormant capacity estimator 3420 is in communication with the broadcast television network system. The dormant capacity estimator 3420 uses network capacity report signals 3422 that communicate capacity usage reports from the broadcast television network system 3410 to the dormant capacity estimator 3420. The dormant capacity 3420 estimates whether content delivery using the dormant capacity is possible and determines a target throughput for content distribution. The dormant capacity estimator 3420 continually or periodically determines the dormant capacity corresponding to the second portion of the over-the-air spectrum capacity. In this example, the dormant capacity estimator 3420 is part of the television network operator domain 3424.

A content distribution network (CDN) system 3430 is in communication with a dormant capacity estimator 3420 and communicates a dormant capacity data signal 3432 to the content distribution network system 3430. The content distribution network system 3430 has a memory and servers to receive and communicate data and content. The dormant capacity data allows the content distribution network system 3430 to determine the amount of data and content that can be sent through the broadcast television network system 3410 using the dormant capacity of the over-the-air spectrum capacity. The content distribution network system 3430, in this example, is also part of the television network operator domain 3424.

A third party content provider 3440 having a central content store 3442 may be used to communicate content signals 3442 to the content distribution network system. The third party content provider 2440 is a separate entity than the television network operator domain 3424. The third party content provider provides the digital content to be distributed to users. Of course, the television network operator domain 3424 may also include the central content store 3442. The central content store 3442 may be used for content or data that users are willing to view in a time-shifted format. Live sporting events, for example, are examples of content that are typically not suitable for viewing in a time-shifted format. Typically, content for non-real-time time-shifted viewing includes movies, television shows, news items and documentaries. Of course, other new and innovative services for providing data and content may be provided by such a system.

The content distribution network 3430 may have a factor module 3446 coupled thereto. The factor module 3446 may take into consideration various factors when deciding which content to distribute to the broadcast television network system and when to distribute the content to the broadcast television network system 3410. Such factors will be described in further detail below. Some factors that may be considered by the factor module 3446 include, but are not limited to, the user preferences, a watch list of the users, service provider priorities, the popularity level of the content, the radio performance of the broadcast television network and the location of the intermediate storage devices.

The content distribution network system 3430 communicates content such as data or television content using content signal 3448 to the broadcast television network system 3410 for communication through the over-the-air broadcast television network system 3410. The broadcast television network system 3410 communicates to one or more intermediate storage devices 3450 through an over-the-air link 3452. As will be described in more detail below, the content may be broadcasted to a plurality of intermediate storage devices 3450 or may be unicasted to one particular intermediate storage device. The intermediate storage device 3450 caches the content and data for eventual use by one or more end user devices 3454 that is ultimately communicated through a local link 3456 such as a Wi-Fi or Ethernet network. Although only one intermediate storage device 3450 is illustrated, a number of intermediate storage devices 3450 are likely to be used in a communication system 3408. Further the intermediate storage devices 3450 may be in a fixed location or may be mobile.

An alternative network 3458 is used as a reverse link 3460 for communicating signals to the content distribution network system 3430. The alternative network 3458 is different that the broadcast television network system 3410. The alternative network 3458 is used as an uplink or reverse link 3460 to communicate return signals to the content distribution network system 3430. The content distribution network system 3430 may receive the reverse link signals 3460 from the intermediate storage device 3450 that corresponds to the amount of content that is actually received by the intermediate storage device 3450. This may correspond to the volatility of the broadcast television network system 3410. The efficiency of the conditions of the intermediate storage device reception may also be provided.

The alternative network 3458 also allows the factor module 3446 of the content distribution network to obtain data. For example, individual users of the end user devices, 3454 may provide user preferences to the intermediate storage device 3450. The preferences may then be communicated from the intermediate storage device 3450 to the alternative network 3458 using the reverse link 3460 that provides the user preferences to the content distribution network system 3430. A watch list may also be provided. A popularity level based upon the amount of request from various user devices may also be determined at the factor module 3446. Of course, a dedicated popularity system 3462 may also provide the popularity of various content to the content distribution network system 3430.

The alternative network 3458 may also be used to communicate the location of the intermediate storage device 3450 and the end user devices 3454. The locations of the intermediate storage 3450 and the end user devices 3454 are provided to the content distribution network system 3430 through the reverse link 3460.

An application 3464 located within the end user device 3454 may be used to obtain the user preference, watch list information and the set-up by the user which is ultimately communicated through the local link 3456 to the intermediate storage device 3450.

In this example, the intermediate storage device 3450 is operated by the television network operator domain 3424. In other examples, the intermediate storage device is outside of the television network operator domain. The content distribution network system 3430 may also be in communication with an authentication system 3466 which is used for authenticating intermediate storage devices and may also be used for authenticating end user devices as well. Passwords and hashes and other security measures may be used in this process.

The content distribution network system 3430 may also be in communication with a billing system 3468. The billing system 3468 may be used to bill individual users for content that is consumed. As will be described, the content distribution network system 3430 may receive feedback based upon the consumption of content to provide consumption data to the various individual content providers so that appropriate charges for use may be billed and communicated to the end users. The billing system 3468 may also be in communication intermediate storage device 3450 or the end user devices 3464 through the reverse link 3460.

In the system set forth above, the use of the reverse link 3460 through an alternative network 3458 allows the system manage and control the content that is ultimately provided to the intermediate storage device 3450 from the content distribution network system 3430. By using the dormant capacity of the over-the-air spectrum, otherwise unused spectrum capacity is placed into service by prepositioning content at the intermediate storage device 3450 from the content distribution network system 3430, the network spectrum of the over-the-air broadcast television network system 3410 may be more fully used. The feedback through the reverse link 3460 allows the type of content and the quality of the communication of the digital content to be monitored. The system operator therefore can more fully utilize the system spectrum for which the television network operator has already paid.

The system also allows the latency of communication through the communication system 3408 to be reduced by communicating and pre-storing the content in the intermediate storage device which is available through the local link 3456. The television network operator may operate the system and communicate content to the intermediate storage device 3450. However, the system may also be used by a service provider to provide a system that is completely separate from the television network operator domain 3424 using the system aspects of the broadcast television network system 3410.

Figure 35:
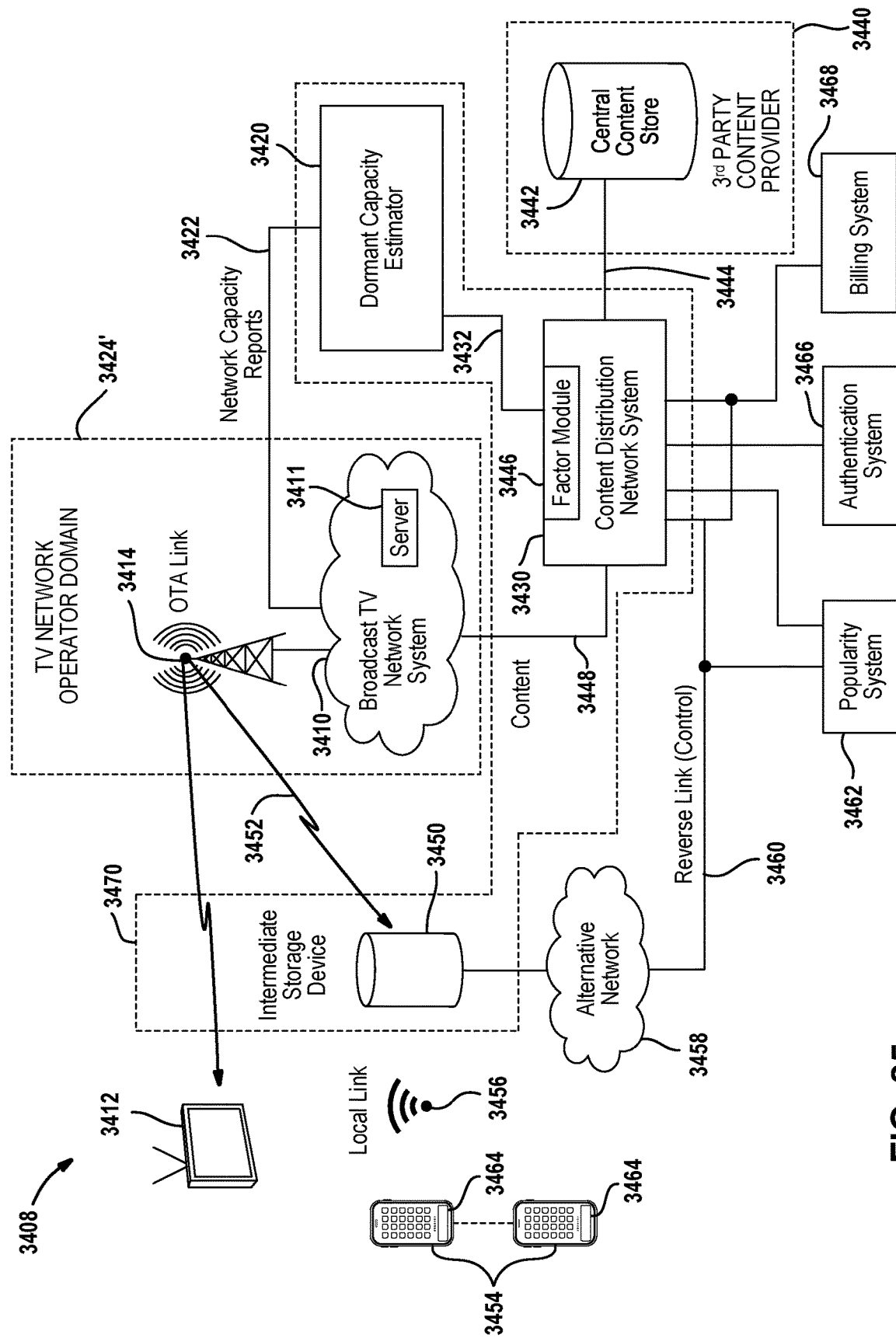
FIG. 35 is a second example of a system for distributing content through a broadcast television system with a different content distribution network system domain than that illustrated in FIG. 34.

Referring now to FIG. 35, the television network operator domain 3424' of the communication system 3408 includes the broadcast television network system 3410. The dormant capacity estimator 3420, the content distribution network system 3430 and the intermediate storage device 3450 may be outside of the television network operator domain 3424' and in a content delivery network domain 3470. That is, the intermediate storage device 3450, the content distribution network system 3430 and the dormant capacity estimator 3420 may be controlled by the operator of the content distribution network system 3430. The content distribution network domain 3470 may thus be a third party provider different that the operator of the television network operator domain 3424'. The functionality of the various devices are the same as described above and thus will not be described in further detail.

The central content store 3442 is illustrated as part of a third party content provider. However, the content distribution network domain 3470 may also include the central content store 3442. Multiple content stores may also be provided which may be under the control of a third party, the television operator or the content delivery network operator.

Figure 36:
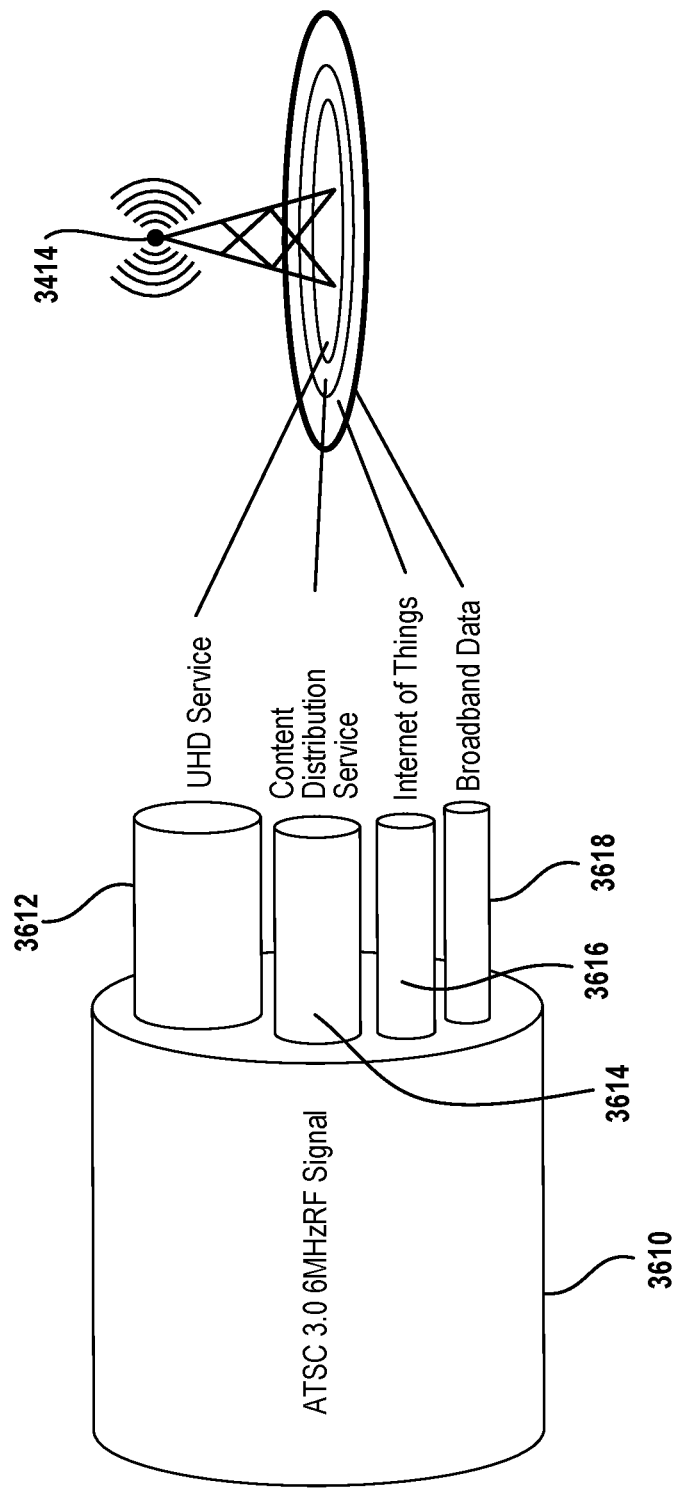
FIG. 36 is a representation of the bandwidth of the system of FIGS. 34 and 35.

Referring now to FIG. 36, the over-the-air spectrum capacity 3610 is set forth. In this example, an ATSC 3.0 six MHz is provided. In this example, a plurality of physical layer pipes (PPLPs) allow the spectrum capacity to be allocated to various services. In this example, a physical layer pipe 3612 corresponds to ultra-high definition television broadcast service. A second physical layer pipe 3614 corresponds to a content distribution service 3614. A third physical layer pipe 3616 corresponds to an Internet of Things content distribution service. A fourth physical layer pipe 3618 corresponds to a broadband data layer pipe. The physical layer pipes 3612-3618 correspond to a radio resource block as described above with respect to the cellular systems. A physical layer pipe is configured with specific modulation and coding level (MCS) that is consistent with robustness and RF conditions. For example, service being delivered to a device in strong RF conditions may use a high order of modulation, combined with a high coding rate so that there is less overhead assigned forward air correction. A mobile service may need a more robust coverage when compared to a fixed service using very good radio conditions. The modulation level and coding rate combination directly influences the size of each transmission to the device and hence the target throughput. The combination of the size of the various physical layer pipes 3612-3618 dictates the throughput targeted to the service.

The capacity reports described above that are communicated to the dormant capacity estimator are used to estimate the dormant capacity. The system can indicate the percentage of the ATSC's link capacity that is unused and hence is available as dormant capacity that may be used by the content distribution network system 3430. The content distribution network system 3430 may also leverage the system to reserve unused capacity to preposition content at the intermediate storage device.

Figure 37:
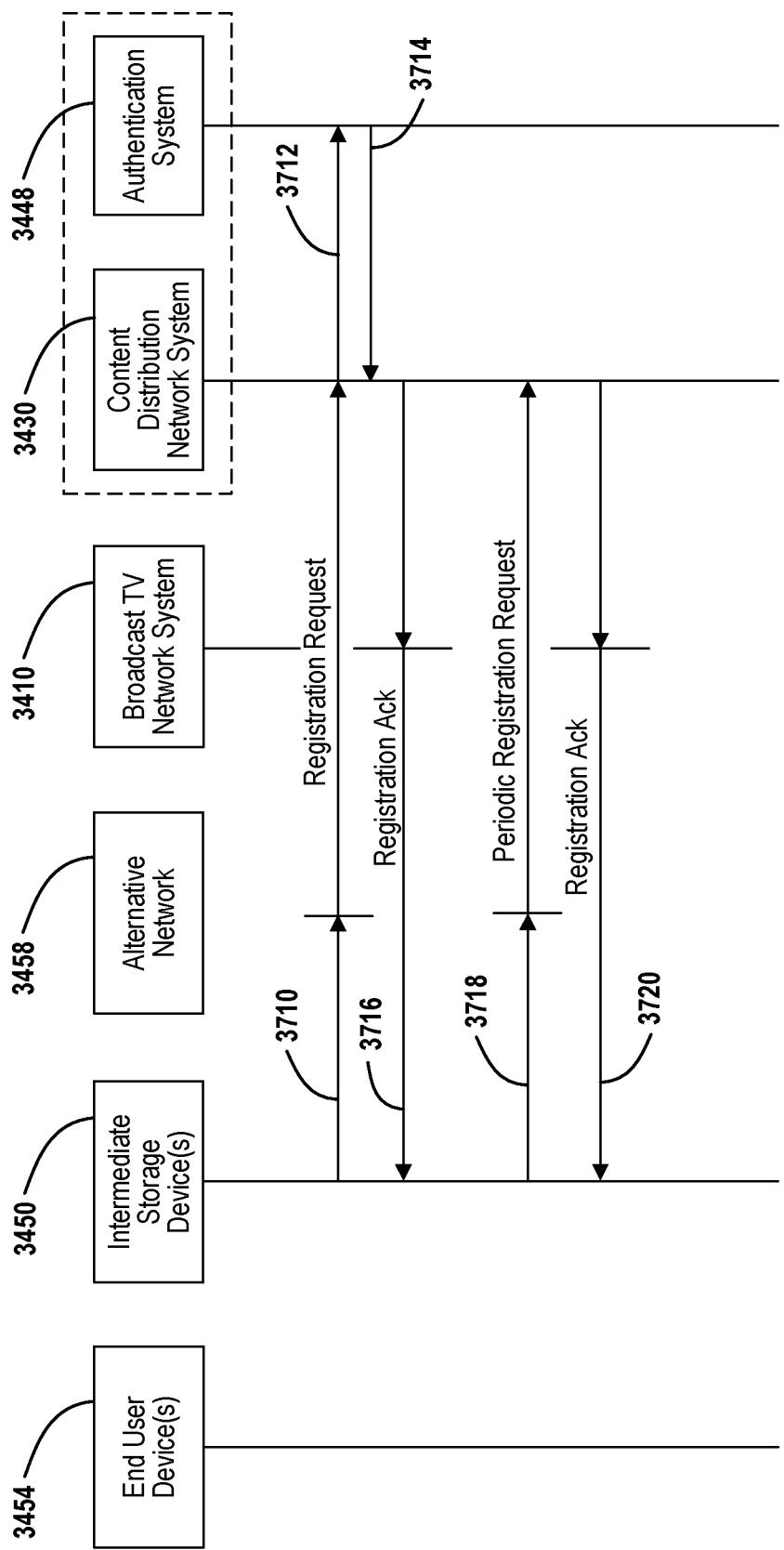
FIG. 37 is a signaling flowchart of the registration process for the intermediate storage device.

Referring now to FIG. 37, a signal flowchart for registration of intermediate storage device is set forth. In this example, a registration signal 3710 is communicated through the alternative network 3458 to the content distribution network system 3430. Thus, a reverse link or uplink is communicated through the alternative network 3458. The use of the registration request signal 3710 may be performed at an initial startup of the intermediate storage device such as part of an initial boot-up or a reboot. The communication of a registration request signal 3710 may also take place periodically as a keep alive or heartbeat mechanism. The registration request signal 3710 may include an intermediate storage device identifier that is used to uniquely identify the intermediate storage device communicating the registration request signal 3710. Each intermediate storage device 3450 of the system may include a unique identifier. The registration request signal may be authenticated at the content distribution system 3430. However, an authentication signal 3712 may be communicated from content distribution to the authentication system 3466. Various types of hashes, passwords, codes and other ways for authenticating may be used. The authentication may take place when an initial request is received. An authentication signal may be communicated to the content distribution system 3430 to enable the content distribution signal 3430 to communicate content to the intermediate storage device 3450. A registration acknowledge signal 3716 is communicated from the content distribution system 3430 through the broadcast network system 3410 to the intermediate storage device 3450. The registration acknowledge signal 3716 acknowledges to the intermediate storage 3450 that authentication is successful. Although illustrated as being communicated throughout the broadcast network 3410, the registration acknowledge 3716 may be also be communicated through the alternative network 3458.

As mentioned above, the registration request may be periodically communicated. A periodic registration signal 3718 may be communicated at various time intervals including regular time intervals from the intermediate storage device 3450 to the content distribution system 3430. In response, the authentication system 3466 may provide authentication to such signals. However, as mentioned above, this process may be eliminated after the first registration. In step 3720, a registration acknowledge signal may be communicated through the broadcast network system 3410 in a similar fashion to that described above relative to the registration acknowledge signal 3716.

Figure 38:
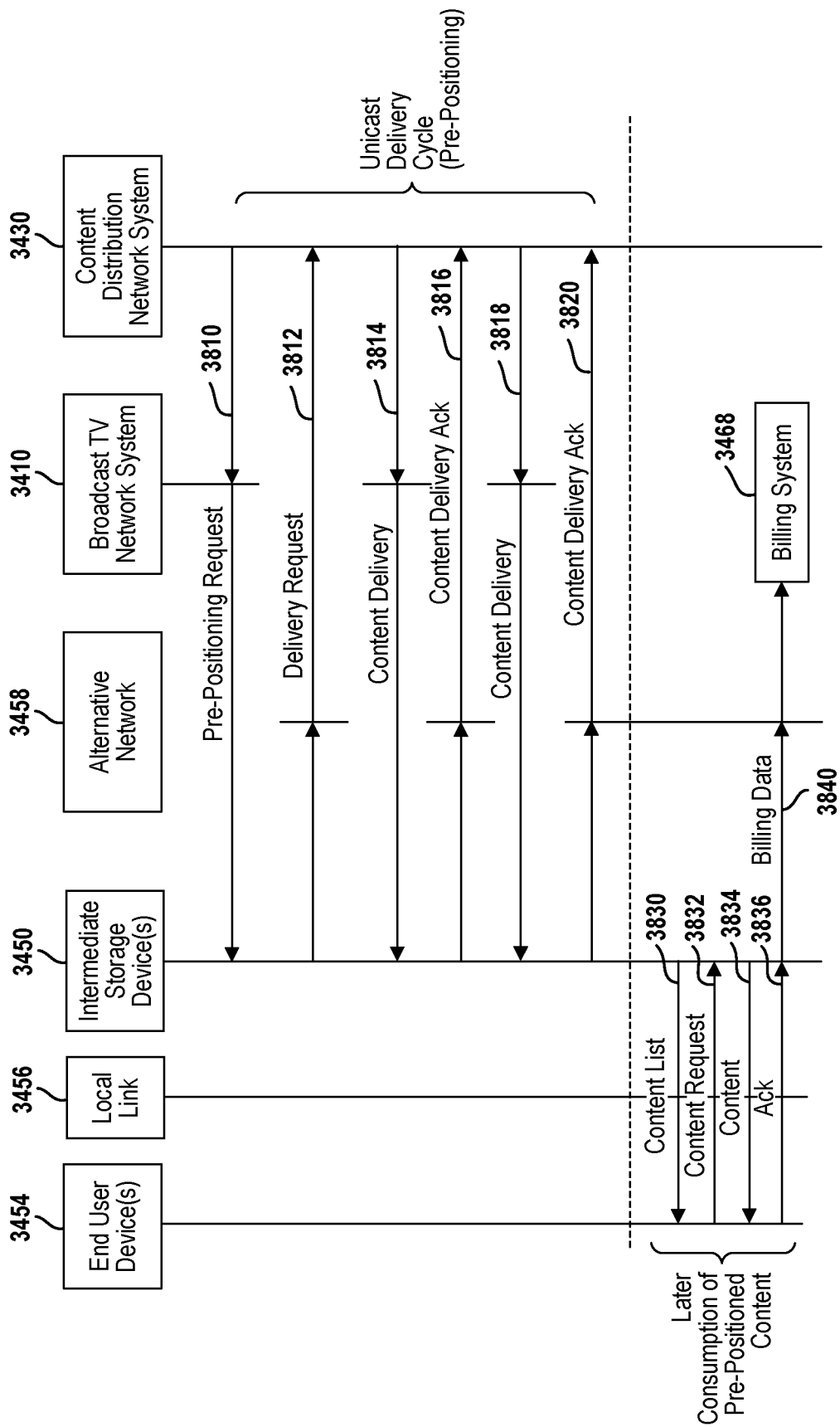
FIG. 38 is a signaling flowchart of the content distribution process using unicast.

Referring now to FIG. 38, a method of operating the system using an unicast delivery mode is set forth. In a unicast delivery mode, content is specifically communicated to an intermediate storage device 3450. That is, the content is specifically directed or addressed to a specific intermediate storage device. Unicast delivery format is formed using a distinct delivery using dormant capacity available at the broadcast network system for "downlinking" content while signal using the uplink alternative network 3458. In step 3810, a prepositioning request signal is communicated from the content distribution system 3430 through the broadcast network system 3410 to the intermediate storage device 3450. The prepositioning request signal 3418 provides prepositioning instructions to the intermediate storage device 3450 as to how, when and where to download the content from the content distribution system 3410. That is, the preposition request signal 3410 may include location instruction data that includes a uniform resource location or other addresses that are used to access the content. The instruction data may include more content asset such as a data file or a portion of a data file. The prepositioning request signal may additionally provide data corresponding to the target throughput that is to be used by the intermediate storage device 3450. The content distribution network system 3430 may generate throughput target based upon the available dormant capacity at the broadcast network.

In step 3418, a delivery request signal is communicated through the alternative network 3418 from the intermediate storage device 3450 to the content distribution system 3430. The delivery request signal 3812 is generated in response to the prepositioning request signal 3810. More specifically, the address, time and the like may be used from the prepositioning request signal 3810 to request delivery of content. An HTTP GET request signal may be used to initiate the delivery of the content. The delivery request signal is communicated through the reverse link and the alternative network 3458. In step 3814, the content distribution system 3430, in response to the delivery request signal 3812, generates a content delivery signal 3814. The content delivery signal 3814 contains the content which is specifically addressed to the intermediate storage device 3450. That is, an address of the intermediate storage device 3450 that was communicated in the delivery request or in the registration process is used. The content delivery signal 3814 is ultimately used to deliver the entire data file or content to the intermediate storage device through the dormant capacity of the broadcast television network system using a dormant portion of the over-the-air spectrum. The delivery through the broadcast television network system 3410 may be referred to as forward link. The movement of the content from the content distribution system 3430 to the intermediate storage device 3450 is a "pulling" of content because it is requested from the intermediate storage device 3450 and then communicated to the intermediate storage device 3450. A content delivery acknowledge signal 3816 is communicated from the intermediate storage device 3450 to the content distribution system 3430 through the alternative network 3458. Steps 3818 and 3820 repeat the content delivery pulling process. Steps 3818 and 3820 may provide different content or other portions of the content that was originally requested in steps 3812 and 3814.

The content delivery acknowledge signals 3816 and 3820 may provide feedback to the content distribution network system 3430. In particular, data such as the volume of data received, the download duration and the achieved throughput may all be provided to the content distribution network system 3430.

After content is stored in the intermediate storage device 3450, the content may be consumed by the end user device 3454. One example of a consumption process is set forth. In this example, a content list signal 3830 is communicated from the intermediate storage device to the end user device 3454. The content list signal has one or more content identifiers such as a title of content stored in the intermediate storage device 3450. As mentioned above, the end user device may have a computer application or "app" for initiating the communication between the end user device 3454 and the intermediate storage device 3450. A content list signal 3830 is communicated between the intermediate storage device 3450 and the end user device 3454. One the end user device 3454 receives the content list from the content list signal 3830, a request signal 3832 may request one or more contents to be delivered from the intermediate storage device 3450. In step 3834, a content signal having content therein is communicated through the local link 3456. Of course all the communications between the end user device 3454 and the intermediate storage device 3450 may take place through the local link 3456. Once the content is fully delivered to the end user device 3454, the content may be consumed such as stored and playback. An acknowledgement signal 3836 may be communicated from the end user device 3454 to the intermediate storage device 3450. A billing signal 3840 may be communicated to the billing system 3468 from the intermediate storage device 3450 once receiving of the content is acknowledged at the end user device 3454. The billing system 3468 may then bill the user of the end user device 3454.

Figure 39:
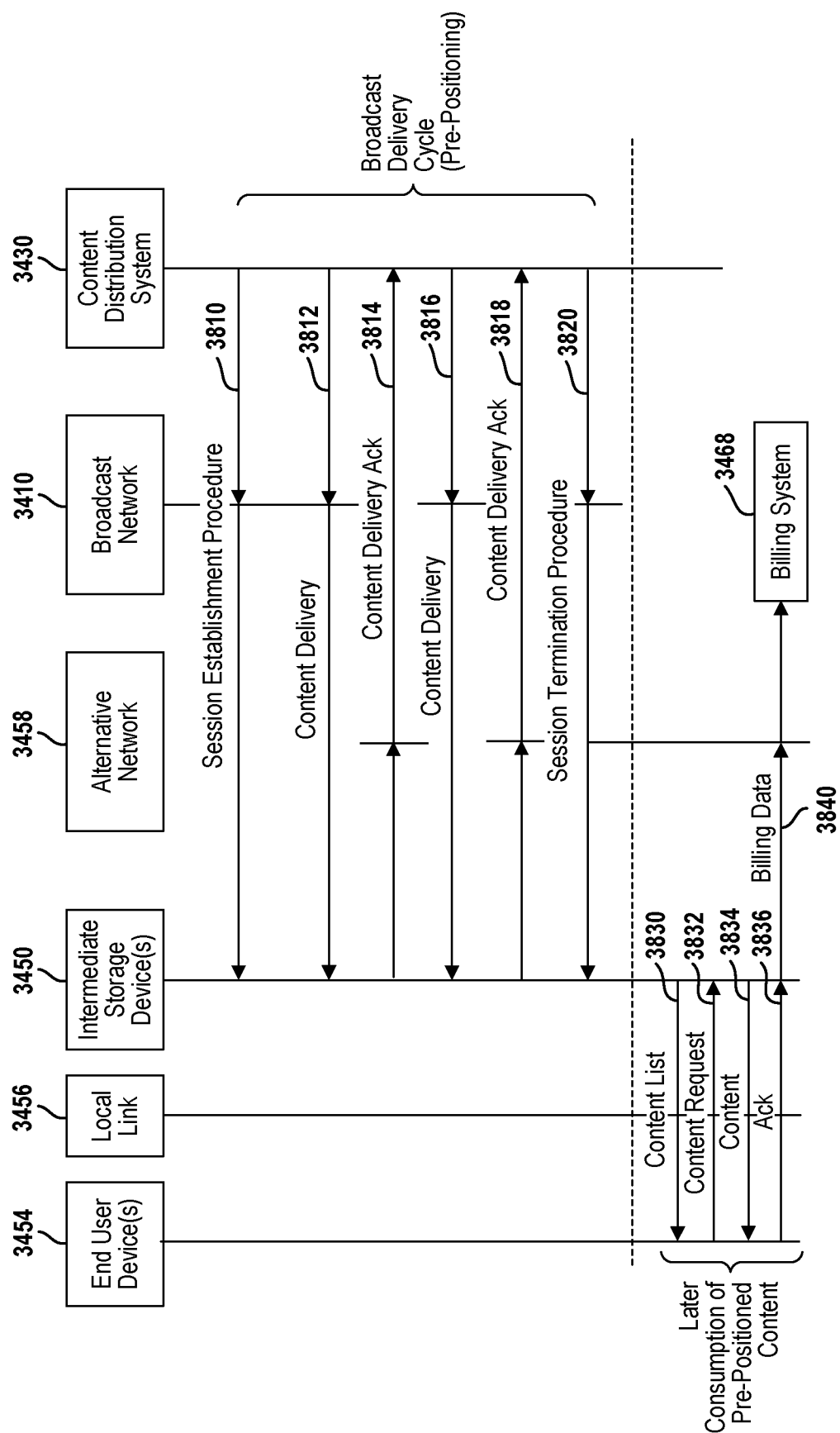
FIG. 39 is a signaling flowchart of the content distribution process using broadcast.

Referring now to FIG. 39, a signal diagram corresponding to a method for broadcast delivery through the broadcast network system 3410 is set forth. As mentioned above, more than one intermediate storage 3450 may be provided in a system. Broadcast delivery to simultaneously communicate signals to multiple intermediate storage devices 3450 is provided. Broadcast delivery modes also uses the dormant capacity of the broadcast television network system 3410. The broadcast server 3411 illustrated in FIG. 34 may be used to generate the broadcast from the content distribution network system 3430. In step 3910, the establishment procedure for establishing a broadcast session is set forth. The broadcast procedure may use the factor module 3446 to determine whether unicast or broadcast of a particular piece of content is used. The content distribution network system 3430 may evaluate the throughput, the quality of the radio conditions and a number of intermediate storage devices 3450 that have a need for a particular content. By using broadcasting spectral efficiency games over unicasting content is provided because a number of intermediate storage devices 3450 may consume the data signal simultaneously. Establishment data is therefore communicated within the establishment signal 3410. The amount of throughput and the identification of the broadcast is provided to the intermediate storage device 3450. A time for a broadcast may also be provided. At the time, the intermediate storage device 3450 tunes to the broadcast signal which is the content delivery signal 3912. The content delivery signal 3912 is a broadcast signal that is addressed to multiple intermediate storage devices 3450. A content delivery acknowledge signal 3914 may be communicated from the intermediate storage devices 3450 to the content distribution system through the alternative network 3458. Of course, other content delivery signals 3916 may be communicated through broadcast television network system 3410 to the intermediate storage devices 3450 to deliver other content or other pieces of content. Delivery acknowledge signals 3918 may also be communicated from each of the storage devices 3450 to indicate that the content was safely received. While delivering the content, the broadcast television network system 3410 may pull content from the content distribution network system 3430 or be pushed content from the content distribution network system 3430. The server 3411 of FIG. 34 may control the pulling or receive the push signals from the content distribution system 3430.

The acknowledgement signals may be one signal corresponding to a number of pieces of content or signals sent when portions of the content are received. Acknowledgment signals may also consolidate a number of contents. The acknowledgement signals, similar to that described above relative to FIG. 38, may provide other types of acknowledgement data including the volume of data received, the download duration and the achieved throughput. These parameters may be used for future control of the communication process. In step 3920, after the last content has been delivered, the content distribution network system 3430 may terminate the broadcast session with the broadcast television network system 3410 and ultimately the intermediate storage device is 3450.

Figure 40:
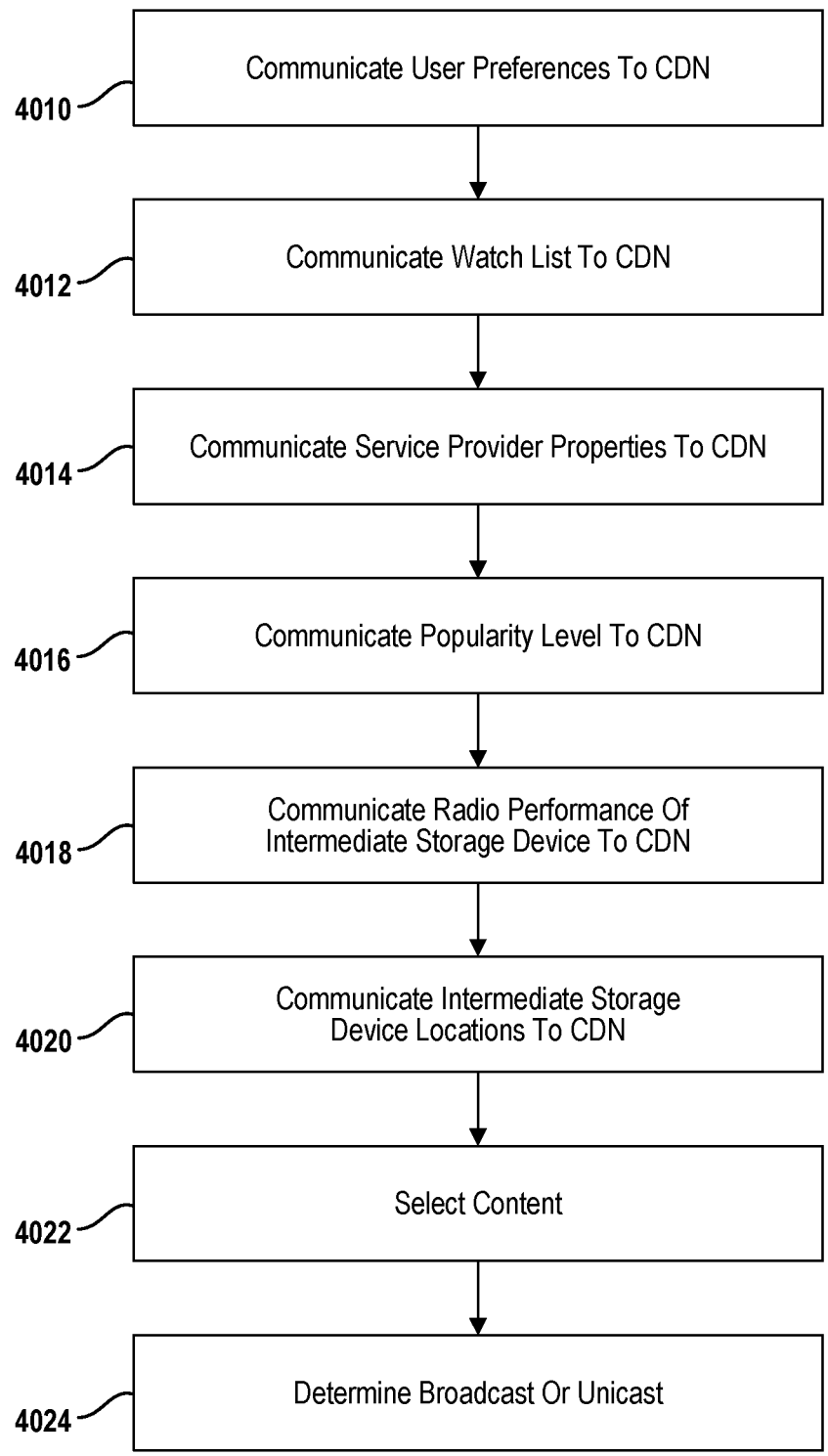
FIG. 40 is a flowchart of a method for receiving various factors at the content distribution network system and determining the content and broadcasting or unicasting of the content.

Referring now to FIG. 40, a method of providing data to the content delivery network system is set forth. It should be noted that not all of the steps indicated in FIG. 40 may be used for a system. The amount of data used depends upon various system requirements and design aspects. The steps set forth in FIG. 40 may provide data to the factor module 3446 for establishing the communication of the system. In step 4010, the user preferences are communicated to the content distribution network system 3430. The user preferences may be communicated from the computer application located within the end user device 3454. The user preferences may be communicated through a local link 3456 to the intermediate storage device 3450 through the alternative network 3458 to the content distribution system 3430. Alternatively, the user preferences may be communicated directly from the end user devices 3454. A watch list in step 4012 may be communication to the content distribution network system 3430. The watch list may be communicated in the same way that the user preferences are communicated. That is, the watch list may be communicated to the content distribution network system 3430 through the intermediate storage device and the alternative network 3458 or directly through the alternative network from the end user device 3454.

Service provider priorities may also be communicated to the content distribution network system 3430. The provider of the system may establish different levels of priority based upon the types of content, marketing decisions or other types of decisions. The service priorities may be communicated to the content delivery network system 3430 from external sources.

In step 4016, the popularity level corresponding to content may also be provided to the content distribution network system 3430. As illustrated in FIG. 34, the popularity system 3462 communicates the popularity of content to the content distribution system 3430. The popularity system may measure the audience popularity or may be provided popularity from sources such as Nielson ratings or Tribune media services.

Referring now to step 4018, the radio performance of the intermediate storage devices and the link between the intermediate storage device and the broadcast television network system 3410 may be monitored. That is, the over-the-air link between the broadcast television network system and the intermediate storage device may be monitored for quality and throughput. The performance of the system may be taken into consideration when communicating content from the content distribution system 3430 which ultimately is communicated by the broadcast television network system 3410.

The location of the intermediate storage devices used in the system are communicated to the content distribution network system 3430. As well, the error and user devices 3454 may also be provided to the content distribution network system 3430. By providing the location, the factor module 3446 may factor in the urgency of the communication. The content to be unicasted or broadcasted through the broadcast television network system 3410 is selected in step 4022. The selection of the content and the communication perimeters may use one or more of the factors from steps 410-420. In step 4024, the determination of whether to broadcast or unicast content is made. This may be determined based upon the content selected in step 4022 and the data from steps 4010-4020.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:
1. A system comprising;
   an over-the-air broadcast television network system communicating linear over-the-air broadcasting content to users for real time consumption using a first portion of over-the-air broadcast television network system capacity during a first time, said over-the-air broadcast television network system capacity comprising the first portion and a dormant capacity separate from the first portion, wherein said real time consumption occurring at a same time as when a user requests to consume said linear over-the-air broadcasting content;
   a content distribution network system receiving digital content from a content storage system;
   a dormant capacity estimator in communication with the over-the-air broadcast television network system, the dormant capacity estimator estimating dormant capacity of an over-the-air spectrum capacity;
   an intermediate storage device communicating a registration request signal to the content distribution network system using a reverse link of a communication network different than the over-the-air broadcast television network system;
   the content distribution network system communicating a registration acknowledgement signal to the intermediate storage device in response to the registration request signal;

the content distribution network system communicating the digital content to the intermediate storage device through the over-the-air broadcast television network system using the dormant capacity of the over-the-air broadcast television system;

the intermediate storage device storing the digital content therein for use by a user device in non-real time relative to communicating the digital content from the over-the-air broadcast television network system; and the content distribution network system communicating the digital content to the user device through a local link after storing the digital content.

2. The system as recited in claim 1 wherein the content distribution network system, prior to communicating the digital content to the intermediate storage device, communicates an instruction signal to the intermediate storage device comprising instruction data for downloading the digital content or a portion of the digital content.

3. The system as recited in claim 2 wherein the intermediate storage device communicates a delivery request signal to the content distribution network system through the reverse link based on the instruction data.

4. The system as recited in claim 2 wherein the instruction data is for a unicast transmission or a broadcast transmission and the instruction data comprises a target throughput for downloading the digital content based on the dormant capacity, a spectral efficiency and a location for the digital content.

5. The system as recited in claim 4 wherein the intermediate storage device communicates a radio quality condition signal using the reverse link corresponding to a quality of communication signals received from the over-the-air broadcast television network system, the target throughput is a function of the radio quality condition signal and an amount of dormant capacity available.

6. The system as recited in claim 2 wherein the intermediate storage device communicates user data to the content distribution network system through the reverse link and wherein the content distribution network system generates the instruction signal in response to the user data.

7. The system as recited in claim 6 wherein the user data comprises a user preference.

8. The system as recited in claim 6 wherein the user data comprises a watch list.

9. The system as recited in claim 1 wherein after the digital content is stored the intermediate storage device communicates a second acknowledgement signal to the content distribution network system using the reverse link.

10. The system as recited in claim 9 wherein the second acknowledgment signal comprises feedback data corresponding the content distribution network system communicating content to the intermediate storage device.

11. The system as recited in claim 10 wherein the feedback data comprises a volume of data received.

12. The system as recited in claim 10 wherein the feedback data comprises a download duration of a download received at the intermediate storage device.

13. The system as recited in claim 10 wherein the feedback data comprises an achieved throughput.

14. The system as recited in claim 13 wherein the feedback data is used by the content distribution network system in a subsequent communication.

15. The system as recited in claim 1 wherein the local link comprises a local area network.

16. The system as recited in claim 1 wherein the content distribution network system communicates the digital content to the intermediate storage device with a unicast delivery.

17. The system as recited in claim 1 wherein the content distribution network system communicates the digital content to a plurality of intermediate storage devices with a broadcast delivery.

18. The system as recited in claim 17 wherein the content distribution network system determines whether the broadcast delivery is used based on at least one of: the plurality of intermediate storage devices in an area, a content commonality of interest at the plurality of intermediate storage devices and radio conditions at the plurality of intermediate storage devices.

19. The system as recited in claim 17 wherein, prior to the content distribution network system communicating the digital content to the intermediate storage device, the content distribution system communicating a session establishment signal through the broadcast television network system to a plurality of intermediate storage devices.

20. The system as recited in claim 19 wherein the session establishment signal comprises required throughput data.

21. The system as recited in claim 19 wherein the broadcast television network system allocates broadcast resources based on the session establishment signal.

22. The system as recited in claim 17 wherein the content distribution network system broadcasts the digital content through the broadcast television network system to the plurality of intermediate storage devices and wherein the plurality of intermediate storage devices stores the digital content therein.

23. The system as recited in claim 22 wherein each of the plurality of intermediate storage devices communicating a second acknowledgement signal after the digital content is stored therein.

24. The system as recited in claim 1 wherein the registration acknowledgement signal is communicated to the intermediate storage device in response to the registration request signal using the dormant capacity of the over-the-air broadcast television network system.

25. A method of operating an over-the-air broadcast television network system comprising an over-the-air spectrum capacity, the over-the-air spectrum capacity comprising a first portion for linear over-the-air broadcasting content in real time and a second portion corresponding to a dormant capacity, the method comprising receiving digital content at a content distribution network system from a content storage system;

estimating dormant capacity of the over-the-air spectrum capacity from a dormant capacity estimator in communication with the over-the-air broadcast television network system;

communicating, by an intermediate storage device, a registration request signal to the content distribution network system using a reverse link of a communication network different than the over-the-air broadcast television network system;

communicating, by the content distribution network system, a registration acknowledgement signal to the intermediate storage device in response to the registration request signal;

communicating, by the content distribution network system, the digital content to the intermediate storage device through the over-the-air broadcast television network system using the dormant capacity of the over-the-air broadcast television system;

storing the digital content in the intermediate storage device; and communicating, the content distribution network system, the digital content to a user device through a local link after storing the digital content.

26. The method as recited in claim 25 further comprising prior to communicating the digital content to the intermediate storage device, communicating an instruction signal from the content distribution network system to the intermediate storage device comprising instruction data for downloading the digital content or a portion of the digital content.

27. The method as recited in claim 26 further comprising communicating a delivery request signal from the intermediate storage device to the content distribution network system through the reverse link based on the instruction data.

28. The method as recited in claim 26 wherein the instruction data comprises a target throughput for downloading the digital content and a location for the digital content.

29. The method as recited in claim 28 further comprising communicating from the intermediate storage device, a radio quality condition signal corresponding to a quality of communication signals received from the over-the-air broadcast television network system, the target throughput is a function of the radio quality condition signal and the dormant capacity available.

30. The method as recited in claim 26 further comprising communicating user data from the intermediate storage device to the content distribution network system through the reverse link and generating the instruction signal in response to the user data at the content distribution network system.

31. The method as recited in claim 30 wherein the user data comprises a user preference.

32. The method as recited in claim 30 wherein the user data comprises a watch list.

33. The method as recited in claim 25 further comprising after the digital content is stored, communicating a second acknowledgement signal to the content distribution network system from the intermediate storage device.

34. The method as recited in claim 33 wherein the second acknowledgment signal comprises feedback data corresponding the content distribution network system communicating content to the intermediate storage device.

35. The method as recited in claim 34 wherein the feedback data comprises at least one of a volume of data received, a download duration of a download received at the intermediate storage device and an achieved throughput.

36. The method as recited in claim 34 further comprising using the feedback data at the content distribution network system in a subsequent communication.

37. The method as recited in claim 25 wherein the local link comprises a local area network.

38. The method as recited in claim 25 further comprising communicates the digital content to the intermediate storage device with a unicast delivery from the content distribution network system through the broadcast television network system.

39. The method as recited in claim 25 further comprising communicating the digital content to a plurality of intermediate storage devices with a broadcast delivery.

40. The method as recited in claim 39 further comprising determining at the content distribution network system whether the broadcast delivery is used based on at least one of: the plurality of intermediate storage devices in an area, a content commonality of interest at the plurality of intermediate storage devices and radio conditions at the plurality of intermediate storage devices.

41. The method as recited in claim 39 wherein, prior to the content distribution network system communicating the digital content to the intermediate storage device, communicating from the content distribution system a session establishment signal through the broadcast television network system to a plurality of intermediate storage devices.

42. The method as recited in claim 41 wherein the session establishment signal comprises required throughput data.

43. The method as recited in claim 41 further comprising allocating broadcast resources based on the session establishment signal at the broadcast television network system.

44. The method as recited in claim 39 further comprising broadcasting the digital content from the content distribution network system through the broadcast television network system to the plurality of intermediate storage devices and storing the digital content therein at the plurality of intermediate storage devices.

45. The method as recited in claim 44 further comprising communicating a second acknowledgement signal from each of the plurality of intermediate storage devices after the digital content is stored therein.

46. The method as recited in claim 25 further comprising communicating the registration acknowledgement signal to the intermediate storage device in response to the registration request signal using the dormant capacity of the over-the-air broadcast television network system.

* * * * *